US008660193B2

(12) United States Patent
Rubinstein et al.

(10) Patent No.: US 8,660,193 B2
(45) Date of Patent: Feb. 25, 2014

(54) PARALLEL, PIPELINED, INTEGRATED-CIRCUIT IMPLEMENTATION OF A COMPUTATIONAL ENGINE

(75) Inventors: Jorge Rubinstein, Newton, MA (US); Albert Rooyakkers, Scotts Valley, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 1422 days.

(21) Appl. No.: 12/322,571

(22) Filed: Feb. 4, 2009

(65) Prior Publication Data

US 2010/0177828 A1 Jul. 15, 2010

Related U.S. Application Data

(63) Continuation-in-part of application No. 12/319,750, filed on Jan. 12, 2009, now abandoned.

(51) Int. Cl.
*H04N 7/18* (2006.01)
(52) U.S. Cl.
USPC .................. 375/240.26; 375/240.25; 348/720; 348/721
(58) Field of Classification Search
USPC .................. 375/240.01–240.29; 348/710–725
See application file for complete search history.

(56) References Cited

U.S. PATENT DOCUMENTS

| 7,734,821 B2 * | 6/2010 | Wang et al. .................... 709/246 |
| 8,307,190 B2 * | 11/2012 | Yamada et al. ................ 711/202 |
| 2010/0199037 A1 * | 8/2010 | Umbehocker et al. ........ 711/113 |

OTHER PUBLICATIONS

International Search Report and Written Opinion for copending PCT application PCT/US2009/068960, mailed on Nov. 5, 2010.
Texas Instruments: "TMS320C6455 Fixed-Point Difital Signal Processor" 20071001, [Online] Oct. 1, 2007, pp. 1-250, XP007915410 Retrieved from the Internet: URL:http://www.datasheetarchive.com/Indexer/Datasheet-015/DSA00256981.html> [retrieved on Oct. 19, 2010] p. 1-p. 11 p. 82-p. 85.
Fukushima et al: "New heterogeneous multi-chip module integration technology using self-assembly method" IEDM 2008. IEEE International Electron Devices Meeting. Technical Digest IEEE Piscataway, NJ, USA, International Electron Devices Meeting. IEDM Technical Digest, Dec. 15, 2008,pp. 1-4, XP031434490 ISBN: 978-1-4244-2377-4.
Texas Instruments: "Digital Media System-on-Chip (DMSoC)" 20080301, [Online]Mar. 1, 2008, pp. 1-231,XP007915311Retrieved from the Internet:URL:http://www.datasheetarchive.com/Indexer/Datasheet-015/DSA00253344.html>[retrieved on Oct. 8, 2010].

(Continued)

*Primary Examiner* — Andy Rao
(74) *Attorney, Agent, or Firm* — North Weber & Baugh LLP

(57) ABSTRACT

Embodiments of the present invention are directed to parallel, pipelined, integrated-circuit implementations of computational engines designed to solve complex computational problems. One embodiment of the present invention is a family of video encoders and decoders ("codecs") that can be incorporated within cameras, cell phones, and other electronic devices for encoding raw video signals into compressed video signals for storage and transmission, and for decoding compressed video signals into raw video signals for output to display devices. A highly parallel, pipelined, special-purpose integrated-circuit implementation of a particular video codec provides, according to embodiments of the present invention, a cost-effective video-codec computational engine that provides an extremely large computational bandwidth with relatively low power consumption and low-latency for decompression and compression of compressed video signals and raw video signals, respectively.

18 Claims, 64 Drawing Sheets

(56) References Cited

OTHER PUBLICATIONS

Shih-Hao Wang et al: "A platform-based MPEG-4 advanced video coding (AVC) decoder with block level pipelining" Information, Communications and Signal Processing, 2003 and Fourth Pac IFIC Rim Conference on Multimedia. Proceedings of The 2003 Joint Confe Rence of the Fourth International Conference on Singapore Dec. 15-18, 2003, Piscataway, NJ, USA,IEEE LNKD-DO, vol. 1, Dec. 15, 2003, pp. 51-55, XP010701872 ISBN: 978-0-7803-8185-8.

Cheng Peng et al: "HD Video Encoding with DSP and FPGA Partitioning" Internet Citation Jul. 10, 2007, pp. 1-8, XP007913353 Retrieved from the Internet:URL:http://focus.ti.com/lit/wp/spry103/spry103.pdf [retrieved on Jun. 9, 2010].

Jian Wang et al: "Implementing high definition video codec on TI DM6467 SOC" SOC Conference, 2008 IEEE International, IEEE, Piscataway, NJ, USA LNKDD0I:I0.II09/S0CC.2008.4641509, Sep. 17, 2008, pp. 193-196, XP031345843 ISBN: 978-1-4244-2596-9.

"Video design guide. Products to complete the video signal chain" Internet Citation Sep. 1, 2009, p. 22PP, XP007913342 Retrieved from the Internet: URL:http://www.maxim-ic.com/design_guides/en/VIDEO_26. pdf [retrieved on Jun. 4, 2010].

Samar Yazdani et al: "Reconfiguralbe multimedia accelerator for mobile systems" SOC Conference, 2008 IEEE International, IEEE, Piscataway, NJ, USA, Sep. 17, 2008, pp. 287-290, XP031345863 ISBN: 978-1-4244-2596-9.

\* cited by examiner

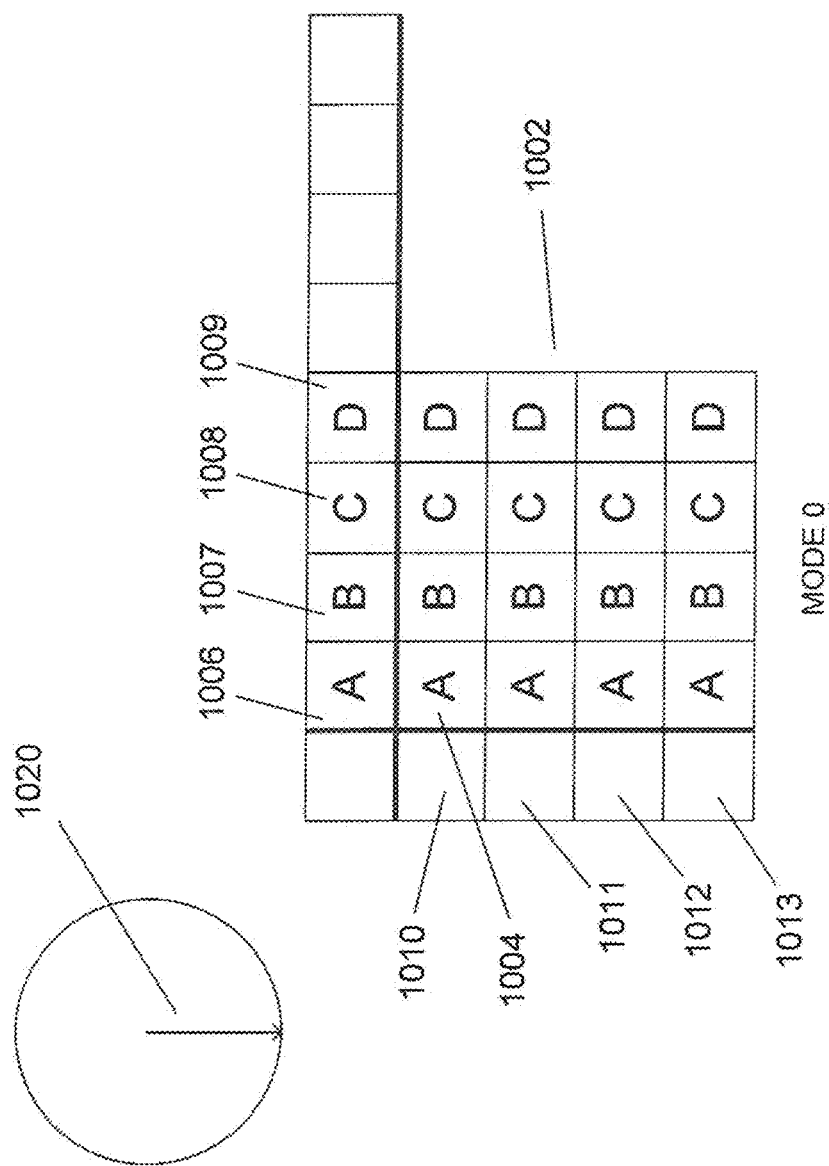

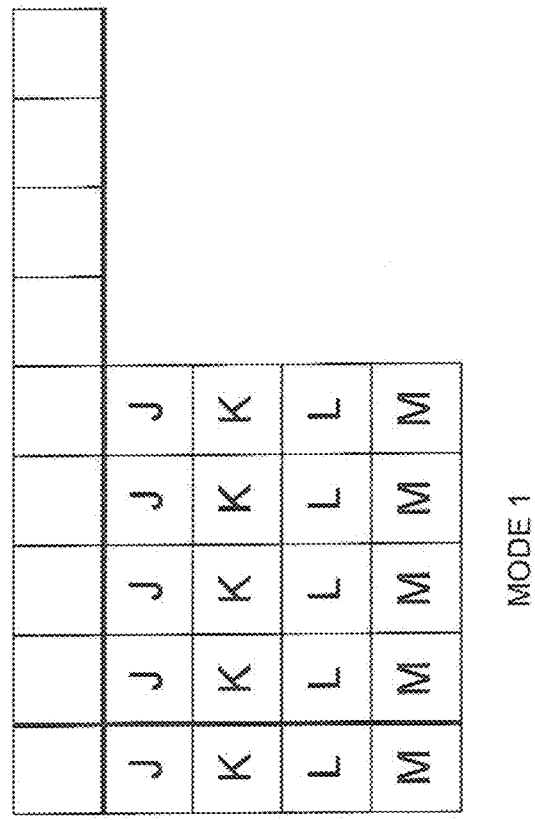
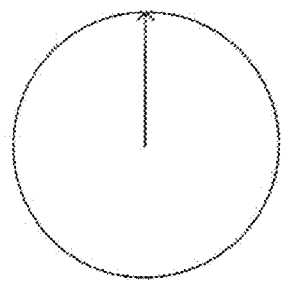
Figure 10B

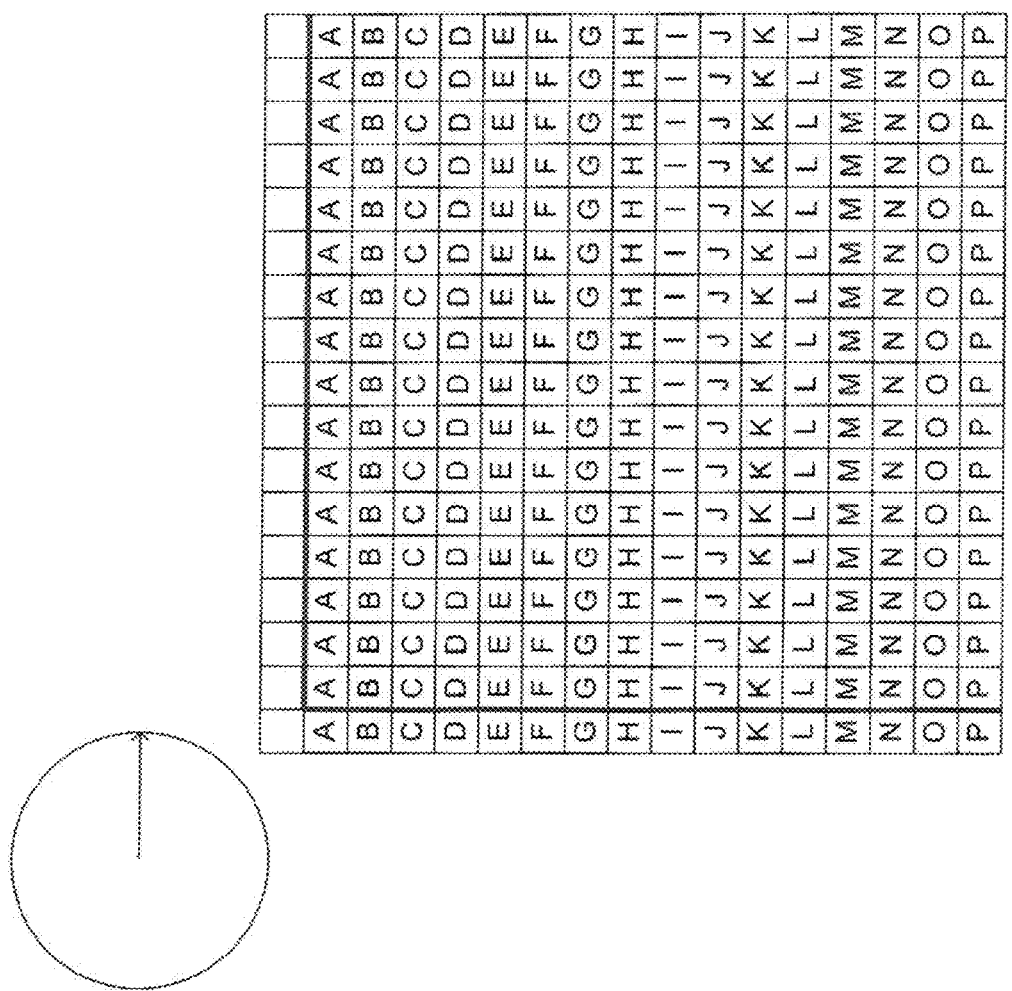

Figure 11C

MODE 2

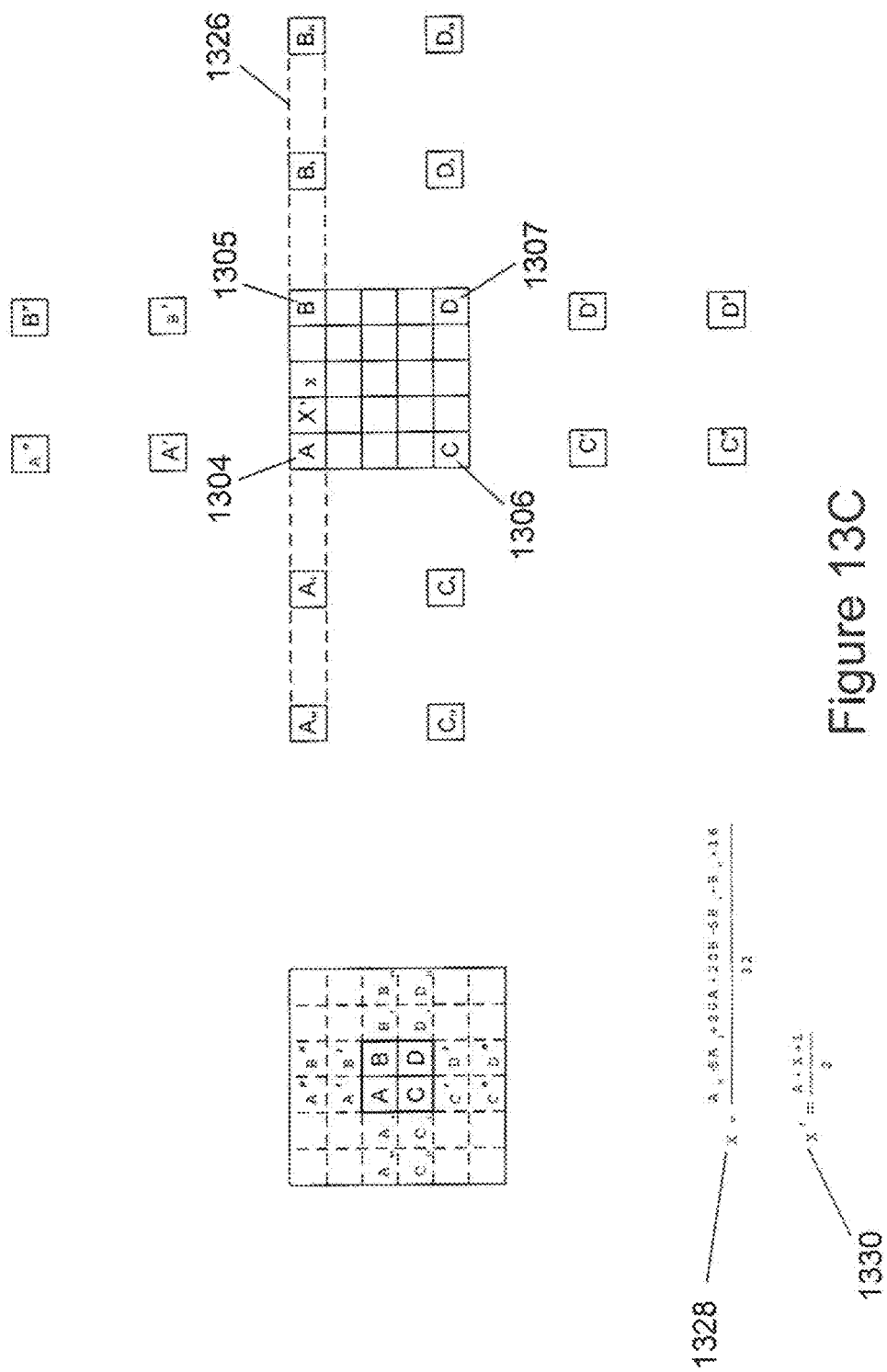

1802

$X = 4 \times 4$ residual block $DCT(X) \rightarrow Y =$ transformed $4 \times 4$ block of coefficients $Y = A \times A^T$ where $A = \begin{bmatrix} a & a & a & a \\ b & c & -c & -b \\ a & -a & -a & a \\ c & -b & b & -c \end{bmatrix}$

1806

$a = \dfrac{1}{2}$ $b = \left(\sqrt{\dfrac{1}{2}}\right)\cos\dfrac{\Pi}{8}$ $c = \left(\sqrt{\dfrac{1}{2}}\right)\cos\left(\dfrac{3\Pi}{8}\right)$

1804

$Y = C \times C^T \otimes E$ where $C = \begin{bmatrix} 1 & 1 & 1 & 1 \\ 1 & d & -d & -1 \\ 1 & -1 & -1 & 1 \\ d & -1 & 1 & -d \end{bmatrix}$ and $E = \begin{bmatrix} a^2 & ab & a^2 & ab \\ ab & b^2 & ab & b^2 \\ a^2 & ab & a^2 & ab \\ ab & b^2 & ab & b^2 \end{bmatrix}$

1808

$d = \dfrac{c}{b} = 0.414$ 1810  1812 approximation: $a = \dfrac{1}{2}$ $b = \sqrt{\dfrac{2}{5}}$ $d = \dfrac{1}{2}$

1814

$Y = C^* X C^{*T} \otimes E^*$ where $C^* = \begin{bmatrix} 1 & 1 & 1 & 1 \\ 2 & 1 & -1 & -2 \\ 1 & -1 & -1 & 1 \\ 1 & -2 & 2 & -1 \end{bmatrix}$ and $E^* = \begin{bmatrix} a^2 & \dfrac{ab}{2} & a^2 & \dfrac{ab}{2} \\ \dfrac{ab}{2} & \dfrac{b^2}{4} & \dfrac{ab}{2} & \dfrac{b^2}{4} \\ a^2 & \dfrac{ab}{2} & a^2 & \dfrac{ab}{2} \\ \dfrac{ab}{2} & \dfrac{b^2}{4} & \dfrac{ab}{2} & \dfrac{b^2}{4} \end{bmatrix}$

1818

$X = C'^T (Y \otimes E') C'$ where $C' = \begin{bmatrix} 1 & 1 & 1 & 1 \\ 1 & \dfrac{1}{2} & -\dfrac{1}{2} & -1 \\ 1 & -1 & -1 & 1 \\ \dfrac{1}{2} & -1 & 1 & -\dfrac{1}{2} \end{bmatrix}$ and $E' = \begin{bmatrix} a^2 & ab & a^2 & ab \\ ab & b^2 & ab & b^2 \\ a^2 & ab & a^2 & ab \\ ab & b^2 & ab & b^2 \end{bmatrix}$

| PROCESSING ELEMENT | ARITHMETIC OPERATIONS PER MACROBLOCK (ONE PIPELINE CYCLE) | PE MINOR CLOCK CYCLES | COMMENTS |
|---|---|---|---|
| INTRA PREDICTION | 1,407 | 15 | 16X16 DC : 34 addit. 16x16 Plane 22 + 3x256 addit 22 mult 8x8 Chroma 12 + 3x64 addit + 12 mult 4x4 DC 9 addit 4x4 6 modes ~16x3.5= 6x56. Total 1,373 addit 34 mult. Needs 15 minor clock cycles to compute macroblock. |
| INTER PREDICTION | 11,776 | 16 | 72 FIR instances: 4 mult + 6 addit each = 720. 16 addit. Total for 4x4 block = 736. |
| RESIDUAL | 256 | 1 | |
| DIRECT INTEGER TRANSFORM | 5,120 | 16 | 320 addit/subtract/shift per 4x4 luma. Needs 16 minor clock cycles to compute macroblock. |
| QUANTIZE AND SCALE | 48 | 16 | |
| DEQUANTIZE AND SCALE | 32 | 16 | |
| INVERSE INTEGER TRANSFORM | 5,120 | 16 | 320 addit/subtract/shift per 4x4 luma. Needs 16 minor clock cycles to compute macroblock. |

Figure 43

```
4402
        VHDL Object definitions
    CONSTANT    nMBmax : NATURAL := 8160;  -- Maximum number of macroblocks
    SUBTYPE     pixelTYPE        IS std_logic_vector ( 7 DOWNTO 0) ;
    SUBTYPE     mvTYPE           IS std_logic_vector (14 DOWNTO 0) ;
    TYPE        Luma16x16ARRAY   IS ARRAY (0 TO 15, 0 TO 15)  OF pixelTYPE;
    TYPE        Luma4x4ARRAY     IS ARRAY (0 TO  3, 0 TO  3)  OF pixelTYPE;
    TYPE        Luma9x9ARRAY     IS ARRAY (0 TO  8, 0 TO  8)  OF pixelTYPE;
    TYPE        Luma21x21ARRAY   IS ARRAY (0 TO 20, 0 TO 20)  OF pixelTYPE;
    TYPE        Chroma8x8ARRAY   IS ARRAY (0 TO  7, 0 TO  7)  OF pixelTYPE;
    TYPE        pixel1DARRAY     IS ARRAY (NATURAL RANGE <>) OF pixelTYPE;

TYPE        MotionVectorRCD  IS RECORD
                        x        : mvTYPE;
                        y        : mvTYPE;
                        ref      : NATURAL 0 TO 15;  -- Ref frame index
                     END RECORD;

TYPE        ParameterRCD     IS RECORD
                        MajorMode    : NATURAL 0 TO 2;  -- I16x16, I4x4, P
                        MinorMode    : NATURAL 0 TO 8;  -- Up to 9 modes
                        MBAddress    : NATURAL 0 TO nMBmax - 1;
                        etc, etc, etc
                     END RECORD;

4404
        Motion Estimation

ENTITY MotionEstimation IS PORT (                              4408
                reset        : IN std_logic;      -- Reset circuit
                clk          : IN std_logic;      -- Short clock      4406       4410
                pclk         : IN std_logic;      -- Long clock
                start        : IN std_logic;      -- Start signal
                InterLumaBlk : IN pixel16x16TYPE; -- Current frame luma from cache
                ReferLumaBlk : IN pixel16x16TYPE; -- Reference frame luma from cache   4412
                skip         : OUT std_logic;     -- Skip macroblock result
                invalidvec   : OUT std_logic;     -- Motion estimation failed   4413
                MVector      : OUT MotionVectorRCD; -- Output motion vector to cache
                done         : OUT std_logic;    -- Done signal
    END         MotionEstimation;                                                1416
                                                                    1414
```

Figure 44A

Intra Prediction

```
ENTITY IntraPrediction IS PORT (
        reset       : IN std_logic;              -- Reset circuit
        clk         : IN std_logic;              -- Short clock
        pclk        : IN std_logic;              -- Long clock
        start       : IN std_logic;              -- Start signal
        rawLuma     : IN pixel16x16TYPE;         -- Raw frame luma from cache for opt
        rawChroma   : IN pixel8x8TYPE;           -- Raw frame chroma from cache for opt
        paramAbove  : IN ParameterRCD;           -- Parameter data, above MB from cache
        paramLeft   : IN ParameterRCD;           -- Parameter data, left MB from cache
        vertvec     : IN pixel1DARRAY (0 TO 16); -- Vertical left neighbor from cache
        horivec     : IN pixel1DARRAY (0 TO 15); -- Horizontal above neighbor from cache
        intraout    : OUT pixel16x16TYPE;        -- Intra predicted luma MB result
        intraout    : OUT pixel8x8TYPE;          -- Intra predicted chroma MB result
        paramout    : OUT ParameterRCD;          -- Parameter result out to cache
        done        : OUT std_logic);            -- Done signal
END     IntraPrediction;
```

Inter Prediction

Note: In order to calculate the quarter and eighth pel interpolations, the inter prediction processing element requires additional pixels around the central macroblock or chroma block pixel arrays. In the case of luma, three additional pixels are required left and above, and two additional pixels are required right and below. In the case of chroma, one additional pixel is required right and below. This adds up to a 21x21 pixel matrix for a 16x16 luma block, and a 9x9 pixel matrix for an 8x8 chroma block.

```
ENTITY InterPrediction IS PORT (
        reset       : IN std_logic;              -- Reset circuit
        clk         : IN std_logic;              -- Short clock
        pclk        : IN std_logic;              -- Long clock
        start       : IN std_logic;              -- Start signal
        ReferLuma   : IN pixel21x21TYPE;         -- Reference frame luma from cache
        ReferChroma : IN pixel19x9TYPE;          -- Reference frame chroma from cache
        Mvector     : IN MotionVectorRCD;        -- Input motion vector from motion est
        paramAbove  : IN ParameterRCD;           -- Parameter data, above MB from cache
        paramLeft   : IN ParameterRCD;           -- Parameter data, left MB from cache
        interout    : OUT pixel16x16TYPE;        -- Inter predicted luma MB result
        interout    : OUT pixel8x8TYPE;          -- Inter predicted chroma MB result
        paramout    : OUT ParameterRCD;          -- Parameter result out to cache
        done        : OUT std_logic);            -- Done signal
END     InterPrediction;
```

Figure 44B

Residual

```
ENTITY Residual IS PORT (
    reset           : IN std_logic;           -- Reset circuit
    pclk            : IN std_logic;           -- Long clock
    start           : IN std_logic;           -- Start signal
    RawLuma         : IN pixel16x16TYPE       -- Raw luma from cache
    RawChroma       : IN pixel8x8TYPE;        -- Raw chroma from cache
    PredictLuma     : IN pixel16x16TYPE;      -- Predicted luma
    PredictChroma   : IN pixel8x8TYPE;        -- Predicted chroma
    ResidLumaout    : OUT pixel16x16TYPE;     -- Residual luma out
    ResidChromaout  : OUT pixel8x8TYPE;       -- Residual chroma out
    done            : OUT std_logic);         -- Done signal
END Residual;
```

Direct Integer Transform

```
ENTITY DirectIntegerTransform IS PORT (
    reset      : IN std_logic;           -- Reset circuit
    pclk       : IN std_logic;           -- Long clock
    start      : IN std_logic;           -- Start signal
    LumaIn     : IN pixel16x16TYPE       -- Luma input
    ChromaIn   : IN pixel8x8TYPE;        -- Chroma input
    paramIn    : IN ParameterRCD;        -- Parameter data
    LumaOut    : OUT pixel16x16TYPE;     -- Transformed luma out
    ChromaOut  : OUT pixel8x8TYPE;       -- Transformed chroma out
    done       : OUT std_logic);         -- Done signal
END DirectIntegerTransform;
```

Inverse Integer Transform

```
ENTITY InverseIntegerTransform IS PORT (
    reset      : IN std_logic;           -- Reset circuit
    pclk       : IN std_logic;           -- Long clock
    start      : IN std_logic;           -- Start signal
    LumaIn     : IN pixel16x16TYPE       -- Dequantized luma input
    ChromaIn   : IN pixel8x8TYPE;        -- Dequantized chroma input
    LumaPred   : IN pixel16x16TYPE;      -- Predicted luma input
    ChromaPred : IN pixel8x8TYPE;        -- Predicted chroma input
    paramIn    : IN ParameterRCD;        -- Parameter data
    LumaOut    : OUT pixel16x16TYPE      -- Inverse transformed luma out
    ChromaOut  : OUT pixel8x8TYPE;       -- Inverse transformed chroma out
    done       : OUT std_logic);         -- Done signal
END InverseIntegerTransform;
```

Figure 44C

Quantize and Scale

```
ENTITY QuantizeScale IS PORT (
    reset       :   IN std_logic;           -- Reset circuit
    pclk        :   IN std_logic;           -- Long clock
    start       :   IN std_logic;           -- Start signal
    LumaIn      :   IN pixel16x16TYPE;      -- Luma input
    ChromaIn    :   IN pixel8x8TYPE;        -- Chroma input
    paramIn     :   IN ParameterRCD;        -- Parameter data
    LumaOut     :   OUT pixel16x16TYPE;     -- Scaled luma out
    ChromaOut   :   IN pixel8x8TYPE;        -- Scaled chroma out
    done        :   OUT std_logic);         -- Done signal
END     QuantizeScale;
```

Dequantize and Descale

```
ENTITY DeQuantizeDeScale IS PORT (
    reset       :   IN std_logic;           -- Reset circuit
    pclk        :   IN std_logic;           -- Long clock
    start       :   IN std_logic;           -- Start signal
    LumaIn      :   IN pixel16x16TYPE;      -- Luma input
    ChromaIn    :   IN pixel8x8TYPE;        -- Chroma input
    paramIn     :   IN ParameterRCD;        -- Parameter data
    LumaOut     :   OUT pixel16x16TYPE;     -- Descaled luma out
    ChromaOut   :   OUT pixel8x8TYPE;       -- Descaled chroma out
    done        :   OUT std_logic);         -- Done signal
END     DeQuantizeDeScale;
```

Deblocking Filter

```
ENTITY DeBlockingFilter IS PORT (
    reset       :   IN std_logic;           -- Reset circuit
    clk         :   IN std_logic;           -- Short clock
    pclk        :   IN std_logic;           -- Long clock
    start       :   IN std_logic;           -- Start signal
    LumaThis    :   IN pixel16x16TYPE;      -- Luma input from cache
    ChromaThis  :   IN pixel8x8TYPE;        -- Chroma input from cache
    LumaAbove   :   IN pixel16x16TYPE;      -- Luma above from cache
    ChromaAbove :   IN pixel8x8TYPE;        -- Chroma above from cache
    LumaLeft    :   IN pixel16x16TYPE;      -- Luma left from cache
    ChromaLeft  :   IN pixel8x8TYPE;        -- Chroma left from cache
    paramThis   :   IN ParameterRCD;        -- Parameter data, from cache
    LumaOut     :   OUT pixel16x16TYPE;     -- Filtered luma result to cache
    ChromaOut   :   OUT pixel8x8TYPE;       -- Filtered chroma result to cache
    done        :   OUT std_logic);         -- Done signal
END     DeBlockingFilter;
```

Figure 44D

Entropy Encoder

```
ENTITY EntropyEncoder IS PORT (
    reset       :   IN std_logic;                       -- Reset circuit
    clk         :   IN std_logic;                       -- Short clock
    pclk        :   IN std_logic;                       -- Long clock
    dataclk     :   IN std_logic;                       -- Data clock (to bring out NAL units)
    start       :   IN std_logic;                       -- Start signal
    LumaThis    :   IN pixel16x16TYPE;                  -- Transformed Quantized luma input
    ChromaThis  :   IN pixel8x8TYPE;                    -- Transformed Quantized chroma input
    Mvector     :   IN MotionVectorRCD;                 -- Input motion vector from cache
    paramThis   :   IN ParameterRCD;                    -- Parameter data, from cache
    NALByteOut  :   OUT std_logic_vector (15 DOWNTO 0); -- NAL byte data out
    done        :   OUT std_logic);                     -- Done signal
END EntropyEncoder;
```

Entropy Decoder

```
ENTITY EntropyDecoder IS PORT (
    reset       :   IN std_logic;                       -- Reset circuit
    clk         :   IN std_logic;                       -- Short clock
    pclk        :   IN std_logic;                       -- Long clock
    dataclk     :   IN std_logic;                       -- Data clock (to bring in NAL units)
    start       :   IN std_logic;                       -- Start signal
    NALByteIn   :   IN std_logic_vector (15 DOWNTO 0);  -- NAL byte data input
    LumaThis    :   OUT pixel16x16TYPE;                 -- Transformed Quantized luma output
    ChromaThis  :   OUT pixel8x8TYPE;                   -- Transformed Quantized chroma output
    Mvector     :   OUT MotionVectorRCD;                -- Motion vector out
    paramThis   :   OUT ParameterRCD;                   -- Parameter data out
    done        :   OUT std_logic);                     -- Done signal
END EntropyDecoder;
```

Figure 44E

PARALLEL, PIPELINED, INTEGRATED-CIRCUIT IMPLEMENTATION OF A COMPUTATIONAL ENGINE

CROSS-REFERENCE TO RELATED APPLICATION

This application is a continuation-in-part of U.S. application Ser. No. 12/319,750, filed Jan. 12, 2009 now abandoned.

TECHNICAL FIELD

The present invention is related to efficient methods and computational devices for carrying out complex computations and, in particular, to the design and implementation of highly parallel, pipelined, integrated-circuit computational engines, directed by efficient problem decomposition, including integrated-circuit video codecs.

BACKGROUND OF THE INVENTION

Computing machinery is undergoing rapid evolution. Early electronic computers were generally entirely sequential processing machines, executing a stream of instructions, one-by-one, that together compose a computer program. For many years, electronic computers generally included a single main processor which was capable of rapidly executing a relatively small set of simple instructions, including memory-fetch, memory-store, arithmetic, and logical instructions. A computational task was addressed by programming a solution to the task as a set of instructions and then executing the program on a single-processor computer system.

Relatively early in the evolution of electronic computers, various ancillary and support tasks began to be moved, away from the main processor, to specialized auxiliary processing components. As one example, separate I/O controllers were developed for off-loading much of the repetitive and computational-bandwidth-consuming tasks associated with exchanging information between main memory and various external devices, including mass-storage devices, communications devices, display devices, and user-input devices. This incorporation of multiple processing elements into single-main-processor computer system was the beginning of a trend towards increasing parallelism in computing.

Parallel computation is currently a dominant trend in the design of modern computational machinery. At one extreme, individual processor cores often provide for concurrent, parallel execution of multiple instruction streams, and provide for assembly-line-like, concurrent execution of multiple instructions. Most computers, including personal computers, now incorporate at least two, and often many more, processor cores within each single integrated circuit. Each processor core can relatively independently execute multiple instruction streams. Electronic computer systems may contain multiple multi-core processors, and may be aggregated together into vast distributed computing networks comprising tens to thousands to hundreds of thousands of discrete computer systems that intercommunicate with one another and that each executes one or more separable portions of a large, distributed computational task.

As computers have evolved towards parallel and massively parallel computational systems, many of the most difficult and vexing problems associated with parallel computing have been found to be associated with decomposing large computational tasks into relatively independent subtasks, each of which can be carried out by a different processing entity. When problems are not properly decomposed, or when problems cannot be decomposed, for parallel execution, then employing parallel computer machinery often provides little or no benefit, and, in worst cases, may actually result in slower execution than can be obtained by a traditional software implementation executed on a single-processor computer system. When multiple computational entities contend for shared resources, or depend on computational results generated concurrently by other processing entities, enormous computational and communications resources may be expended to manage the parallel operation of the multiple computational entities. Often, the communications and computational overheads may far outweigh the benefits of a parallel-computing approach carried out on multiple processors or other computational entities. Furthermore, there may be significant financial costs involved with parallel computing, and also significant costs in power consumption and in heat dissipation.

Thus, although parallel computation appears to be the logical approach to efficient computing of many computational tasks, judging from biological systems and the evolutionary trends already encountered in the short time span of the evolution of electronic computers, parallel computing is also associated with many complexities, costs, and disadvantages. While many problems may theoretically benefit from a parallel-computing approach, the techniques and hardware for parallel computing that are currently available often cannot provide cost-effective solutions for many computational problems, particularly for complex computations that need to be carried out in real time within devices constrained by size constraints, heat-dissipation constraints, power-consumption constraints, and cost constraints. For this reason, computer scientists, electrical engineers, researchers and developers in many computationally oriented fields, manufacturers and vendors of electronic devices and electronic computers, and, ultimately, users of electronic devices and electronic computers all recognize the need for continued development of new approaches to efficient implementation of parallel computation engines for solving practical problems.

SUMMARY OF THE INVENTION

Embodiments of the present invention are directed to parallel, pipelined, integrated-circuit implementations of computational engines designed to solve complex computational problems. One embodiment of the present invention is a family of video encoders and decoders ("codecs") that can be incorporated within cameras, cell phones, and other electronic devices for encoding raw video signals into compressed video signals for storage and transmission, and for decoding compressed video signals into raw video signals for output to display devices. A highly parallel, pipelined, special-purpose integrated-circuit implementation of a particular video codec provides, according to embodiments of the present invention, a cost-effective video-codec computational engine that provides an extremely large computational bandwidth with relatively low power consumption and low-latency for decompression and compression of compressed video signals and raw video signals, respectively.

BRIEF DESCRIPTION OF THE DRAWINGS

FIGS. 10A-I illustrate the nine 4×4 luma-block intra-prediction modes.

Figure 11C:
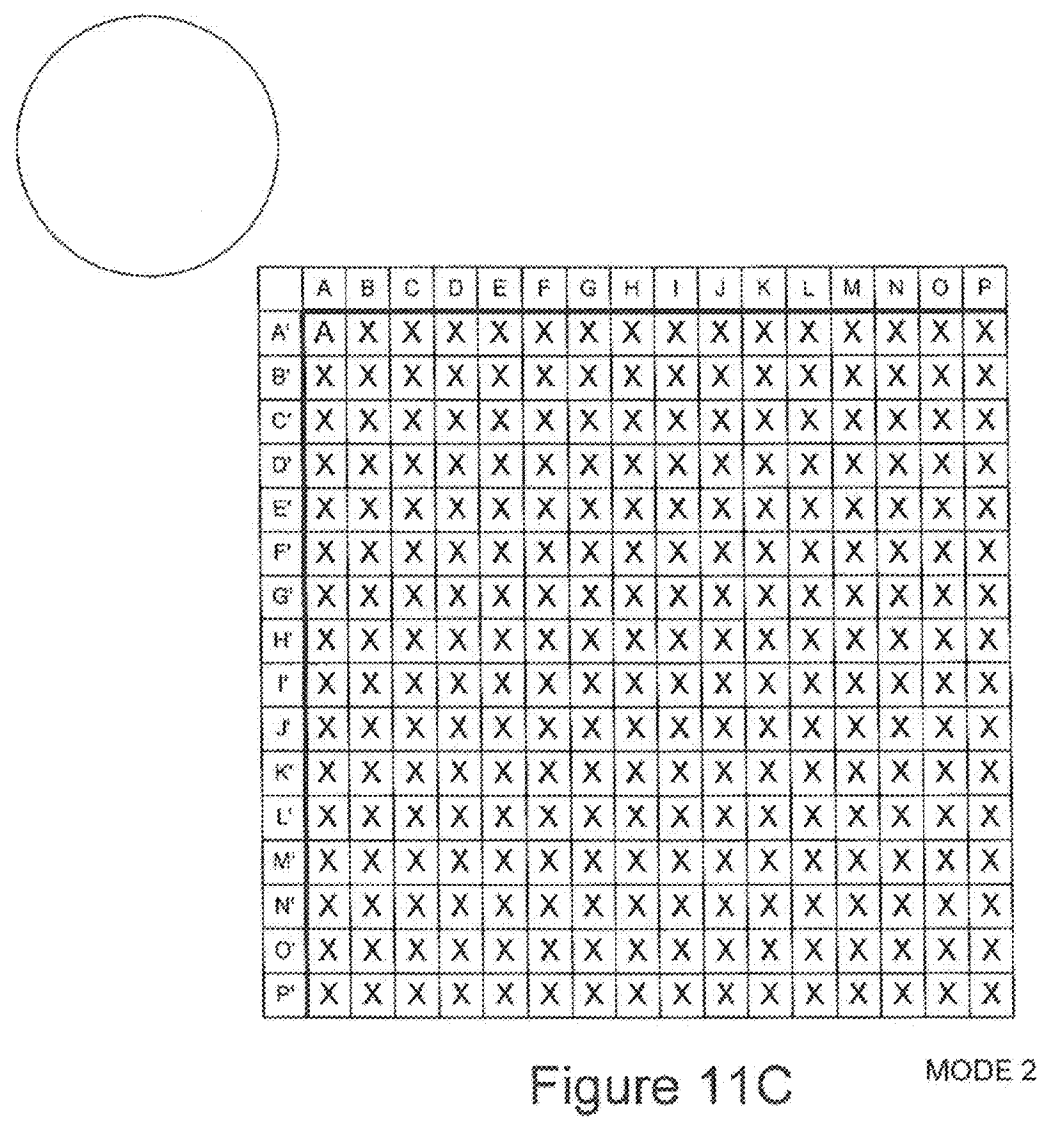

FIGS. 11A-11D illustrate, using similar illustration conventions as used in FIGS. 10A-I, the four modes for intra prediction of 16×16 luma blocks.

FIGS. 13A-D illustrate the interpolation process used to compute pixel values for blocks, within a search space of a reference frame, that can be thought of as occurring at fractional coordinates.

FIG. 18 provides derivation of the integer transform and inverse integer transform employed in H.264 video compression and video decompression, respectively.

FIG. 43 provides a table that indicates an example of the overall computational processing carried out by each of certain of the processing elements of a video codec that represents one embodiment of the present invention.

FIGS. 44A-E provide high-level VHDL definitions of the various processing elements in the single-integrated-circuit implementation of a video codec, according to one embodiment of the present invention, as shown in FIG. 33A.

DETAILED DESCRIPTION OF THE INVENTION

Figure 1:
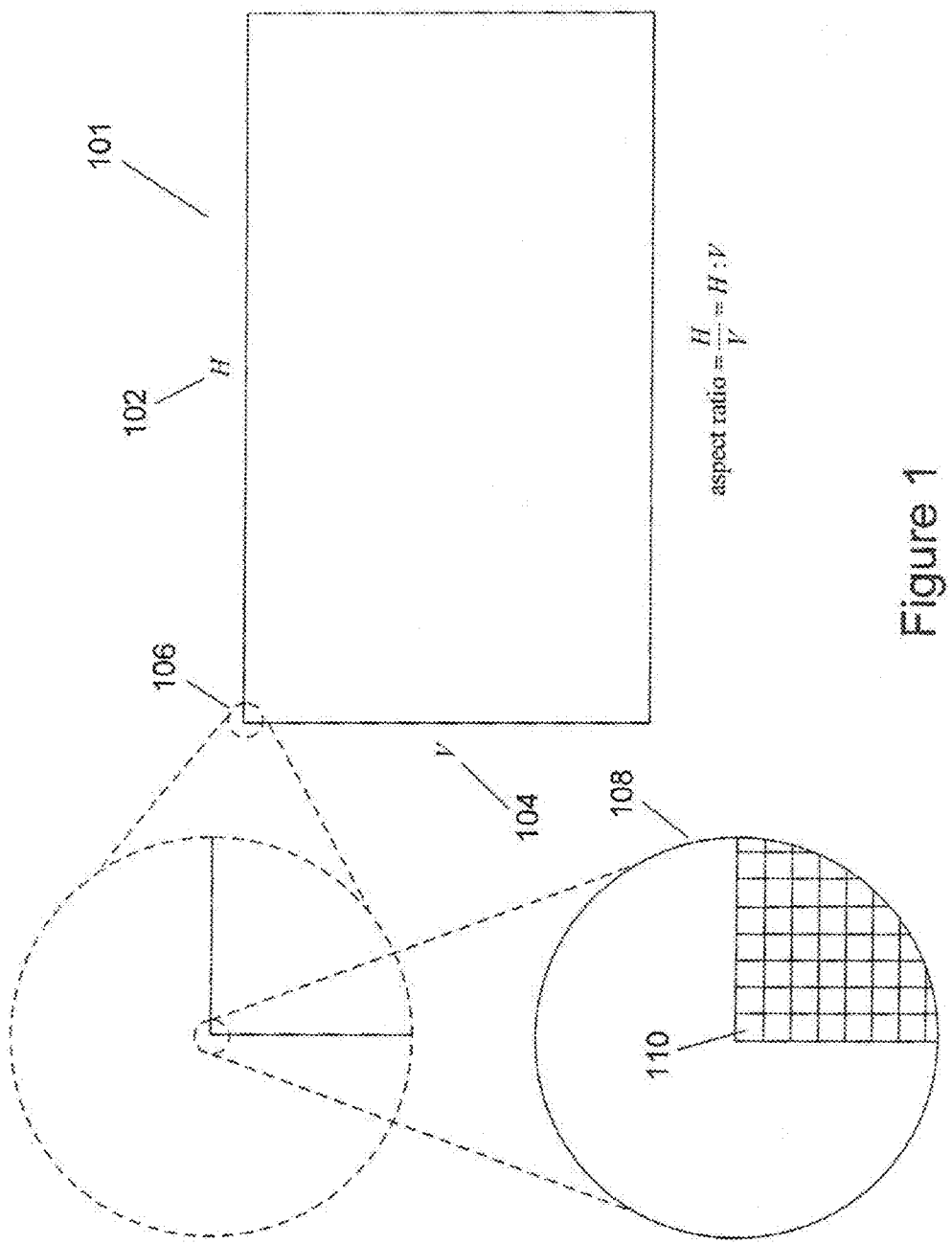
FIG. 1 illustrates a digitally-encoded image.

Embodiments of the present invention are directed to providing cost-effective computational engines to carry out complex computational tasks with low power consumption, low heat-dissipation requirements, large computational bandwidths, and low latency for task execution. Computational engines are implemented as individual integrated circuits, or chips, that feature highly parallel computation provided by many concurrently operating processing elements according to the present invention. Effective use of the currently executing processing elements is made possible by a suitable decomposition of a complex computational task, efficient access to shared information and data objects within the integrated circuit, and efficient, hierarchical control of processing tasks and subtasks.

The processing elements access computational objects on which they operate via an object bus that interconnects processing elements with an on-board object cache. The on-board object cache is, in turn, connected or coupled through an object memory controller to a larger object memory that, in certain embodiments of the present invention, may be implemented as an external component. Control of the computation implemented by the computational engines of the present invention is provided, in certain embodiments of the present invention, by a micro-processor controller, according to a relatively low-frequency clock, with one or more higher-frequency clock signals controlling processing within processing elements. The processing elements are logically arranged, in certain embodiments of the present invention, into an assembly-line-like pipeline, with computational objects generally processed sequentially by the processing elements along the pipeline, moving between processing elements and/or back and forth from the object cache. Processing-element computation, cache access, memory access, and data transfer are organized around computational objects, rather than arbitrarily-sized data units, such as bytes or words.

A large number of different computational tasks may be addressed by the design and development of highly parallel integrated-circuit implementations of computational engines according to embodiments of the present invention. As one specific embodiment of the present invention, a parallel, pipelined, integrated-circuit implementation of a video codec is discussed, below. Various alternative embodiments of the integrated-circuit implementation of the video codec may be employed in a wide variety of electronic devices, including mobile phones equipped with video cameras, digital video cameras, personal computers, surveillance equipment, remote sensors, aircraft and spacecraft, and a wide variety of other types of equipment. It is emphasized here, and throughout the following discussion, that the video-codec implementations are specific examples of the many different parallel, pipelined, integrated-circuit computational engines that represent embodiments of the present invention.

The described parallel integrated-circuit implementation of a video codec is a relatively complex device that is designed to carry out a complex computational task. The following discussion is organized as three subsections: (1) The H.264 Compressed-Video-Signal-Decompression Standard; (2) Principles of Parallel Integrated-Circuit Design for Addressing Complex Computational Tasks According to the Present Invention; and (3) An H.264 Video Codec Implemented as a Single Integrated Circuit. It should be noted that while the examples herein are primarily presented using the H.264 standard, it should be understood that these are just examples and the invention is in no way restricted to H.264 implementations. In the first subsection, below, the computational task carried out by a specific example of a parallel, pipelined, integrated-circuit computational engine is described, in overview. The specific described embodiment is a video-codec that compresses raw video signals and decompresses compressed video signals according to the H.264, or MPEG-4 AVC, compressed-video-signal decompression standard. For those readers already familiar with the H.264 compressed-video-signal-decomposition standard, the first subsection can be skipped. In a second part of the discussion, principles of parallel integrated-circuit design according to embodiments of the present invention, which can be applied to any of many numerous complex computational tasks, are described. Finally, in a third section, an H.264 video codec implemented as a single integrated circuit, which represents one specific embodiment of the present invention, is described in detail.

Subsection 1

The H.264
Compressed-Video-Signal-Decompression Standard

This first subsection provides an overview of the H.264 compressed-video-signal decompression standard. This subsection provides a description of the computational problem addressed by a specific embodiment of a parallel, pipelined, integrated-circuit computational engine that represents an embodiment of the present invention. Those readers familiar with H.264 may skip this first subsection, and continue with the second subsection, below.

FIG. 1 illustrates a digitally-encoded image. A digitally-encoded image can be a still photograph, a video frame, or any of various graphical objects. In general, a digitally-encoded image comprises a sequence of digitally encoded numbers that together describe a rectangular image 101. The rectangular image has a horizontal dimension 102 and a vertical dimension 104, the ratio of which is referred to as the "aspect ratio" of the image.

A digitally-encoded image is decomposed into tiny display units, referred to as "pixels." In FIG. 1, a small portion 106 of the left, upper corner of a displayed image is shown twice magnified. Each magnification step is a 12-fold magnification, producing a final 144-fold magnification of a tiny portion of the left upper corner of the digitally-encoded image 108. At 144-fold magnification, the small portion of the displayed image is seen to be divided into small squares by a rectilinear coordinate grid, each small square, such as square 110, corresponding to, or representing, a pixel. A video image is digitally encoded as a series of data units, each data unit describing the light-emission characteristics of one pixel within the displayed image. The pixels can be thought of as cells within a matrix, with each pixel location described by a horizontal coordinate and a vertical coordinate. The pixels can alternatively be considered to be one long linear sequence of pixels, produced in raster-scan order, or in some other predefined order. In general, a logical pixel in a digitally-encoded image is relatively directly translated into light emission from one or several tiny display elements of a display device. The number that digitally encodes the value of each pixel is translated into one or more electronic voltage signals to control the display unit to emit light of a proper hue and intensity so that, when all of the display units are controlled according to the pixel values encoded in a digitally-encoded image, the display device faithfully reproduces the encoded image for viewing by a human viewer. Digitally-encoded images may be displayed on cathode-ray-tube, LCD, or plasma display devices incorporated within televisions, computer display monitors, and other such light-emitting display devices, may be printed onto paper or synthetic films by computer printers, may be transmitted through digital communications media to remote devices, may be stored on mass-storage devices and in computer memories, and may be processed by various image-processing application programs.

Figure 2:
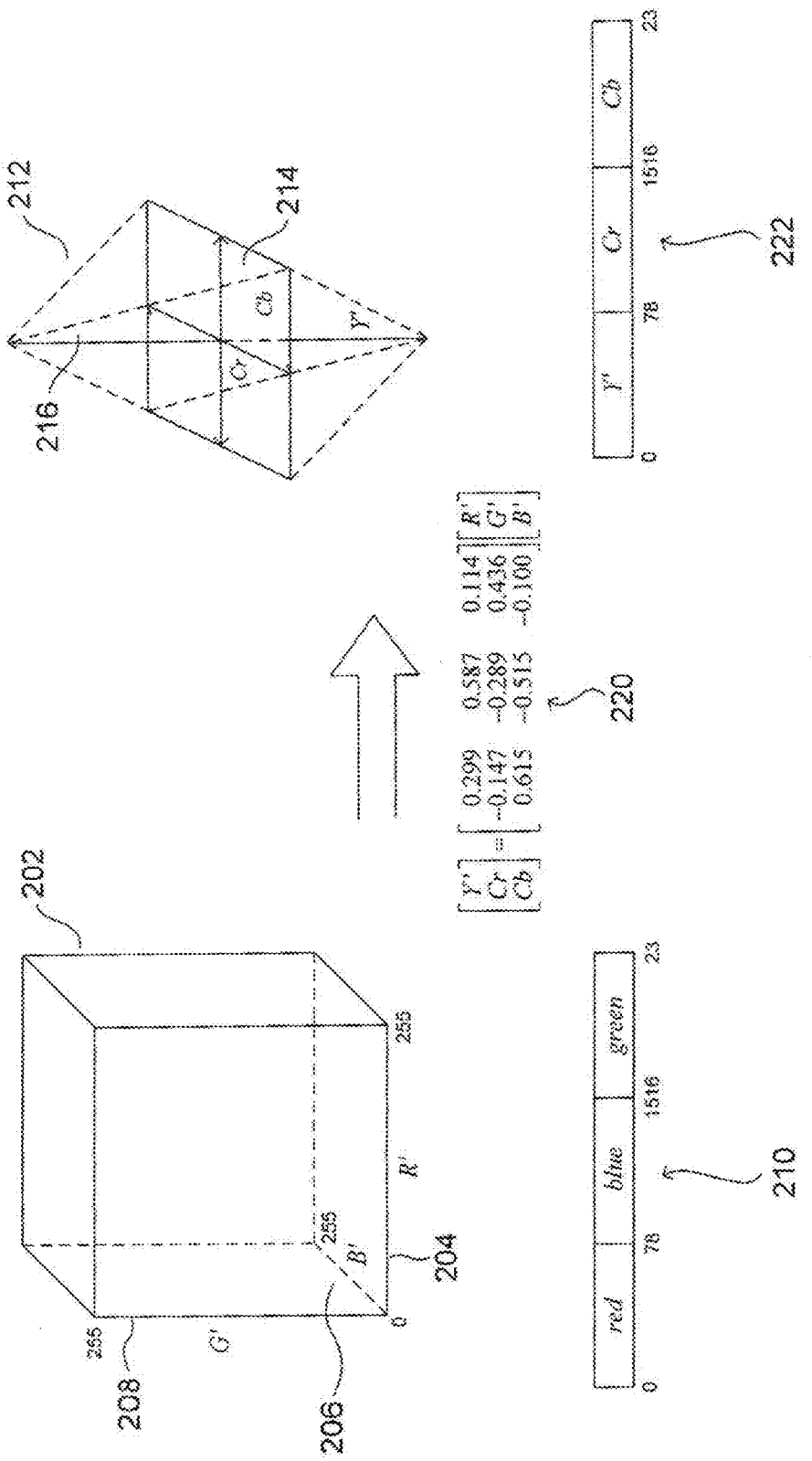
FIG. 2 illustrates two different pixel-value encoding methods according to two different color-and-brightness models.

There are various different methods and standards for encoding color and emission-intensity information into a data unit. FIG. 2 illustrates two different pixel-value encoding methods according to two different color-and-brightness models. A first color model 202 is represented by a cube. The volume within the cube is indexed by three orthogonal axes, the R' axis 204, the B' axis 206, and the G' axis 208. In this example, each axis is incremented in 256 increments, corresponding to all possible numeric values of an eight-bit byte, with alternative R'G'B' models using a fewer or greater number of increments. The volume of the cube represents all possible color-and-brightness combinations that can be displayed by a pixel of a display device. The R', B', and G' axes correspond to red, blue, and green components of the colored light emitted by a pixel. The intensity of light emission by a display unit is generally a non-linear function of the voltage supplied to the data unit. In the RGB color model, a G-component value of 127 in a byte-encoded G component would direct one-half of the maximum voltage that can be applied to a display unit to be applied to a particular display unit. However, when one-half of the maximum voltage is applied to a display unit, the brightness of emission may significantly exceed one-half of the maximum brightness emitted at full voltage. For this reason, a non-linear transformation is applied to the increments of the RGB color model to produce increments of the R'G'B' color model, so that the scaling is linear with respect to perceived brightness. The encoding for a particular pixel 210 may include three eight-bit bytes, for a total of 24 bits, when up to 256 brightness levels can be specified for each of the red, blue, and green components of the light emitted by a pixel. When a larger number of brightness levels can be specified, a larger number of bits is used to represent each pixel, and when a lower number of brightness levels are specified, a smaller number of bits may be used to encode each pixel.

Although the R'G'B' color model is relatively easy to understand, particularly in view of the red-emitting-phosphor, green-emitting-phosphor, and blue-emitting-phosphor construction of display units in CRT screens, a variety of related, but different, color models are more useful for video-signal compression and decompression. One such alternative color model is the Y'CrCb color model. The Y'CrCb color model can be abstractly represented as a bi-pyramidal volume 212 with a central, horizontal plane 214 containing orthogonal Cb and Cr axes, with the long, vertical axis of the bi-pyramid 216 corresponding to the Y' axis. In this color model, the Cr and Cb axes are color-specifying axes, with the horizontal mid-plane 214 representing all possible hues that can be displayed, and the Y' axis represents the brightness or intensity at which the hues are displayed. The numeric values that specify the red, blue, and green components in the R'G'B' color model can be directly transformed to equivalent Y'CrCb values by a simple matrix transformation 220. Thus, when eight-bit quantities are used to encode the Y', Cr, and Cb components of display-unit emission according to the Y'CrCb color model, a 24-bit data unit 222 can be used to encode the value for a single pixel.

Figure 3:
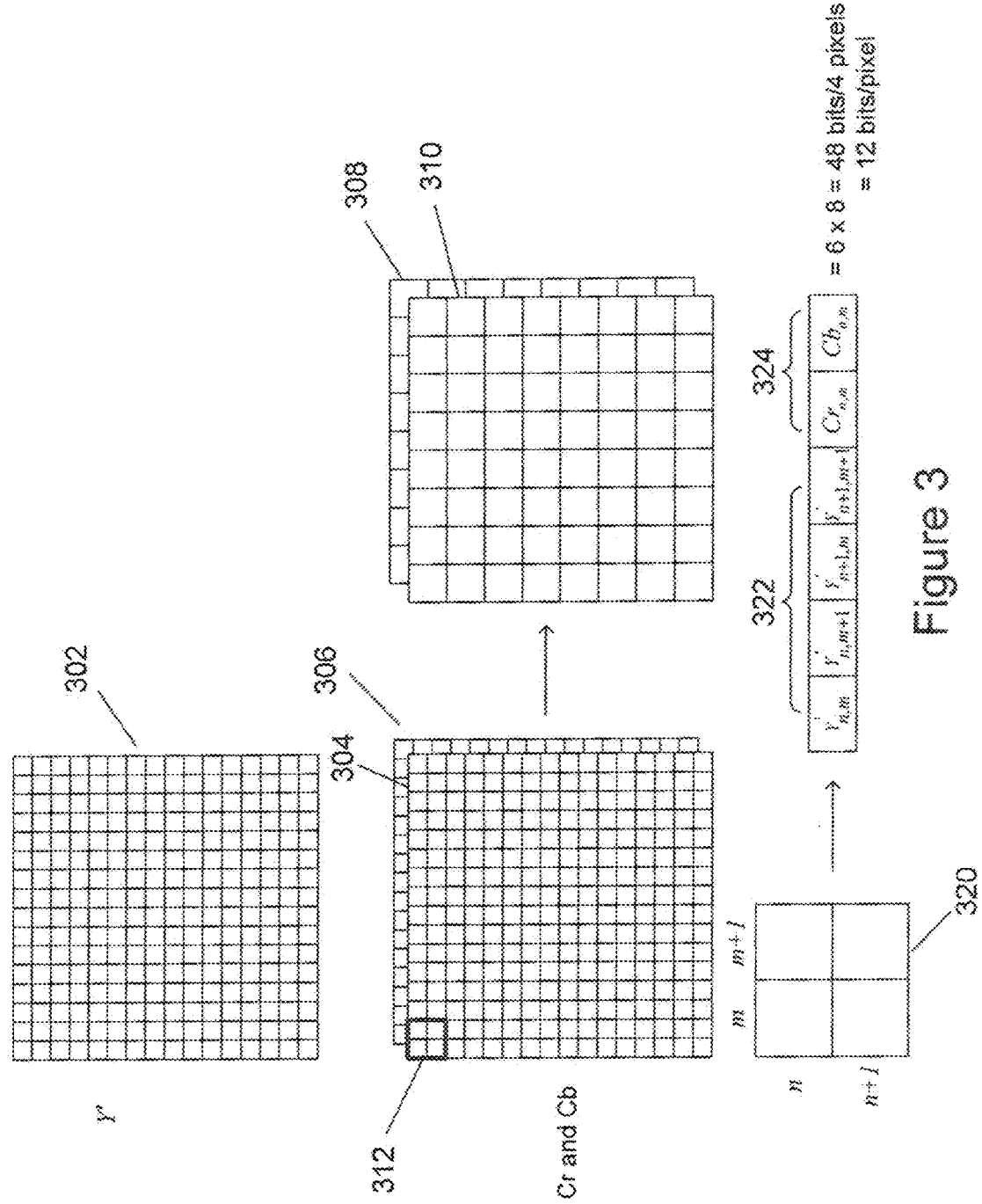
FIG. 3 illustrates digital encoding using the Y'CrCb color model.

For image processing, when the Y'CrCb color model is employed, a digitally-encoded image can be thought of as three separate pixilated planes, superimposed one over the other. FIG. 3 illustrates digital encoding using the Y'CrCb color model. A digitally-encoded image, as shown in FIG. 3, can be considered to be a Y' image 302 and two chroma images 304 and 306. The Y' plane 302 essentially encodes the brightness values of the image, and is equivalent to a monochrome representation of the digitally-encoded image. The two chroma planes 304 and 306 together represent the hue, or color, at each point in the digitally-encoded image. For many video-processing and video-image-storage purposes, it is convenient to decimate the Cr and Cb planes to produce Cr and Cb planes 308 and 310 with one-half resolution. In other words, rather than storing an intensity and two chroma values for each pixel, an intensity value is stored for each pixel, but a pair chroma values is stored for each 2×2 square containing four pixels. Thus, all four pixels in the left upper corner of the image 312 are encoded to have the same Cr value and Cb value. For each 2×2 region of the image 320, the region can be digitally encoded by four intensity values 322 and two chroma values 324, 48 bits in total, or, in other words, by using 12 bits per pixel.

Figure 4:
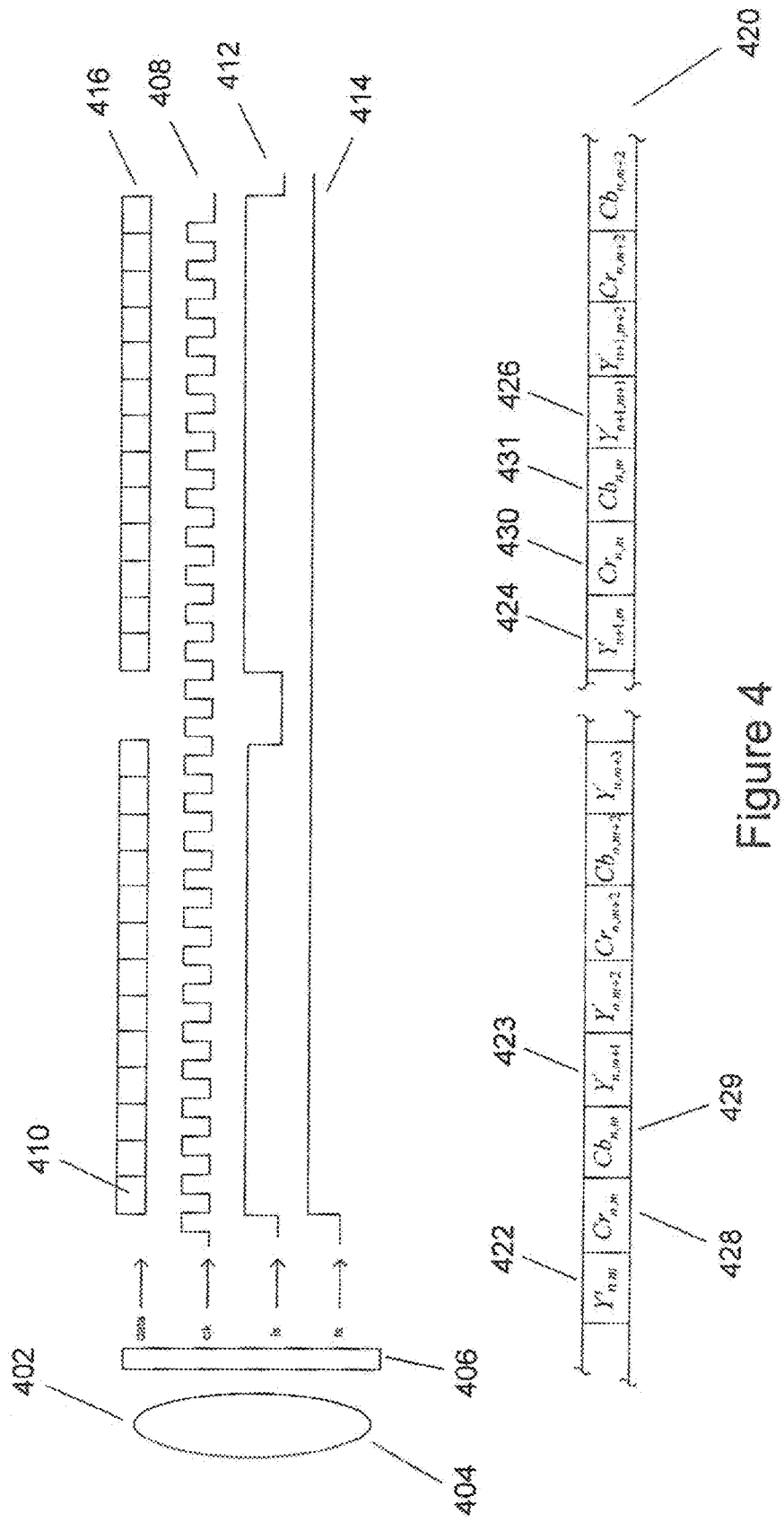
FIG. 4 illustrates the output of a video camera.

FIG. 4 illustrates the output of a video camera. The video camera 402 is represented as a lens 404 and an electronic, output-generating sensor 406. The video camera produces a clock signal 408, the rising edges of each pulse of which correspond to the beginning of a next data packet, such as data packet 410. In the example shown in FIG. 4, each data packet contains an eight-bit intensity or chroma value. The digital camera also produces a line, or row signal 412, with the signal high over a period of time corresponding to output of an entire row of a digitally-encoded image. The digital camera additionally outputs a frame signal 414, which is high over a period of time during which one digital image, or frame, is output. The clock, row, and frame output signals together specify the times for the output of each intensity or chroma value, the output of each row of a frame, and the output of each frame in a video signal. The data output 416 of the video camera is shown, in greater detail, as the sequence of packets 420 at the bottom of FIG. 4. Referring to the 2×2 pixel region (320 in FIG. 3) shown in FIG. 3, and using the same indexing conventions as used with respect to that region for the encoded intensity and chroma values 322 and 324 in FIG. 3, the contents of the stream of data 420 in FIG. 4 can be understood. Two intensity values for a 2×2 square region of pixels 422-426 are transmitted, along with a first set of two chroma values 428-429 for the 2×2 square region of pixels, as part of a first row of pixel values, with the two chroma values 428-429 transmitted in between the first two intensity values 422-423. Subsequently, the chroma values are repeated 430-431 between the second pair of intensity values 424 and 426 as part of a next row of pixel intensities. The repetition of chroma values facilitates certain types of real-time video-data-stream processing. However, the second pair of chroma values 430-431 is redundant. As discussed with respect to FIG. 3, the chroma planes are decimated, so that only two chroma values are associated with each 2×2 region containing four pixels.

Figure 5:
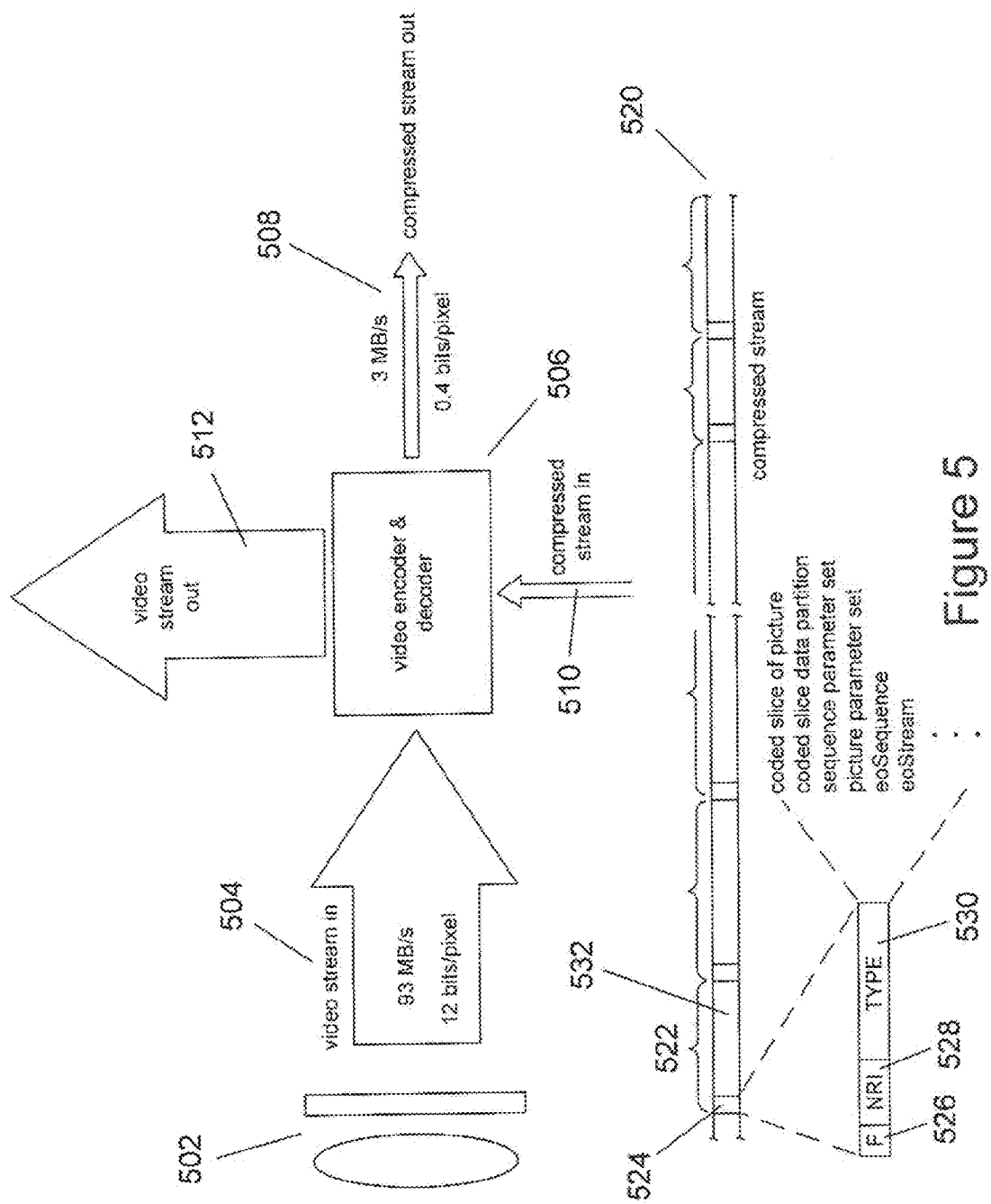
FIG. 5 illustrates the function of a video codec.

FIG. 5 illustrates the function of a video codec. As discussed above, with reference to FIGS. 1-4, a video camera 502 produces a stream of digitally encoded video frames 504. At 30 frames per second, assuming frames of 1920×1080 pixels, and assuming an encoding that uses 12 bits per pixel, the video camera produces 93 megabytes of data per second. One minute of sustained video capture would produce 5.5 gigabytes of data. Small, hand-held electronic devices manufactured according to currently-available designs and technologies cannot process, store, and/or transmit data at this rate. In order to produce manageable data-transfer rates, a video codec 506 is employed to compress the data stream output from the camera. The H.264 standard provides for video compression ratios of about 30:1. The incoming 93 MB/s data stream from the camera is thus compressed, by the video codec 506, to produce a compressed video data stream of about 3 MB/s 508. By contrast to the raw video-data stream produced by the camera, the compressed video-data stream is output by the video codec at a data rate that can be processed for storage or transmission by a hand-held device. A video codec can also receive a compressed video-data stream 510 and decompress the compressed data to produce an output raw video-data stream 512 for consumption by a video-display device.

The 30:1 compression ratio can be achieved by a video codec because video signals generally contain relatively large amounts of redundant information. As one example, a video signal generated by filming two children throwing a ball back and forth contains a relatively small amount of rapidly changing information, namely the images of the children and the ball, and a relatively large amount of static or slowly changing objects, including the background landscape and lawn upon which the children are playing. While the children's figures and the image of the ball may significantly change, from frame to frame, over the course of the filming, background objects may remain relatively constant throughout the filming, or at least for relatively long periods of time. In this case, much of the information encoded in frames subsequent to the first frame may be quite redundant. Video compression techniques are used to identify and efficiently encode the redundant information, and to therefore greatly decrease the total amount of information that is included in a compressed video signal.

The compressed video stream 508 is shown, in greater detail 520 in the lower portion of FIG. 5. According to the H.264 standard, the compressed video stream comprises a sequence of network-abstraction-layer ("NAL") packets, such as NAL packet 522. Each NAL packet includes an 8-bit header, such as header 524 of NAL packet 522. A first bit must always be zero 526, the next two bits 528 indicate whether or not the data contained in the packet are associated with a reference frame, and the final five bits 530 together compose a type field, which indicates the type of packet and the nature of its data payload. Packet types include packets that contain encoded pixel data and encoded metadata that describes how portions of the data have been encoded, and also include packets that represent various types of delimiters, including end-of-sequence end-of-stream delimiters. The body of a NAL packet 532 generally contains encoded data.

Figure 6:
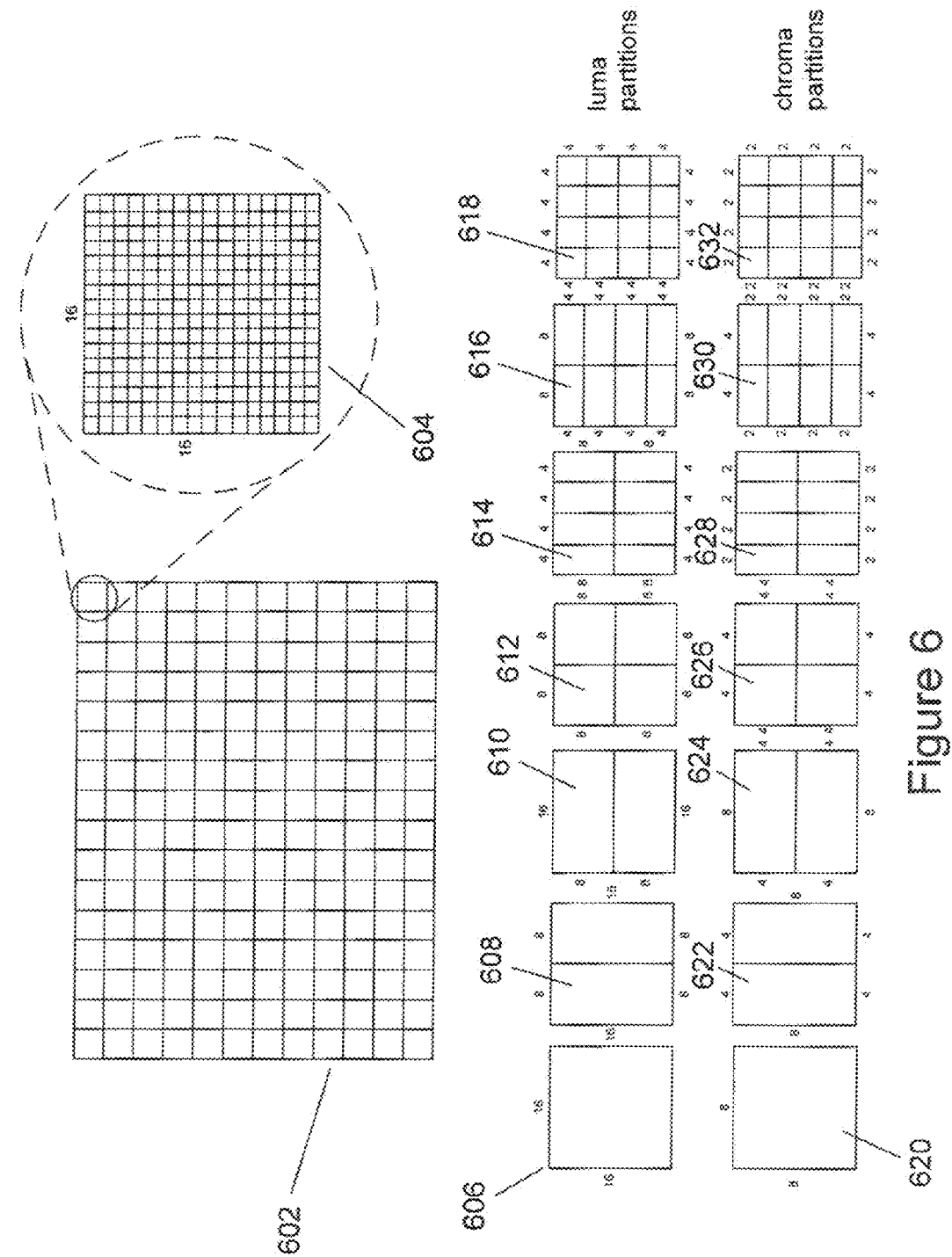
FIG. 6 illustrates various data objects upon which video-encoding operations are carried out during video-data-stream compression and compressed-video-data-stream decompression.

FIG. 6 illustrates various data objects upon which video-encoding operations are carried out during video-data-stream compression and compressed-video-data-stream decompression. From the standpoint of video processing, a video frame 602 is considered to be composed of a two-dimensional array of macroblocks 604, each macroblock comprising a 16×16 array of data values. As discussed above, video compression and decompression generally operate independently on Y' frames containing intensity values and chroma frames containing chroma values. The human eye is generally far more sensitive to variations in brightness than to spatial variation in color. Therefore, a first useful compression is obtained simply by decimating two chroma planes, as discussed above. Prior to decimation, a 2×2 square of pixels can be represented by 12 bytes of encoded data, assuming eight-bit representations of intensity and chroma values. Following decimation, the same 2×2 square of four pixels can be represented by only six bytes of data. Thus, by decreasing the spatial resolution of the color signal, a compression ratio of 2:1 is achieved. While macroblocks are the basic unit on which compression and decompression operations are carried out, macroblocks may be further partitioned for certain compression and decompression operations. The intensity, or luma, macroblocks each contain 256 pixels 606, but can be partitioned to produce 16×8 partitions 608, 8×16 partitions, 8×8 partitions 612, 8×4 partitions 614, 4×8 partitions 616, and 4×4 partitions 618. Similarly, chroma macroblocks each contain 64 encoded chroma values 620, but can be further partitioned to produce 8×4 partitions 622, 4×8 partitions 624, 4×4 partitions 626, 4×2 partitions 628, 2×4 partitions 630, and 2×2 partitions 632. In addition, 1×4, 1×8, and 1×16 pixel vectors may be employed in certain operations.

Figure 7:
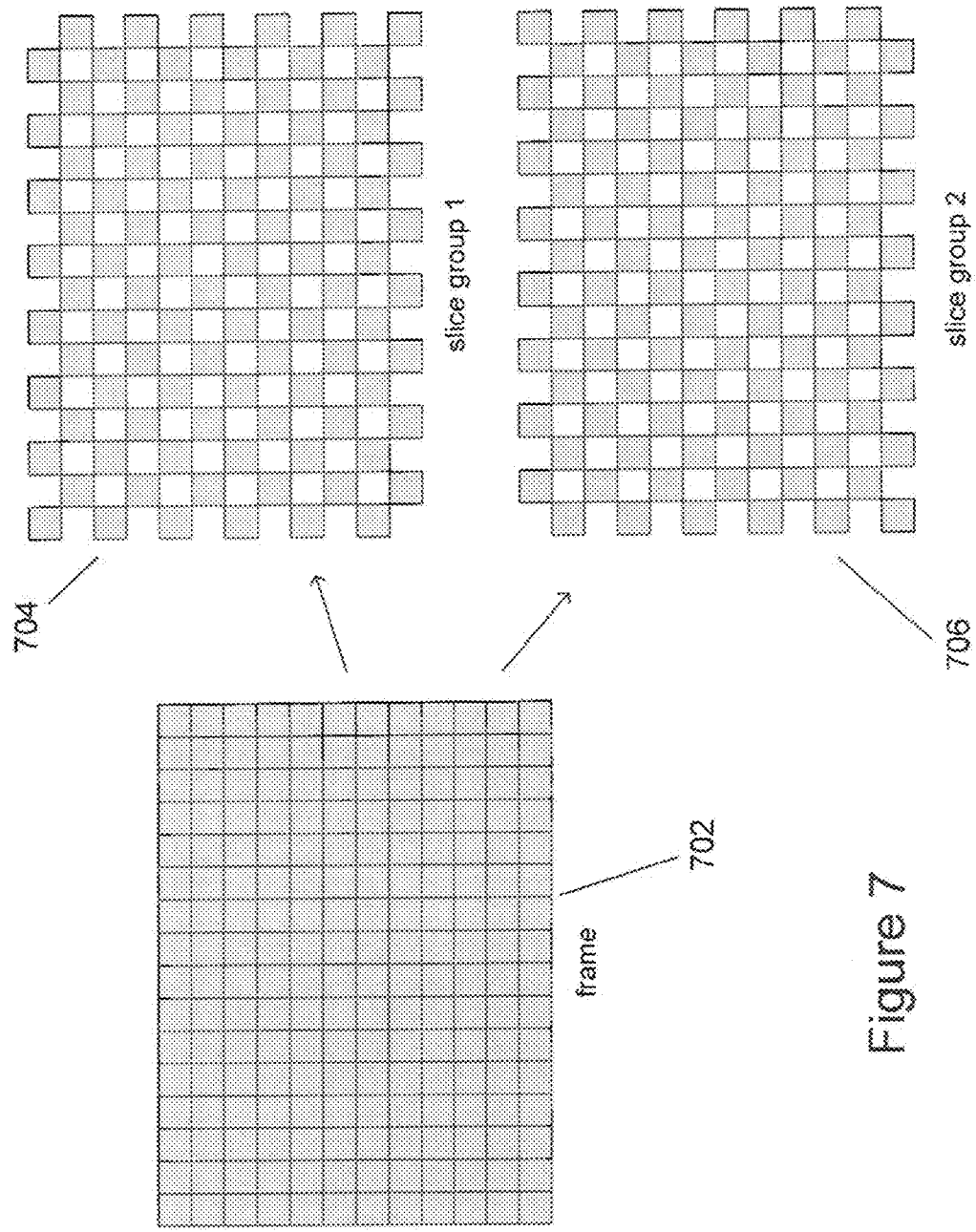
FIG. 7 illustrates partitioning of a video frame into two slice groups.

According to the H.264 standard, each video frame can be logically partitioned into slice groups, with the partitioning specified by a slice-group map. Many different types of slice-group partitioning can be specified by an appropriate slice-group map. FIG. 7 illustrates partitioning of a video frame into two slice groups. The video frame 702 is partitioned into a first, checkerboard-like slice group 704 and a complementary checkerboard-like slice group 706. The first slice group and the second slice group both contain an equal number of pixel values, and each contains one-half of the total number of pixel values in the frame. The frame can be partitioned into an essentially arbitrary number of slice groups, each including an essentially arbitrary fraction of the total pixels, according to essentially arbitrary mapping functions.

Figure 8:
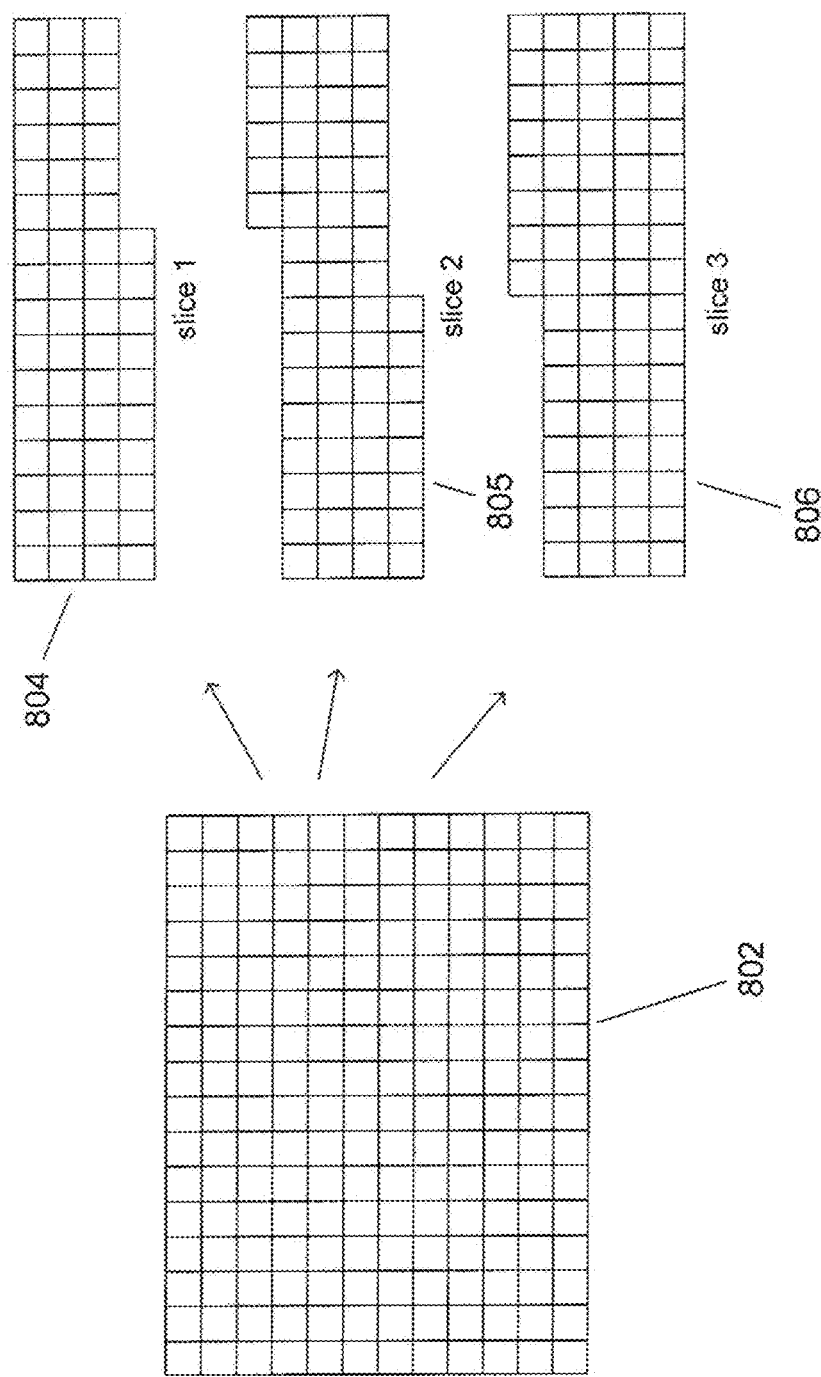
FIG. 8 illustrates a second level of video-frame partitioning.

FIG. 8 illustrates a second level of video-frame partitioning. Each slice group, such as slice group 802, can be partitioned into a number of slices 804-806. Each slice contains a number of contiguous pixels (contiguous within the slice group, but not necessarily within a frame) in raster-scan order. The slice group 802 may be an entire video frame or may be a partition of the frame according to an arbitrary slice-group-partitioning function. Certain of the compression and decompression operations are carried out on a slice-by-slice basis.

To summarize, video compression and decompression techniques are carried out on video frames and various subsets of video frames, including slices, macroblocks, and macroblock partitions. In general, intensity-plane or luma-plane objects are operated on independently from chroma-plane objects. Because chroma planes are decimated by a factor of two in each dimension, with an overall 4:1 compression, the dimensions of chroma macroblocks and macroblock partitions are generally one-half those of the luma macroblocks and luma-macroblock partitions.

A first step in video compression, as implied by the H.264 standard, is to employ one of two different general prediction techniques in order to predict the pixel values of a currently considered macroblock or macroblock partition from, in one case, neighboring macroblocks or macroblock partitions in the same frame and, in the other case, spatially neighboring macroblocks or macroblock partitions that occur in frames that precede or follow the frame of the macroblock or macroblock partition that is being predicted. The first type of prediction is spatial prediction, referred to as "intra prediction." A second type of prediction is temporal prediction, referred to as "inter prediction." Intra prediction is the only type of prediction that can be used for certain frames, referred to as "reference frames." Intra prediction is also the default prediction used when encoding macroblocks. For a macroblock of a non-reference frame, inter prediction is first attempted. When inter prediction succeeds, then intra prediction is not used for the macroblock. However, when inter prediction fails, then intra prediction may be employed as the default prediction method.

Figure 9:
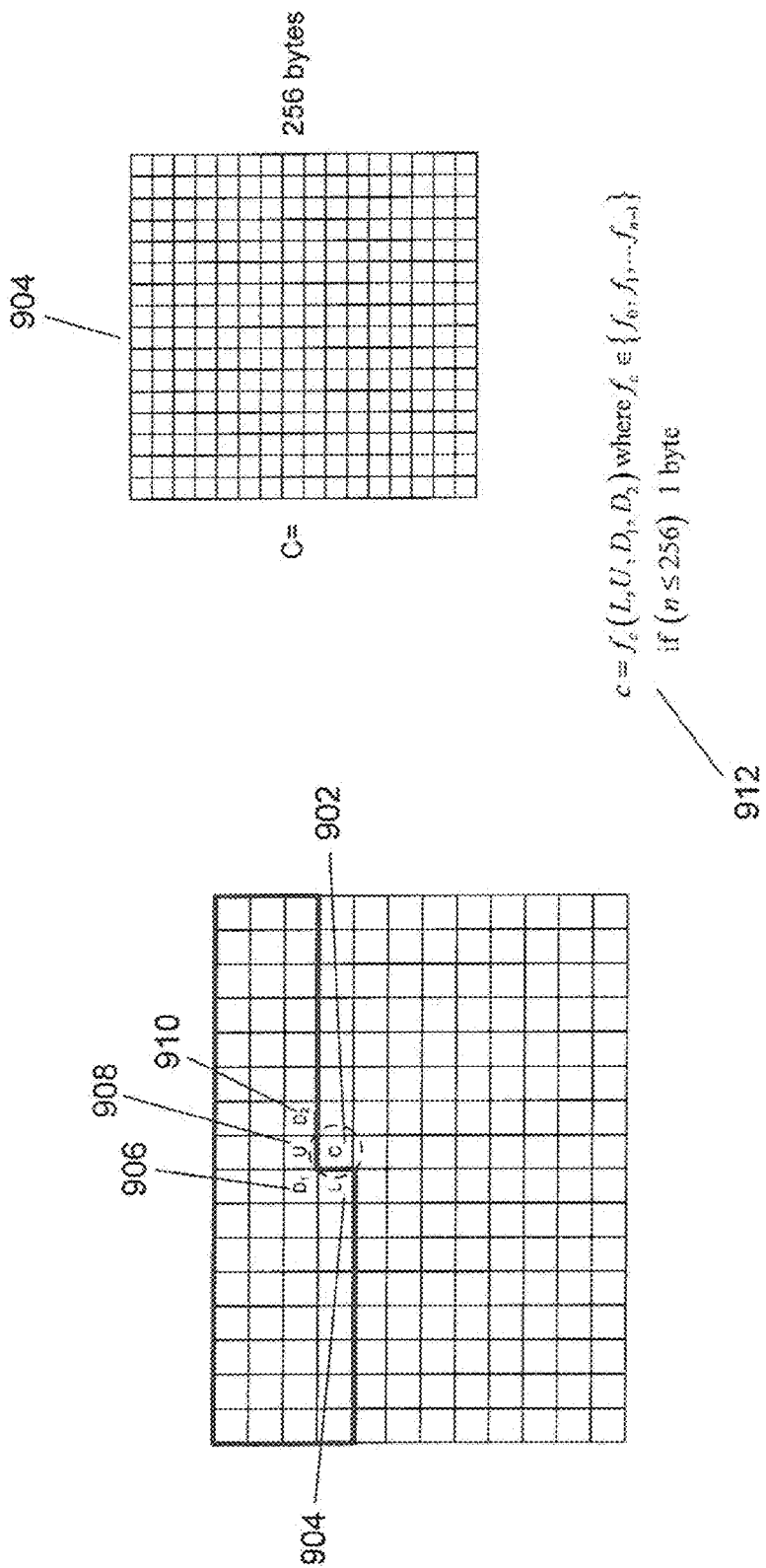
FIG. 9 illustrates the general concept of intra prediction.
Figure 10C:
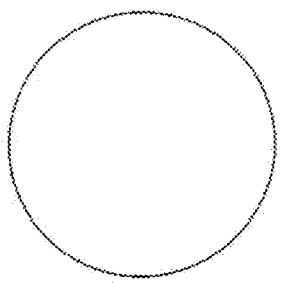
Figure 10D:
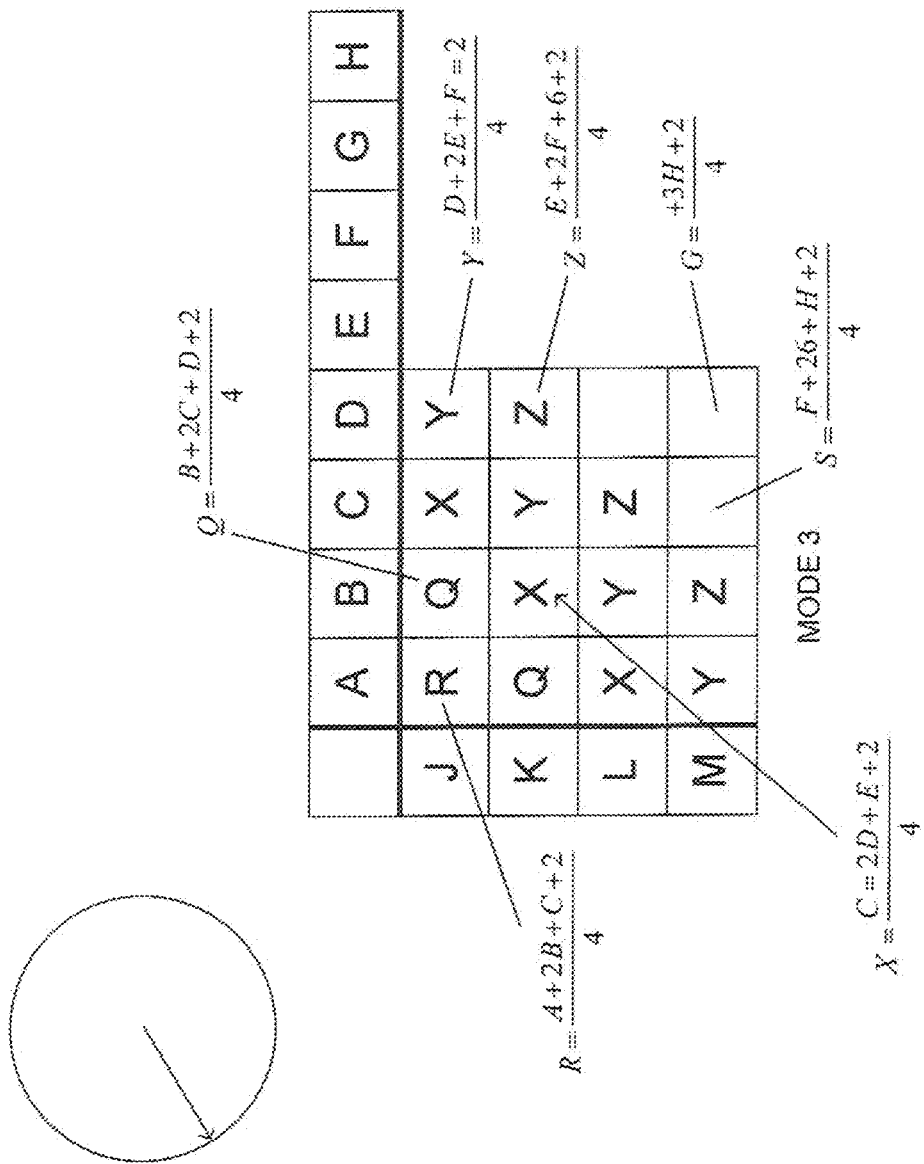
Figure 10E:
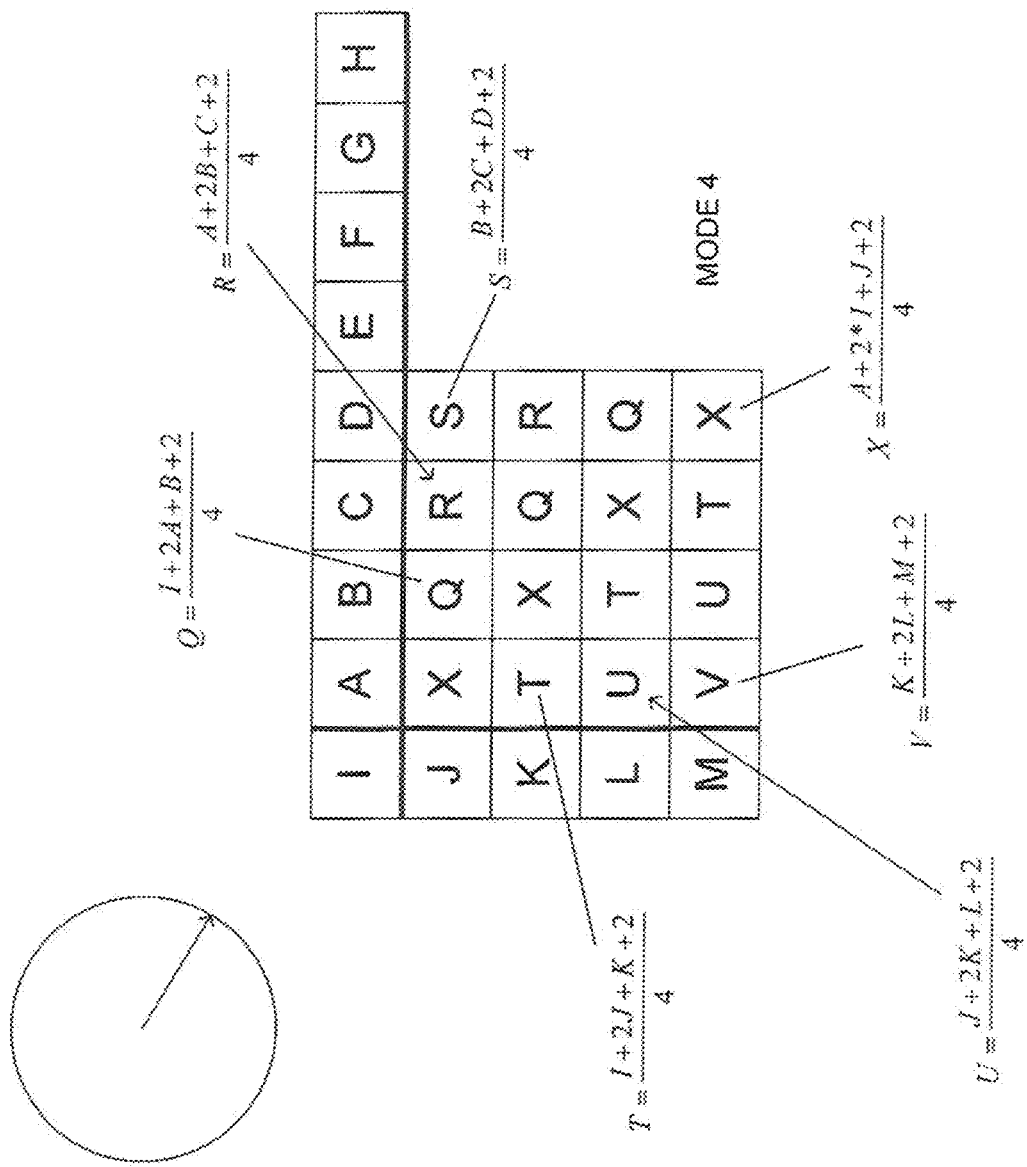
Figure 10F:
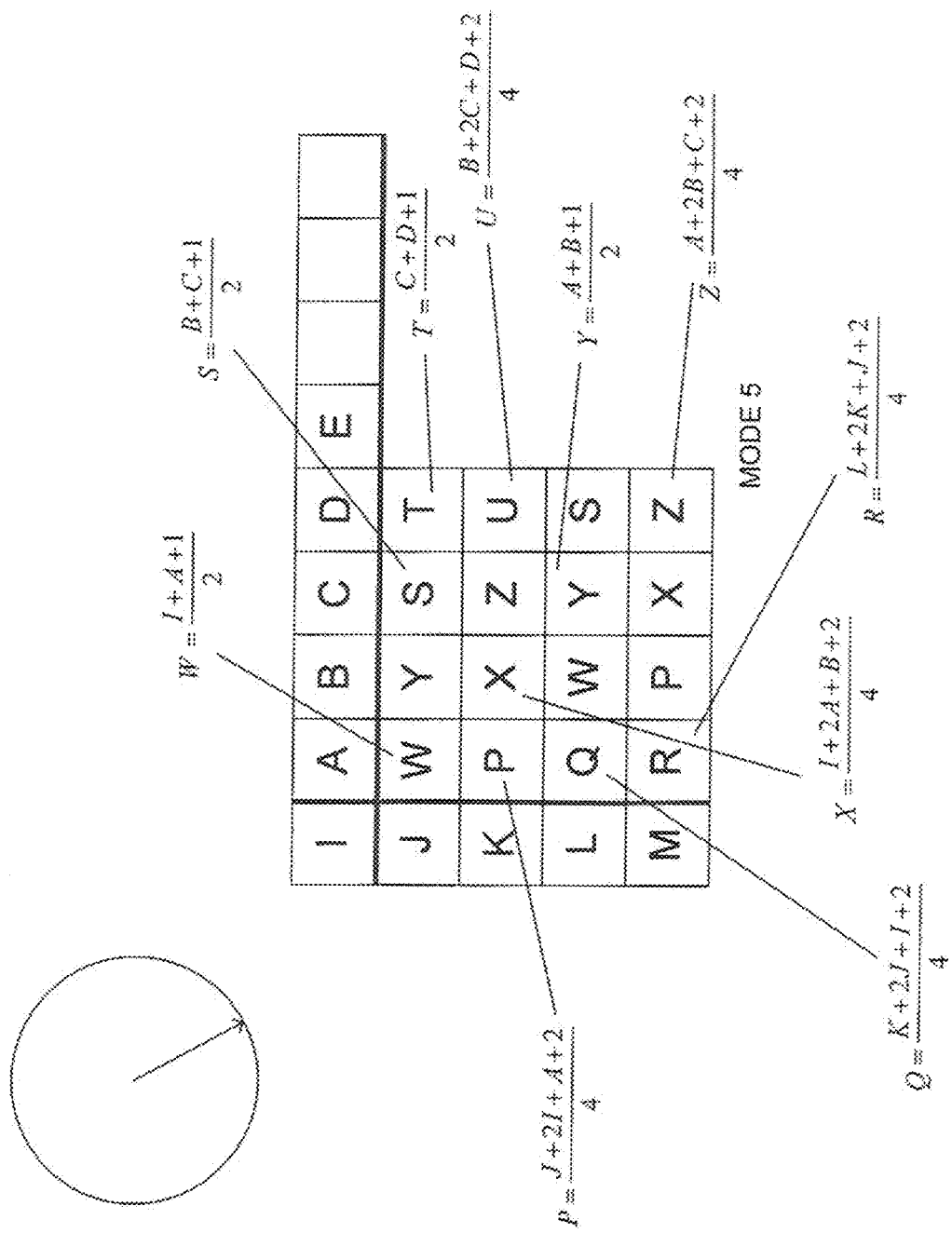
Figure 10G:
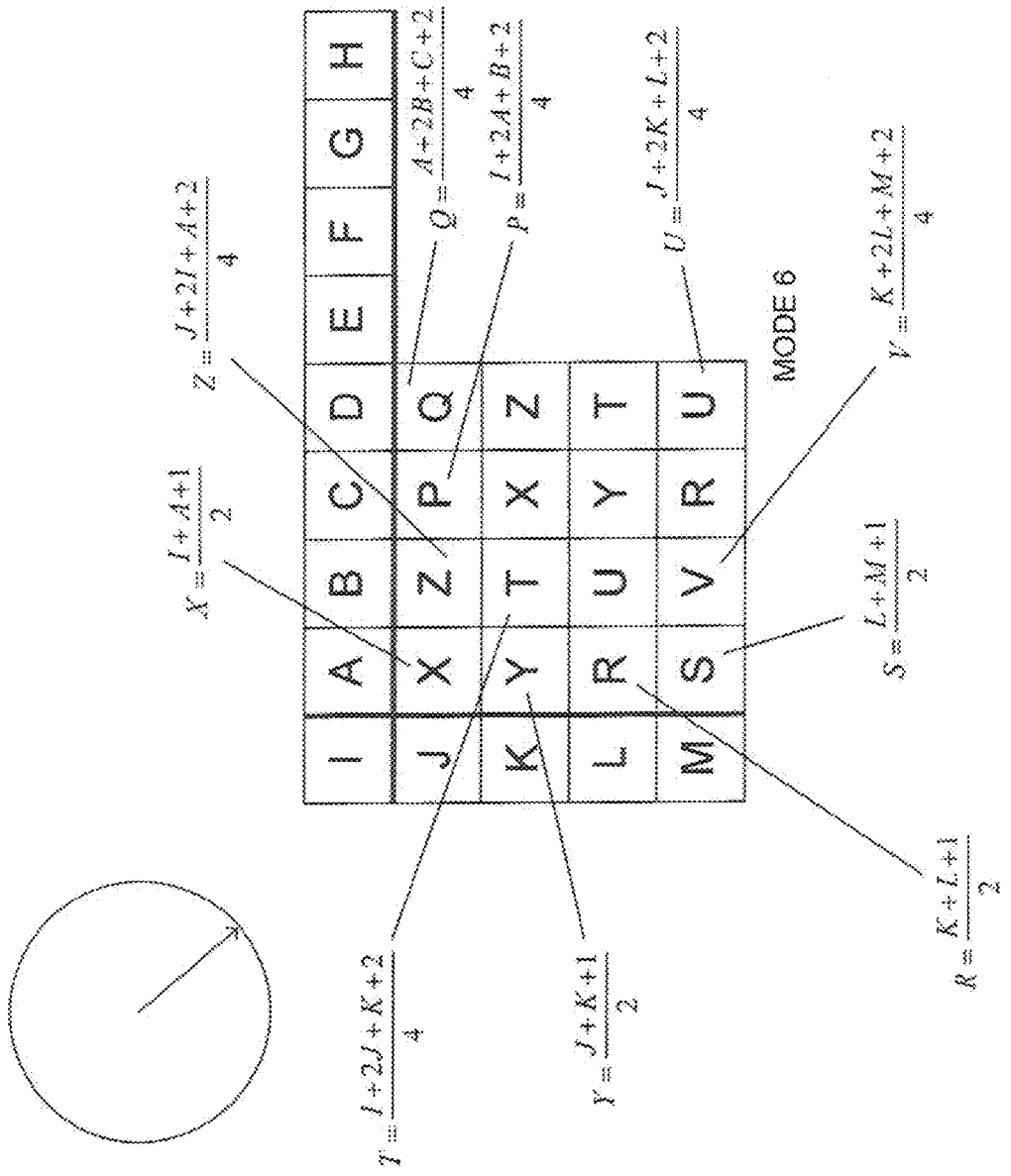
Figure 10H:
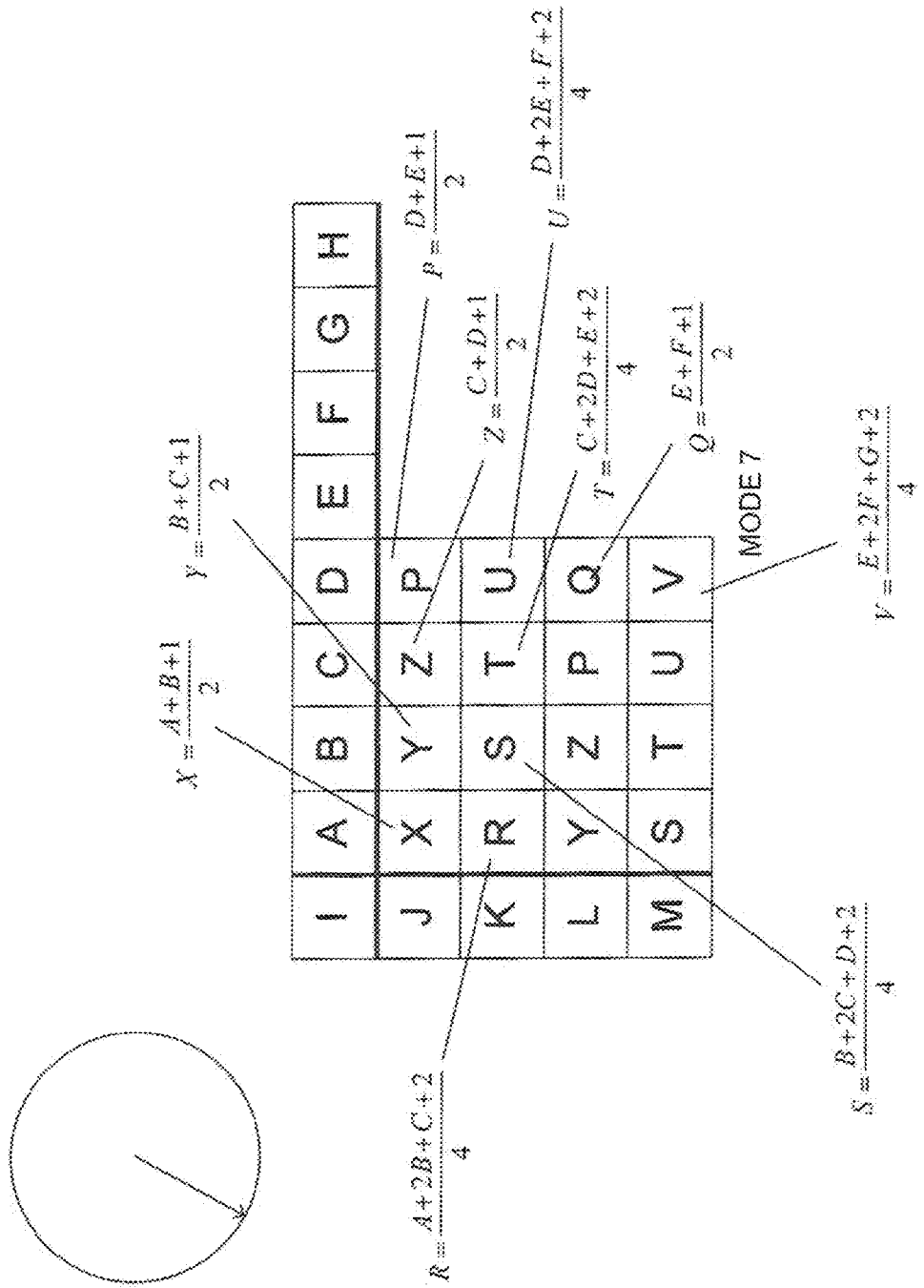
Figure 10I:
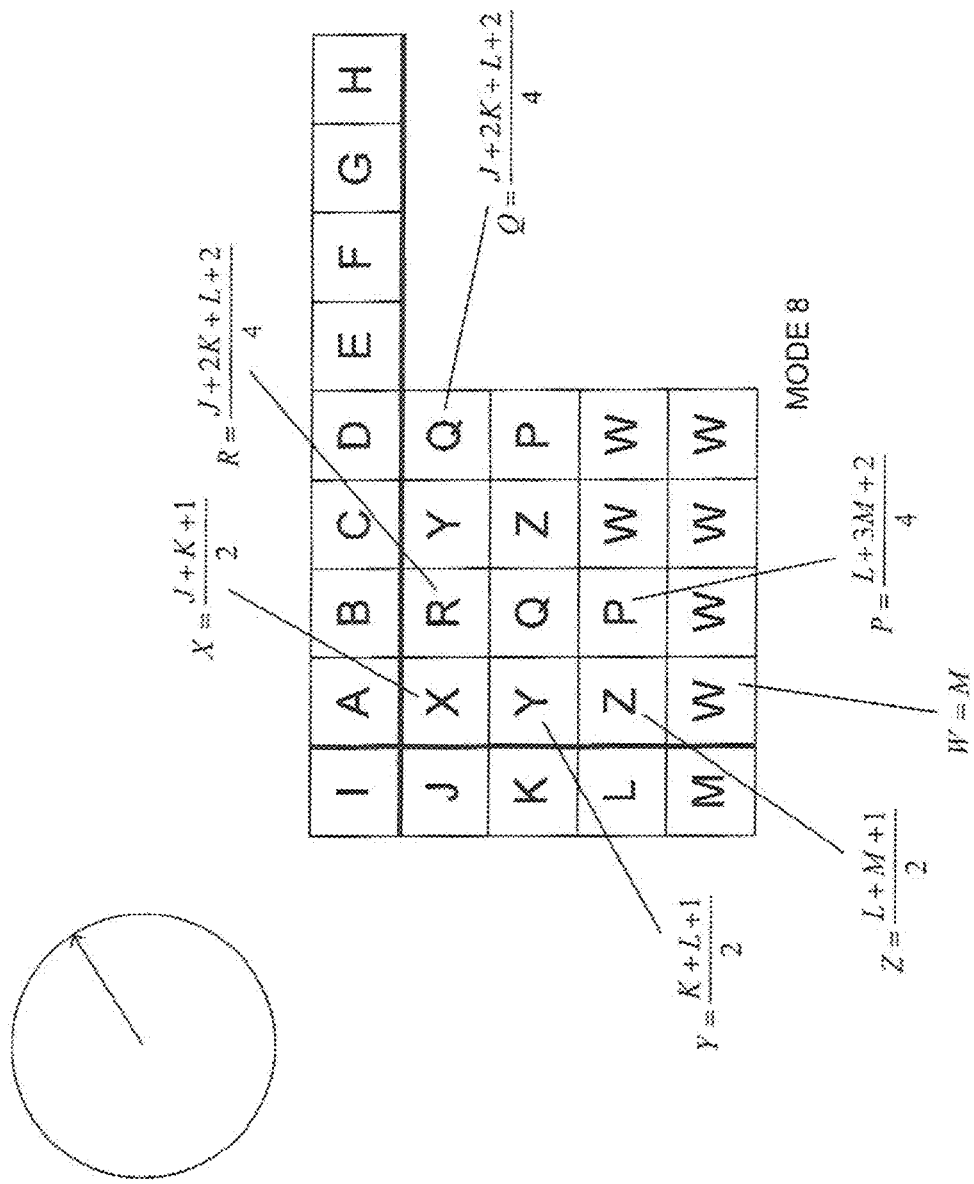
Figure 11A:
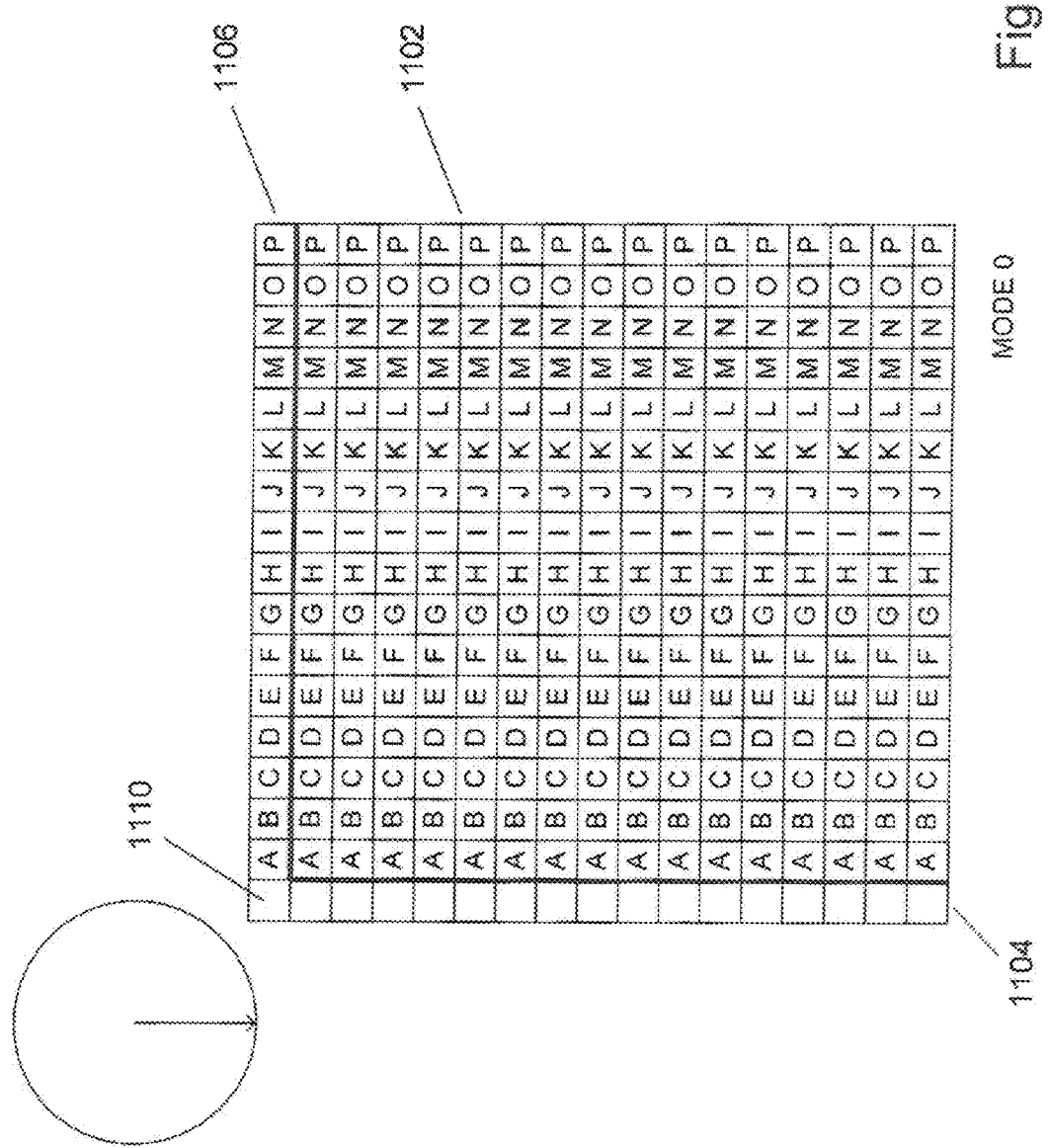
Figure 11D:
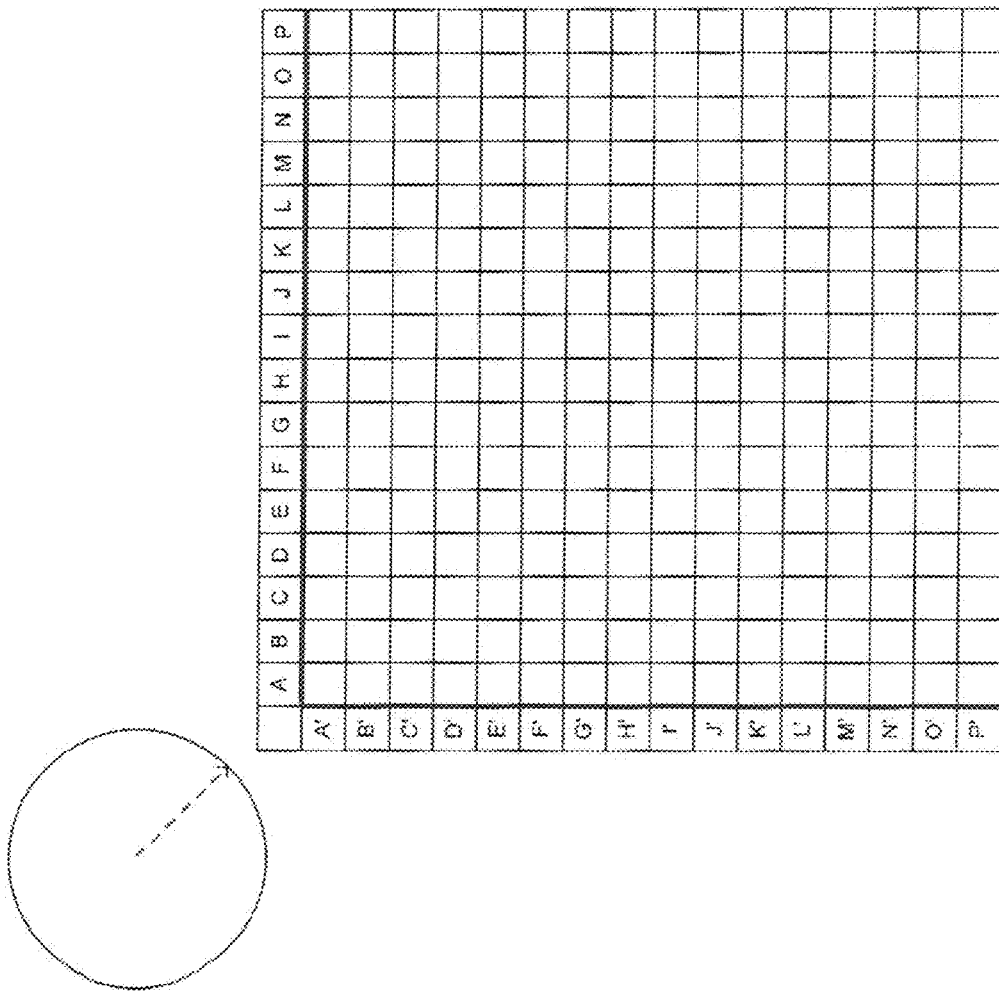

FIG. 9 illustrates the general concept of intra prediction. Consider a macroblock C 902 encountered during macroblock-by-macroblock compression of a video frame. As discussed above, a 16×16 luma macroblock 904 can be encoded using 256 bytes. However, were it possible to compute the contents of the macroblock from adjacent macroblocks in the image, then a rather large amount of compression is theoretically possible. For example, consider four adjacent macroblocks to the currently considered macroblock C 902. These four macroblocks include a left macroblock 904, an upper left diagonal macroblock 906, an upper macroblock 908, and an upper right diagonal macroblock 910. Were it possible to compute the pixel values in C as a function of one or more of these adjacent macroblocks, using one of some number of different prediction functions $f_c$ 912, then the contents of the macroblock could be encoded simply as a numeric designator or specifier for the prediction function. Were the number of prediction functions less than or equal to 256, for example, then the designator or specifier for the selected prediction function could be encoded in a single byte of information. Thus, were it possible to exactly compute the contents of a macroblock from its neighbors using a selected one of 256 possible prediction functions, the rather spectacular compression ratio of 256:1 could be achieved. Unfortunately, compression ratios of this magnitude are not generally achieved by the spatial-prediction methods employed for H.264 compression, because there are far too many possible macroblocks to allow for accurate prediction by only 256 prediction functions. For example, when each pixel is encoded by 12 bits, there are $2^{12}=4096$ different possible pixel values and $4096^{256}$ different possible macroblocks. However, intra prediction can significantly contribute to the overall compression ratio for H.264 video compression, particularly for relatively static video signals with large image regions that do not quickly change and that are relatively homogeneous in intensity and color.

H.264 intra prediction can be carried out according to nine different modes for 4×4 luma macroblocks or according to four different modes for 16×16 luma macroblocks. FIGS. 10A-I illustrate the nine 4×4 luma-block intra-prediction modes. Illustration conventions used in all of these figures are similar, and are described with reference to FIG. 10A. The 4×4 luma macroblock that is being predicted is represented, in the figures, by the 4×4 matrix 1002 to the lower right of the diagram. Thus, the uppermost left-hand pixel value 1004 in the 4×4 matrix being predicted, in FIG. 10A, contains the value "A." The cells adjacent to the 4×4 luma block represent pixel values in neighboring 4×4 luma blocks within the image. For example, in FIG. 10A, the values "A" 1006, "B" 1007, "C" 1008, and "D" 1009 are data values contained in the 4×4 luma block directly above the 4×4 luma block being predicted 1002. Similarly, the cells 1010-1013 represent pixel values within a last vertical column of the 4×4 luma block to the left of the 4×4 luma block being predicted. In the case of mode-0 prediction, illustrated in FIG. 10A, the values in the last row of the upper, adjacent 4×4 luma block are copied vertically downward into the columns of the currently considered 4×4 luma block 1002. Thus, in FIG. 10A, mode-0 prediction constitutes a downward, vertical prediction represented by the downward directional arrow 1020 shown in FIG. 10A. The remaining eight intra prediction modes for predicting 4×4 luma blocks are shown in FIGS. 10B-10I, using the same illustration conventions as used in FIG. 10A, and are therefore completely self-contained and self-explanatory. Each mode, with the exception of mode 2, can be thought of as a spatial vector, indicating a direction in which pixel values in neighboring 4×4 blocks are translated into the block being predicted.

FIGS. 11A-11D illustrate, using similar illustration conventions as used in FIGS. 10A-I, the four modes for intra prediction of 16×16 luma blocks. In FIGS. 11A-D, the block being predicted is the 16×16 block in the lower right-hand portion of the matrix 1102, the leftmost vertical column 1104 is the rightmost vertical column of the left adjoining 16×16 luma block and the top horizontal row 1106 is the bottom row of the upper adjoining 16×16 luma block. The upper leftmost cell 1110 is the lower right-hand-corner cell of an upper, left diagonal 16×16 luma block. The 16×16 prediction modes are similar to a subset of the 4×4 intra prediction modes, with the exception of mode 4, shown in FIG. 11D, which is a relatively complex plane prediction mode that computes predicted values for each pixel from all of the pixels in the lower row of the upper, adjacent 16×16 luma block and the rightmost vertical column of the left adjacent 16×16 luma block. In general, the mode which produces a closest approximation to a current block that is being intra predicted is chosen as the intra-prediction mode to apply to the currently considered block. Predicted pixel values can be compared to actual; pixel values using any of various comparison metrics, including mean pixel-value differences between the predicted and considered block, the mean of squared errors in pixel values, sum of squared errors, and other such metrics.

Figure 12:
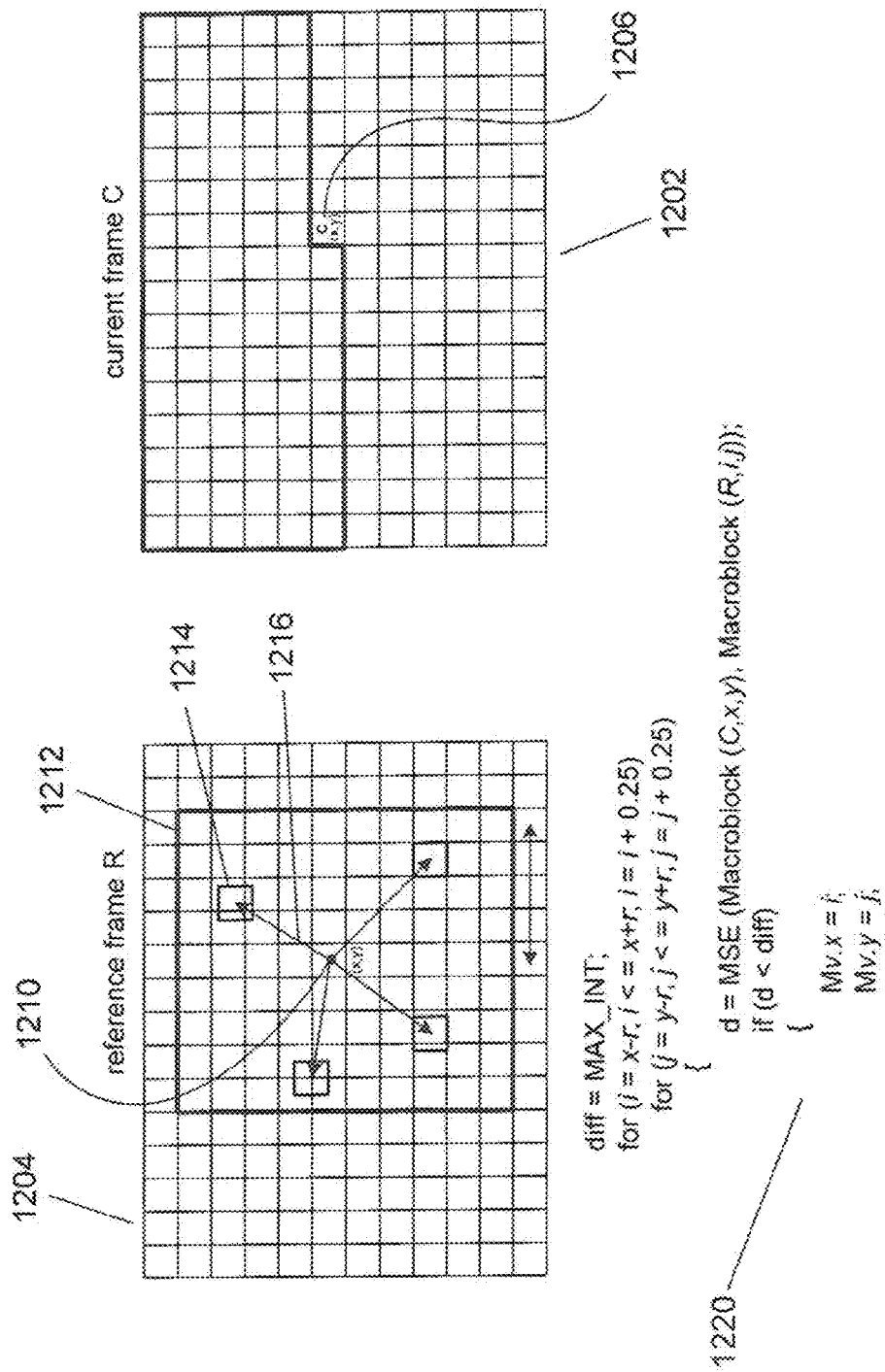
FIG. 12 illustrates the concept of inter prediction.

FIG. 12 illustrates the concept of inter prediction. Inter prediction, as discussed above, is temporal prediction, and can be thought of as motion-based prediction. For illustration purposes, consider a current frame 1202 and a reference frame that occurs, in the video signal, either before or after the current frame 1204. At a current point in video compression, a current macroblock 1206 needs to be predicted from the contents of the reference frame. An example of the process is illustrated in FIG. 12. In the reference frame, a reference point 1210 is chosen as the coordinates of the currently considered block 1206, with respect to the current frame, applied to the reference frame. In other words, the process begins at the equivalent position, in the reference frame, of the currently-considered block in the current frame. Then, within a bounded search space, indicated in FIG. 12 by a heavy-lined 1212 square, each block within the search area is compared to the currently considered block in the current frame in order to identify a block in the search area 1212 of the reference frame 1204 most similar to the currently considered block. If the difference between the contents of the closest block, in pixel values, within the search area to the currently considered block is below a threshold value, then the closest block selected from the search area predicts the contents of the currently considered block. The selected block from the search area may be an actual block, or may be an estimated block at fractional coordinates with respect to the rectilinear pixel grid, with pixel values in the estimated block interpolated from actual pixel values in the reference frame. Thus, using inter prediction, rather than encoding the currently considered macroblock 1206 as 256 pixel values, the currently considered macroblock 1206 can be encoded as an identifier of the reference frame and a numerical representation of the vector that points from the reference point 1210 to a macroblock selected from the search area 1212. For example, if the selected interpolated block 1214 is found to most closely match the currently considered block 1206, then the currently considered block can be encoded as an identifier for the reference frame 1204, such as an offset, in frames, within the video signal from the current frame, and a numerical representation of the vector 1216 that represents the spatial displacement of the selected block 1214 from the reference point 1210.

Various different metrics can be used to compare the contents of actual or interpolated blocks within the search area of the reference frame 1212 to the contents of the currently considered block 1206, including a mean absolute pixel-value difference or a mean squared difference between pixel values. C++-like pseudocode 1220 is provided in FIG. 12 as an alternative description of the inter-prediction process described above. An encoded displacement vector is referred to as a motion vector. The spatial displacement of the selected block from the reference point in the reference frame corresponds to a temporal displacement of the currently considered macroblock in the video stream, which often corresponds to actual motion of objects in a video image.

Figure 13A:
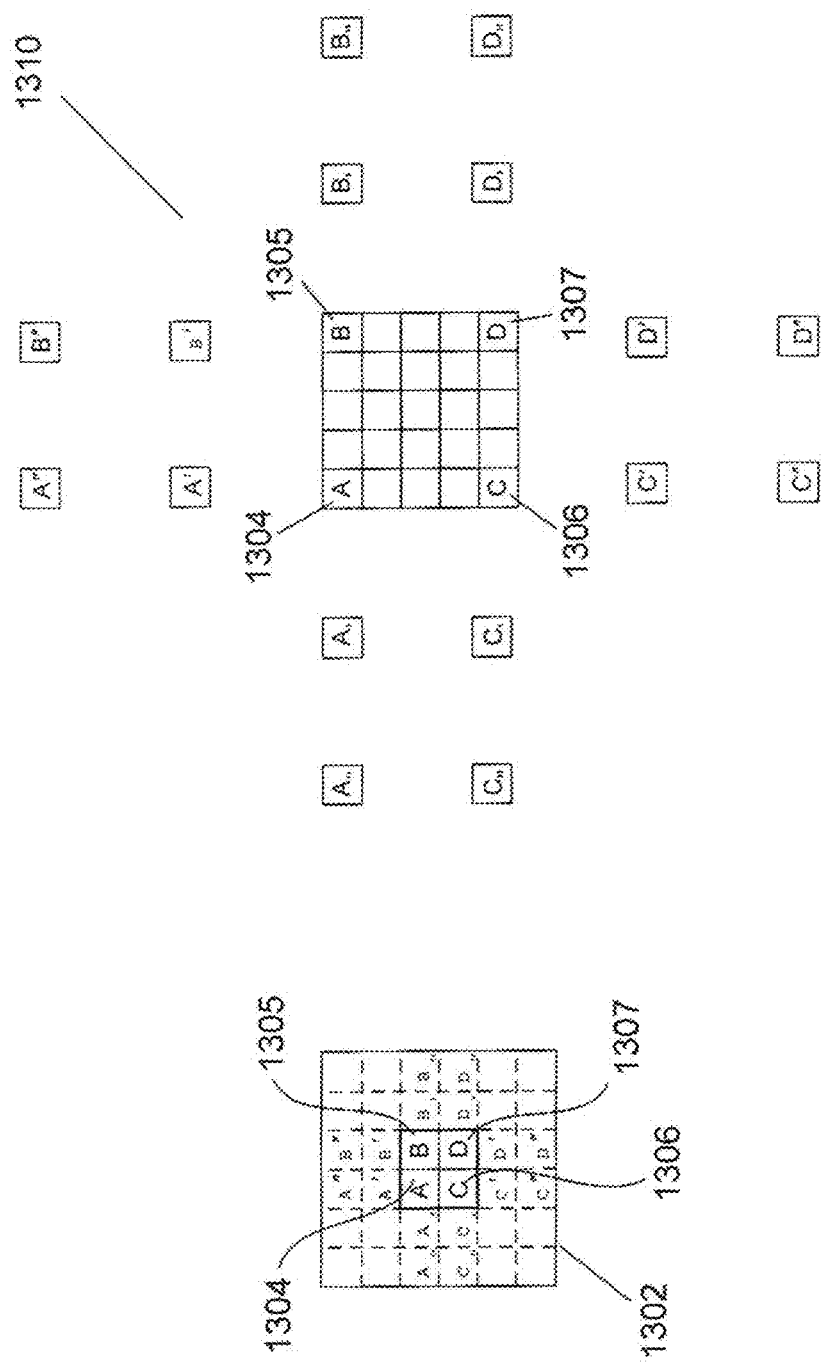
Figure 13B:
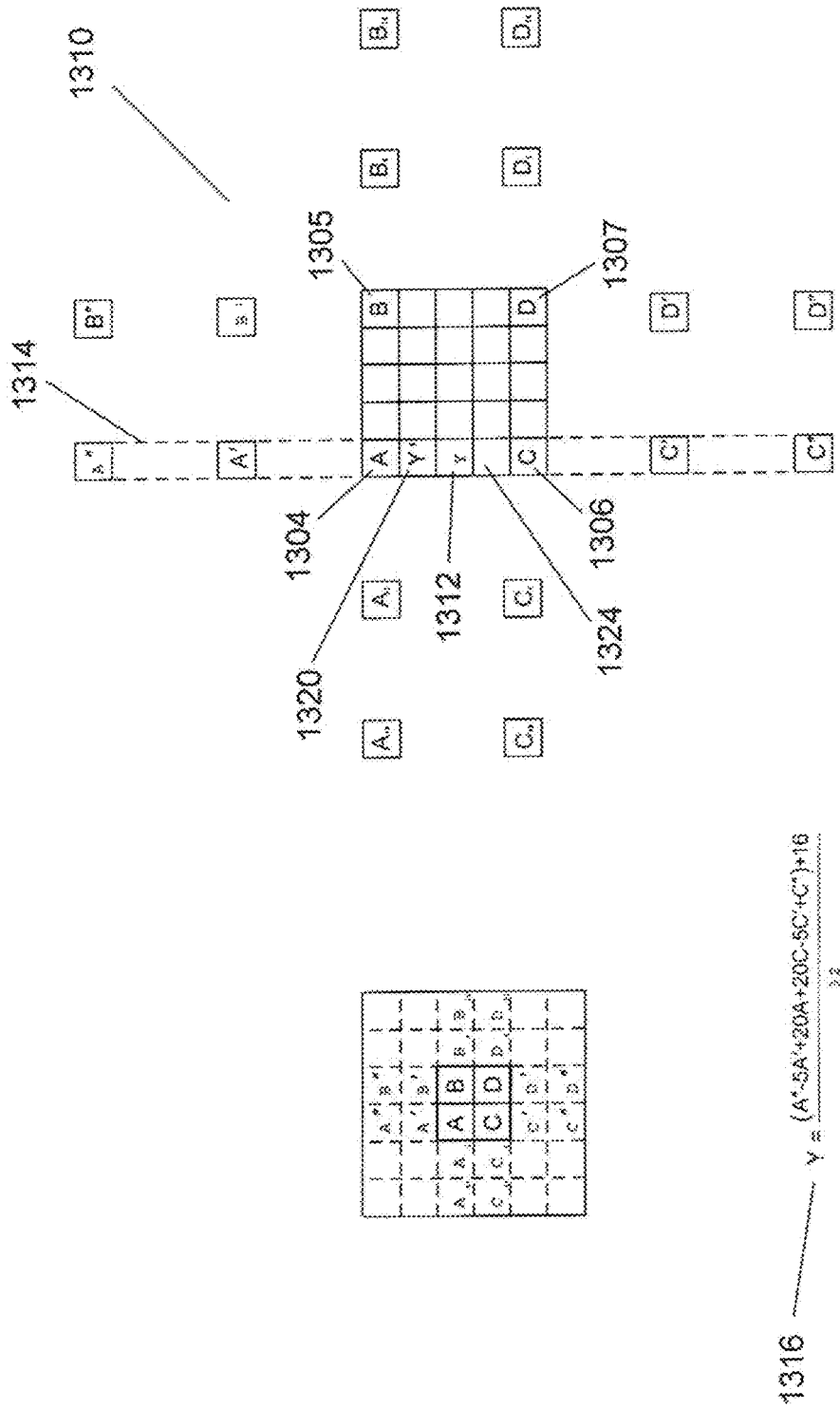
Figure 13D:
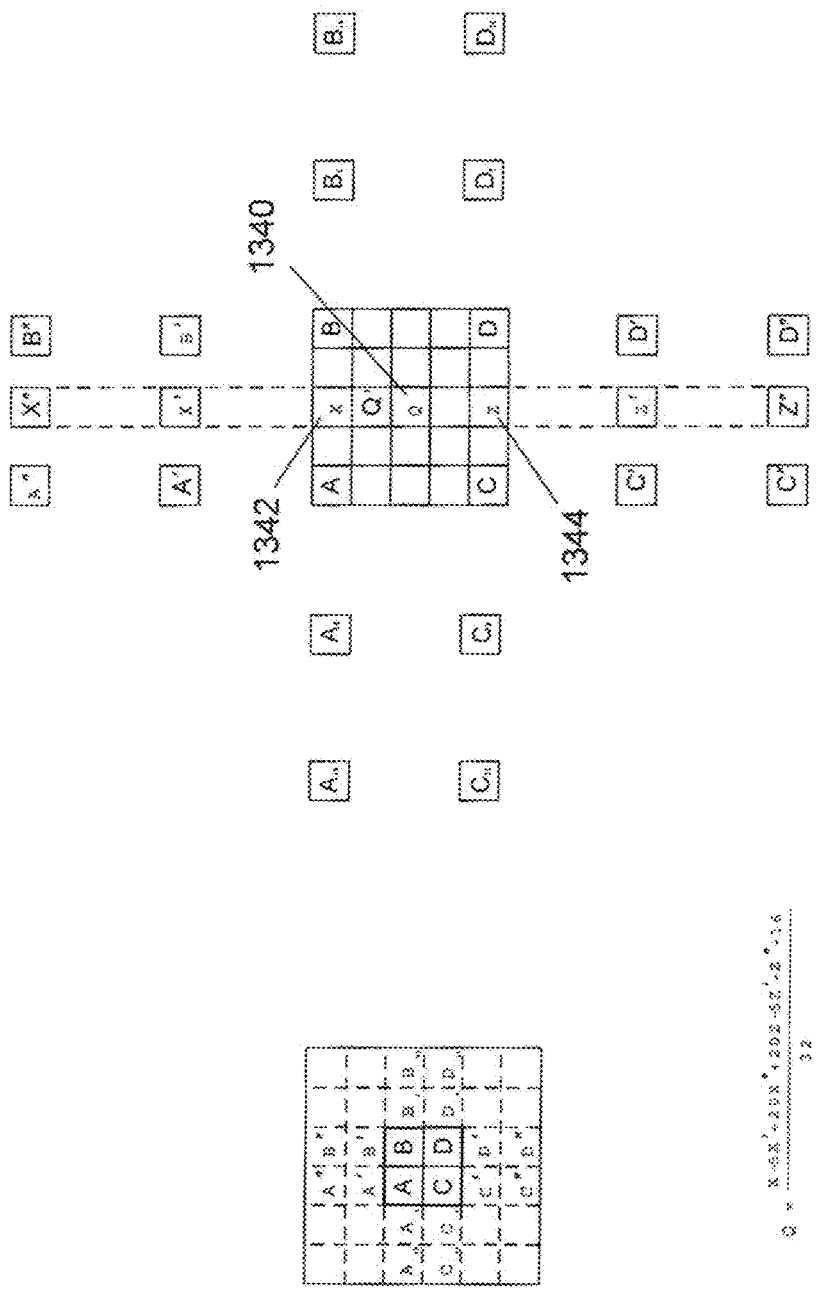

FIGS. 13A-D illustrate an interpolation process used to compute pixel values for blocks, within a search area of a reference frame, that can be thought of as occurring at fractional coordinates. The H.264 standard allows for a resolution of 0.25 with respect to integer pixel coordinates. Consider the 6×6 block of pixels 1302 to the left of FIG. 13A. The interpolation process can be considered as a translational expansion of the actual pixels in two dimensions and computation of interpolated values to insert between the expanded pixels. FIGS. 13A-D illustrate computation of the higher-resolution, inserted values between the central four pixels 1304-1307 in the 6×6 block of actual pixel values. The expansion is illustrated to the right of FIG. 13A 1310. In this example, pixel values 1304-1307 have been spatially expanded, in two dimensions, and 21 new cells have been added to form a 4×4 matrix with the original pixel values 1304-1307 at the corners. The remaining pixels of the 6×6 matrix of pixels 1302 have also been translationally expanded. FIG. 13B illustrates the interpolation process to produce interpolated value 1312, midway between actual pixel values 1304 and 1306. A vertical filter is applied along the column of pixel values that include original pixel values 1304 and 1306, shown in FIG. 13B by dashed lines 1314. Interpolated value Y 1312 is computed according to formula 1316. In this example, the value Y' 1320 is interpolated by linear interpolation of the two vertical adjacent values, according to formula 1322. The interpolation value 1324 can be similarly computed by linear interpolation between values 1312 and 1306. The vertical filter 1314 can be similarly applied to compute the interpolated values in the column containing original values 1305 and 1307. FIG. 13C illustrates computation of the interpolated values in horizontal rows between original values 1304 and 1305. In this example, a horizontal filter 1326 is applied to actual pixel values, similar to application of the vertical filter in FIG. 13B. The mid-point interpolation value is computed by formula 1328, and the quarter-point values on either side of the mid-point value can be obtained by linear interpolation according to formula 1330 and a similar formula for the right-hand interpolated value between the mid-point and original value 1305. The same horizontal filter can be applied to the final row containing original values 1306 and 1307. FIG. 13D illustrates computation of the central interpolated point 1340 and adjacent quarter-points between the interpolated mid-point values 1342 and 1344. All remaining values can be obtained by linear interpolation.

Figure 14A:
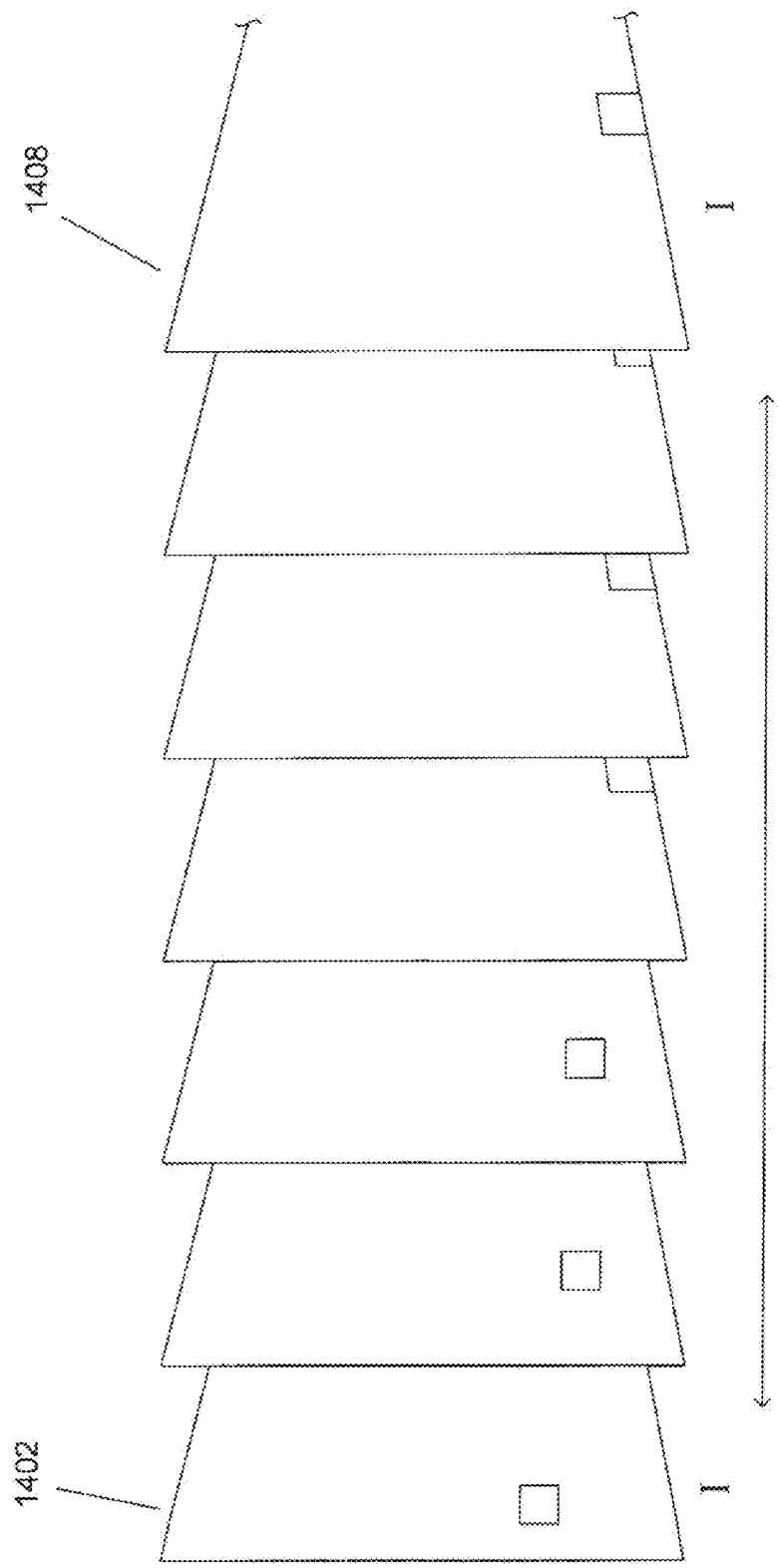
FIGS. 14A-C illustrate the different types of frames and some different types of inter prediction possible with respect to those frames.
Figure 14B:
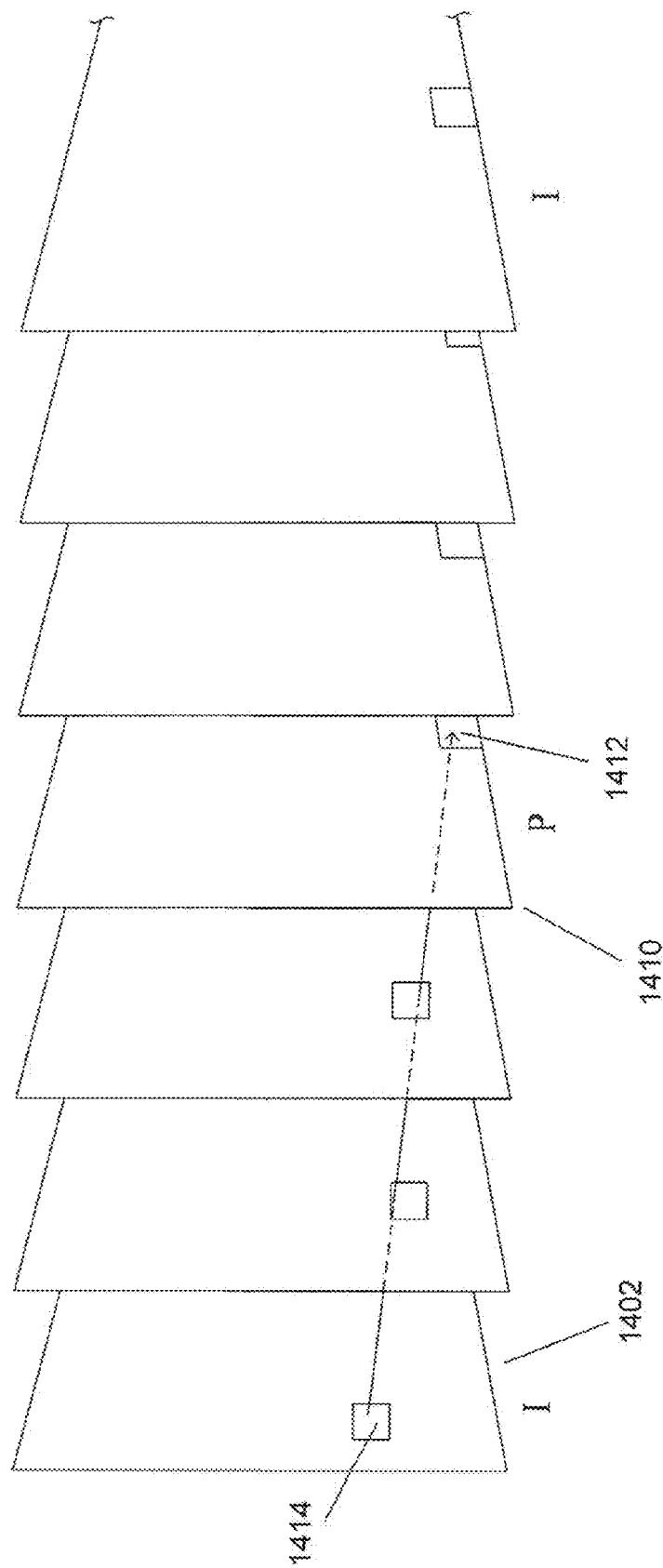
Figure 14C:
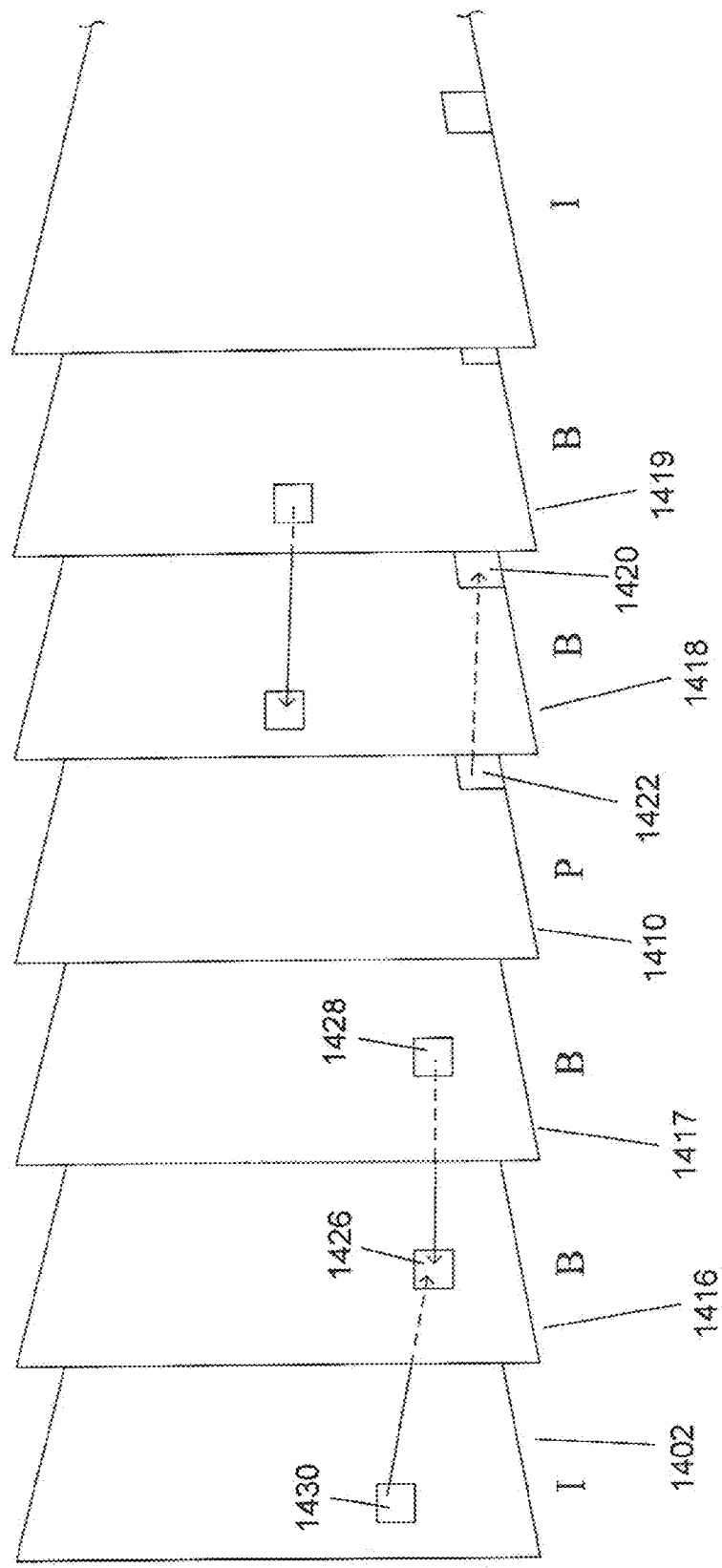

FIGS. 14A-C illustrate examples of different types of frames and the different types of inter prediction possible with respect to these different types of frames. As shown in FIG. 14A, a video signal comprises a linear sequence of video frames. In FIG. 14A, the sequence begins with frame 1402 and ends with frame 1408. A first type of frame in a video signal is referred to as an "I" frame. The pixel values of macroblocks of an I frame cannot be predicted by inter prediction. An I frame is a type of reference point within a decompressed video signal. The contents of an encoded I frame depend only on the contents of the raw-signal I frame. Thus, when systematic errors occur in decompression involving problems associated with inter prediction, the video-signal decompression can be recovered by jumping ahead to a next I reference frame and resuming decoding from that frame. Such errors do not propagate past the I-frame barriers. In FIG. 14A, the first and last frames 1402 and 1404 are I frames.

A next type of frame is illustrated in FIG. 14B. A P frame 1410 may contain blocks that have been inter predicted from an I frame. In FIG. 14B, the block 1412 has been encoded as a motion vector and an identifier for reference frame 1402. The motion vector represents temporal movement of block 1414 in reference frame 1402 to the position of block 1412 in P frame 1410. P frames represent a type of prediction-constrained frame containing blocks that may have been predicted by inter prediction from reference frames. P frames represent another type of barrier frame within an encoded video signal. FIG. 14C illustrates a third type of frame. A B frame 1416-1419 may contain blocks predicted, by inter prediction, from one or two other B frames, P frames, or I frames. In FIG. 14C, B frame 1418 contains a block 1420 that is inter predicted from block 1422 in P frame 1410. B frame 1416 contains a block 1426 that is predicted both from block 1428 in B frame 1417 and block 1430 in reference frame 1402. B frames can make best use of inter prediction, and thus achieve highest compression due to inter prediction, but also have a higher probability of various errors and anomalies that may arise in the decoding process. When a block, such as block 1426, is predicted from two other blocks, the block is encoded as two different reference-frame identifiers and motion vectors, and the predicted block is generated as a possibly weighted average of the pixel values in the two blocks from which it is predicted.

As mentioned above, were intra prediction and/or inter prediction completely accurate, extremely high compression ratios could be obtained. It is certainly far more concise to represent a block as one or two motion vectors and frame offsets than as 256 different pixel values. It is even more efficient to represent a block as one of 13 different intra-prediction modes. However, as can be appreciated by the vast number of different possible macroblock values, considering a macroblock value to be a 256-byte-encoded numerical value, neither intra nor inter prediction can possibly produce an exact prediction of the contents of blocks within a video frame, unless the video signal in which the video frame is contained contains no noise and almost no information, such as a video of a uniform, unchanging, solid-color background. However, even though intra and inter prediction cannot exactly predict the contents of macroblocks, in general, they can often relatively closely approximate the contents of macroblocks. This approximation can be used to generate difference macroblocks that represent the difference between an actual macroblock and the predicted values for the macroblock obtained by either intra or inter prediction. When the prediction is good, the resulting difference block generally contains only small or even zero pixel values.

Figure 15:
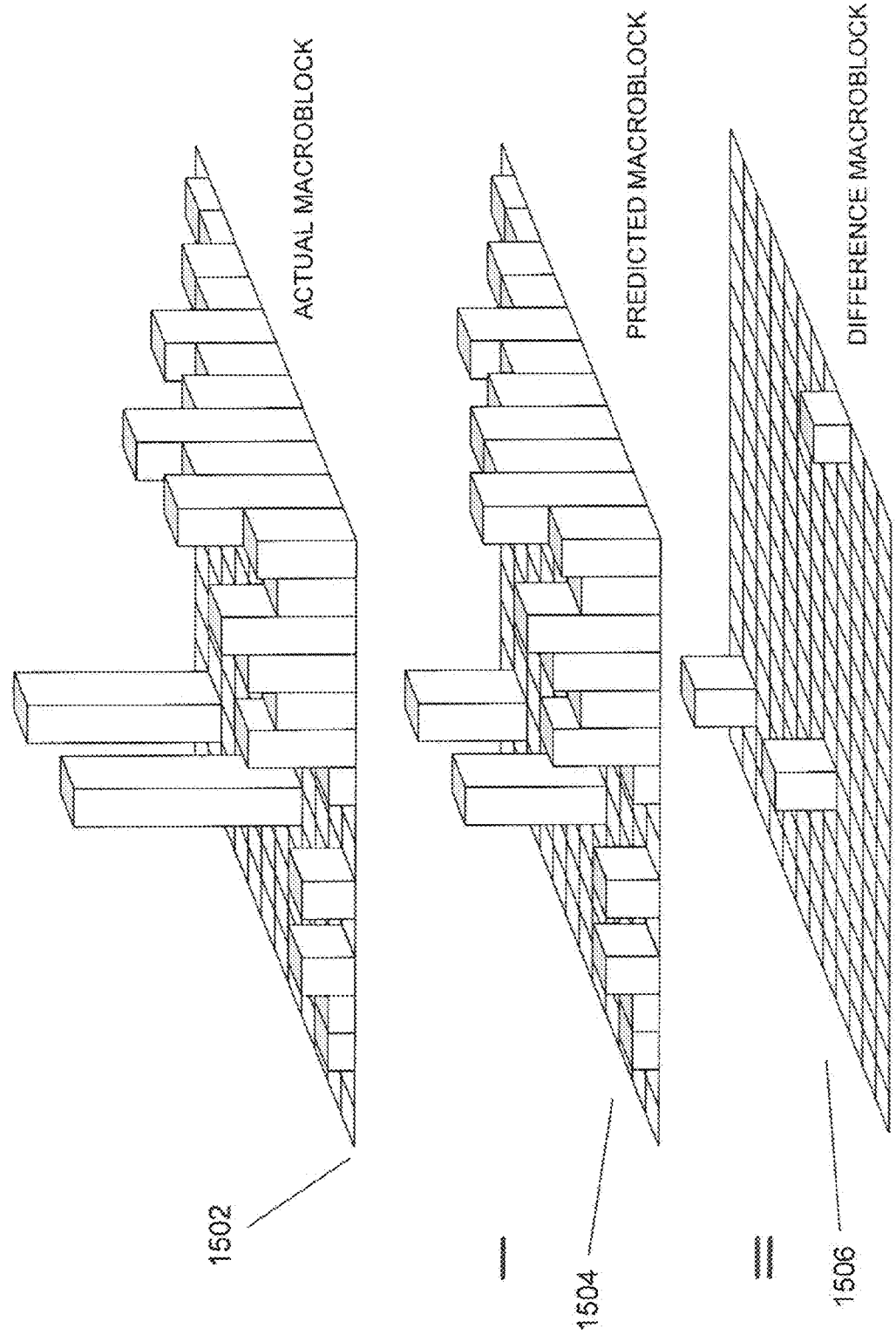
FIG. 15 illustrates generation of difference macroblocks.

FIG. 15 illustrates examples of generation of difference macroblocks. In the FIG. 15 example, macroblocks are shown as three-dimensional graphs, in which the height of columns above a two-dimensional surface of the macroblock represent the magnitudes of pixel values within the macroblock. In FIG. 15, the actual macroblock within a currently considered frame is shown as the top three-dimensional graph 1502. The middle three-dimensional graph represents a predicted macroblock obtained by either intra or inter prediction. Note that the three-dimensional graph of the predicted macroblock 1504 is quite similar to the actual macroblock 1502. FIG. 15 represents a case where either intra or inter prediction has generated a very close approximation of the actual macroblock. Subtraction of the predicted macroblock from the actual macroblock generates a difference macroblock, shown as the lower three-dimensional graph 1506 in FIG. 15. While FIG. 15 is an exaggeration of a best case prediction, it does illustrate that the difference macroblock not only generally contains smaller-magnitude values, but often fewer non-zero values, than the actual end-predicted macroblocks. Also note that the actual macroblock can be fully restored by adding the difference macroblock to the predicted macroblock. Of course, predicted pixel values may exceed or fall below actual pixel values, so that the difference macroblock may contain both positive and negative values. However, by way of example, shifting of the origin can be used to produce an all-positive-valued difference macroblock.

Figure 16:
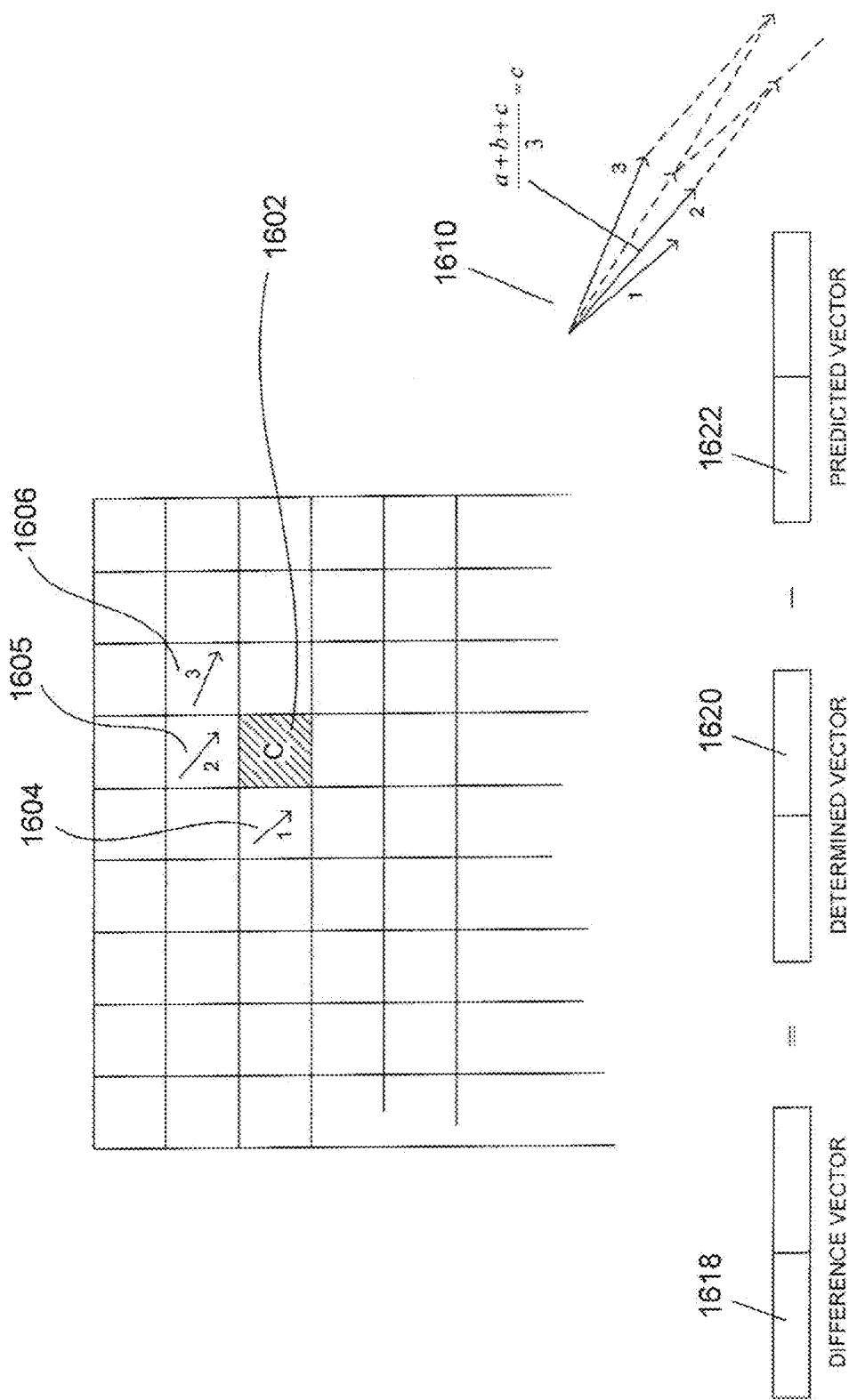
FIG. 16 illustrates motion-vector and intra-prediction-mode prediction.

Just as the pixel values within a macroblock can be predicted from the values in blocks spatially adjacent and/or temporally adjacent to the macroblock, the motion vectors generated by inter prediction and the modes generated by intra prediction, can also be predicted. FIG. 16 illustrates an example of motion-vector and intra-prediction-mode prediction. In FIG. 16, a currently considered block 1602 is shown within a grid of blocks of a portion of a frame. Adjacent blocks 1604-1606 have already been compressed by intra or inter prediction. Therefore, there is either an intra-prediction mode, which is a type of displacement vector, or a inter-prediction motion vector associated with these neighboring, already compressed blocks. It is therefore reasonable to assume that the spatial vector or temporal vector, depending on whether intra or inter prediction is used, associated with the currently considered block 1602 would be similar to the spatial or temporal vectors associated with the neighboring, already compressed blocks 1604-1606. In fact, the spatial or temporal vector associated with currently considered block 1602 may be predicted as the average of the spatial or temporal vectors of the neighboring blocks, as shown by the vector addition 1610 to the right of FIG. 16. Therefore, rather than coding motion vectors or inter-prediction modes directly, the H.264 standard computes a difference vector, based on vector prediction, as the predicted vector 1622 subtracted from the actual computed vector 1622. The temporal motion of blocks between frames and spatial homogeneities within a frame would be expected to be generally correlated, and, therefore, predicted vectors would be expected to closely approximate actual, computed vectors. The difference vector is therefore generally of smaller magnitude than the actual, computed vector, and therefore can be encoded using fewer bits. Again, as with a difference macroblock, the actual, computed vector can be accurately reconstituted by adding the difference vector to the predicted vector.

Once a difference macroblock is produced, by either inter or intra prediction, the difference macroblock is then decomposed into 4×4 difference blocks, according to a predetermined order, each of which is transformed by an integer transform to produce a corresponding coefficient block, the coefficients of which are then quantized to produce a final sequence of quantized coefficients. The advantage of intra and inter prediction is that the transform of the difference block generally produces a large number of trailing zero coefficients, which can be quite efficiently compressed by a subsequent entropy-coding step.

Figure 17:
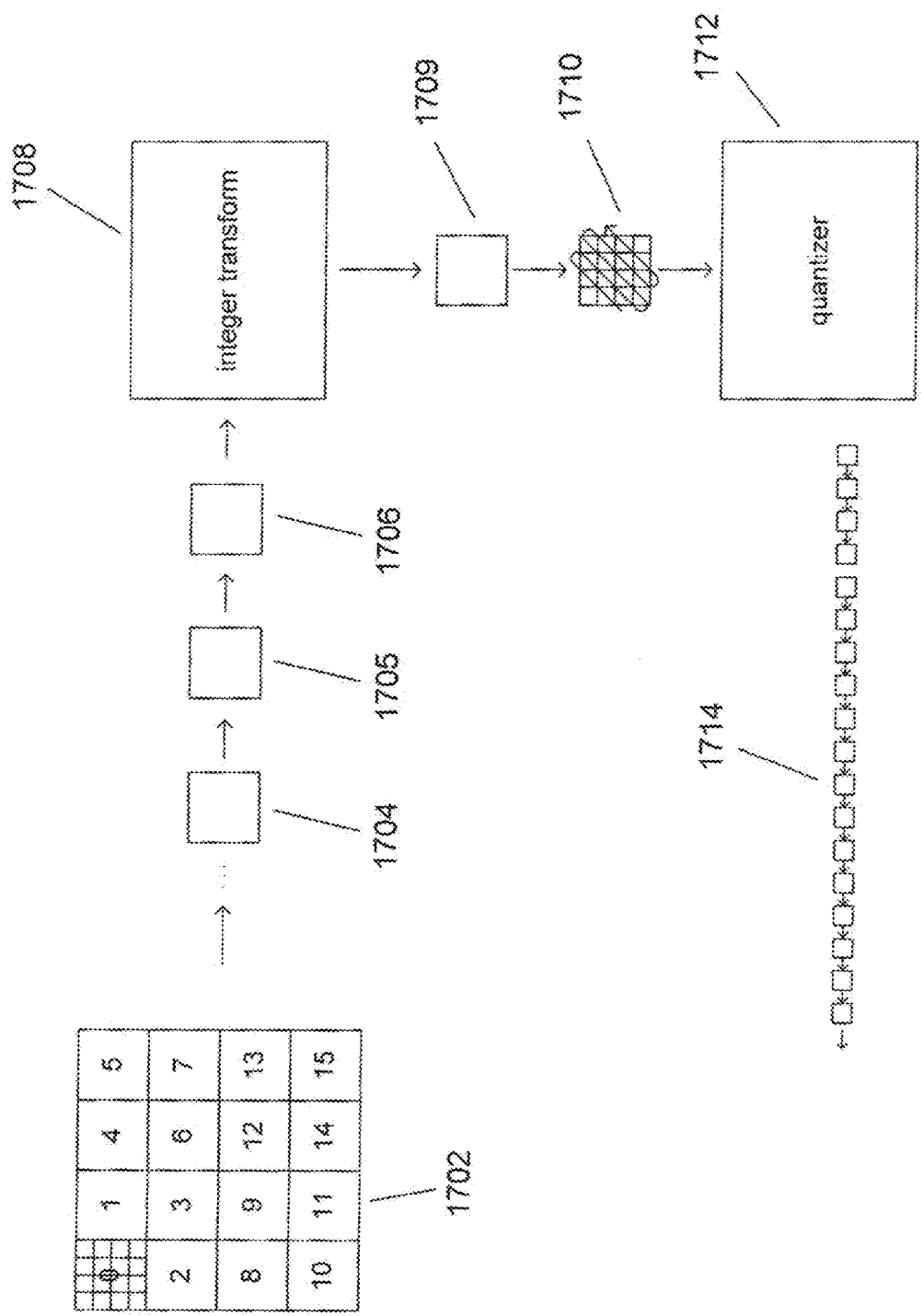
FIG. 17 illustrates decomposition, integer transformation, and quantization of a difference macroblock.

FIG. 17 illustrates one example of decomposition, integer transformation, and quantization of a difference macroblock. In this example, the difference macroblock 1702 is decomposed into 4×4 difference blocks 1704-1706 in the order described by the numerical labels of the cells of the difference macroblock in FIG. 17. An integer transform 1708 computation is performed on each 4×4 difference block to produce a corresponding 4×4 coefficient block 1709. The coefficients in the transformed 4×4 block are serialized according to a zig-zag serialization pattern 1710 to produce a linear sequence of coefficients which are then quantized by a quantization computation 1712 to produce a sequence 1714 of quantized coefficients. Many of the already discussed steps in video-signal compression are lossless. Macroblocks can be losslessly regenerated from intra or inter prediction methods and corresponding difference macroblocks. There is also an exact inverse of the integer transform. However, the quantization step 1712 is a form of lossy compression in that, once quantized, an approximate value of the original coefficient can be regenerated by an approximate inverse of the quantization method, referred to as "rescaling.". Chroma-plane decimation is another lossy compression step, in that the higher-resolution chroma data cannot be recovered from lower-resolution chroma data. Quantization and chroma-plane decimation are, in fact; the two lossy compression steps in the H.264 video-compression technique.

FIG. 18 provides derivation of the integer transform and inverse integer transform employed in H.264 video compression and video decompression, respectively. The symbol "X" 1802 represents a 4×4 difference, or residual, block (e.g. 1704-1706 in FIG. 17). A discrete cosign transform, a well-known discrete-Fourier-like transform, is defined by a first set of expressions 1804 in FIG. 18. The discrete cosign transform is, as shown expression 1806, a matrix-multiplication-based operation. The discrete cosign transform can be factored as shown in expression 1808 in FIG. 18. The elements of matrix C 1810 include a rational number "d" 1812. In order to efficiently approximate the discrete cosign transform, this number can be approximated as ½, leading to approximate matrix elements 1814 in FIG. 18. This approximation, with multiplication of two rows of matrix C in order to produce all-integer elements, produces the integer transform 1818 in FIG. 18 and a corresponding inverse integer transform 1820.

Figure 19:
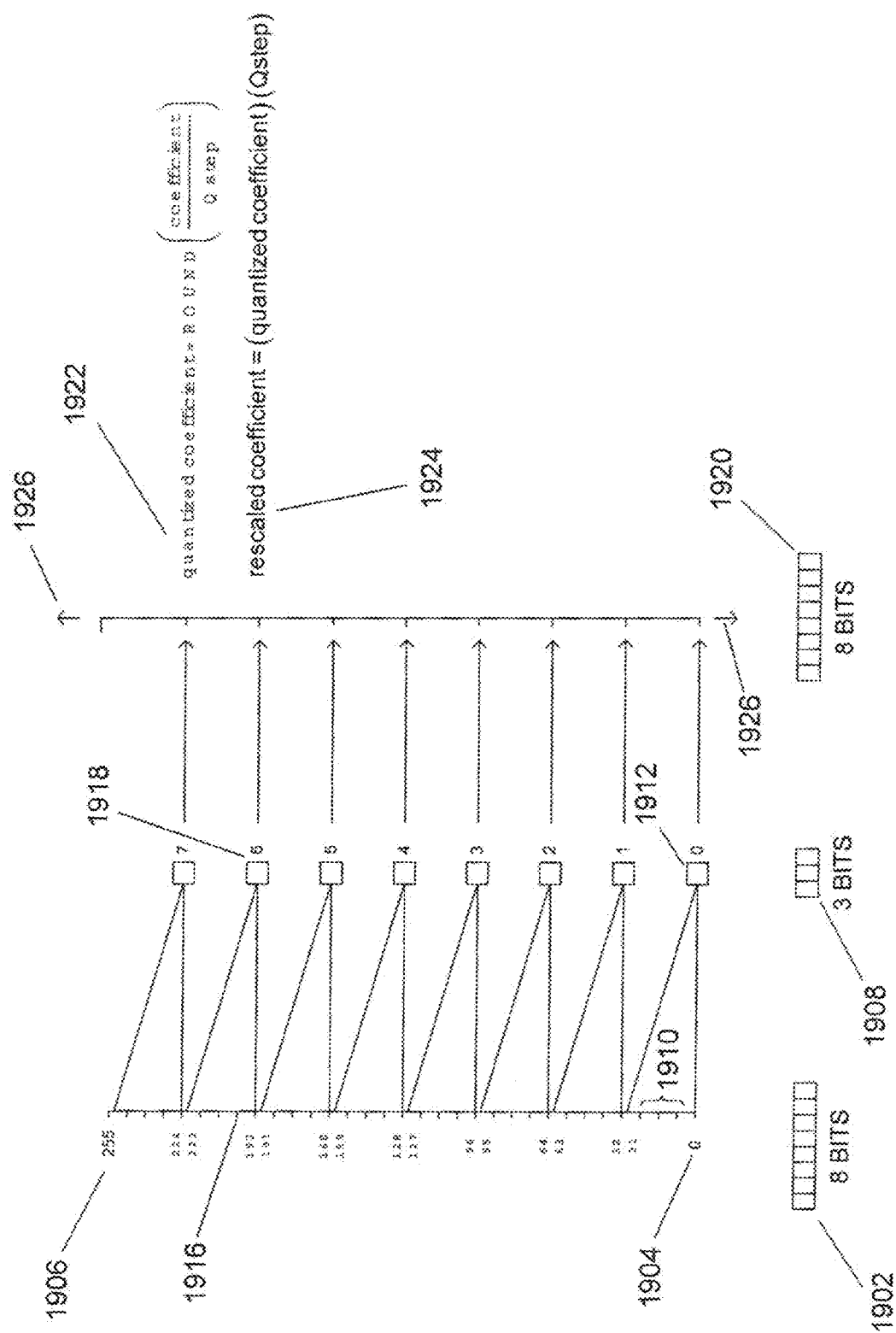
FIG. 19 illustrates the quantization process.

FIG. 19 illustrates the quantization process. Consider, as a simple example, a number encoded in eight bits 1902 that can therefore range in value between 0 (1904 in FIG. 19) and 255 (1906 in FIG. 19), potentially assuming any integer value in the range 0-255. A quantization process can be used to encode the eight-bit number 1902 in only three bits 1908 by an inverse linear interpolation of integers in the range 0-255 to integers in the range 0-7, as shown in FIG. 19. In this case, integer values 0-31 represented by an eight-bit-encoded number are all mapped to the value 0 (1912 in FIG. 19). Successive ranges of 32 integer values are mapped to the values 1-7. Thus, for example, quantization of the integer 200 (1916 in FIG. 19) produces the quantized value 6 (1918 in FIG. 19). Eight-bit values can be regenerated from the three-bit quantized values by simple multiplication. The three-bit quantized value can be multiplied by 32 to produce an approximation of the original eight-bit number. However, the approximate number 1920 can have only one of the values 0, 32, 64, . . . , 224. In other words, quantization is a form of numeric-value decimation, or loss of precision. A rescaling process, or multiplication, can be used to regenerate numbers that approximate the original values that were quantized, but cannot recover the precision lost in the quantization process. In general, quantization is expressed by formula 1922, and the inverse of quantization, or rescaling, is expressed by formula 1924. The value "Qstep" in these formulas controls the degree of precision lost in the quantization procedure. In the example illustrated on the left side of FIG. 19, Qstep has the value "32." A smaller value of Qstep provides a smaller loss in precision, but also less compression, while larger values provide greater compression, but also greater loss of precision. For example, in the example shown in FIG. 19, had Qstep been 128 rather than 32, the eight-bit number could have been encoded in a single bit, but rescaling would produce only the two values 0 and 128. Note also that the rescaled values can be vertically shifted, as indicated by arrows 1926 and 1928, by an additional addition step following rescaling. For example, in the example shown in FIG. 19, rather than generating values 0, 32, 64, . . . , 224, addition of 16 to the rescaled values generates corresponding values of 16, 48, . . . , 240, leaving a less dramatic gap at the top of the rescaled vertical number line.

Following quantization of residual, or difference, blocks and collection of difference vectors and other objects produced as a stream of data from the steps upstream to entropy encoding, an entropy encoder is applied to the partially compressed data stream to produce an entropy-encoded data stream that comprises the payload of the NAL packets, described above with reference to FIG. 5. Entropy encoding is a lossless encoding technique that takes advantage of statistical non-uniformities in the partially encoded data stream. One well-known example of entropy encoding is the Morse code, which uses single-pulse encoding of commonly occurring letters, such as "E" and "T," and four-pulse or five-pulse encodings of infrequently encountered letters, such as "Q" and "Z."

Figure 20:
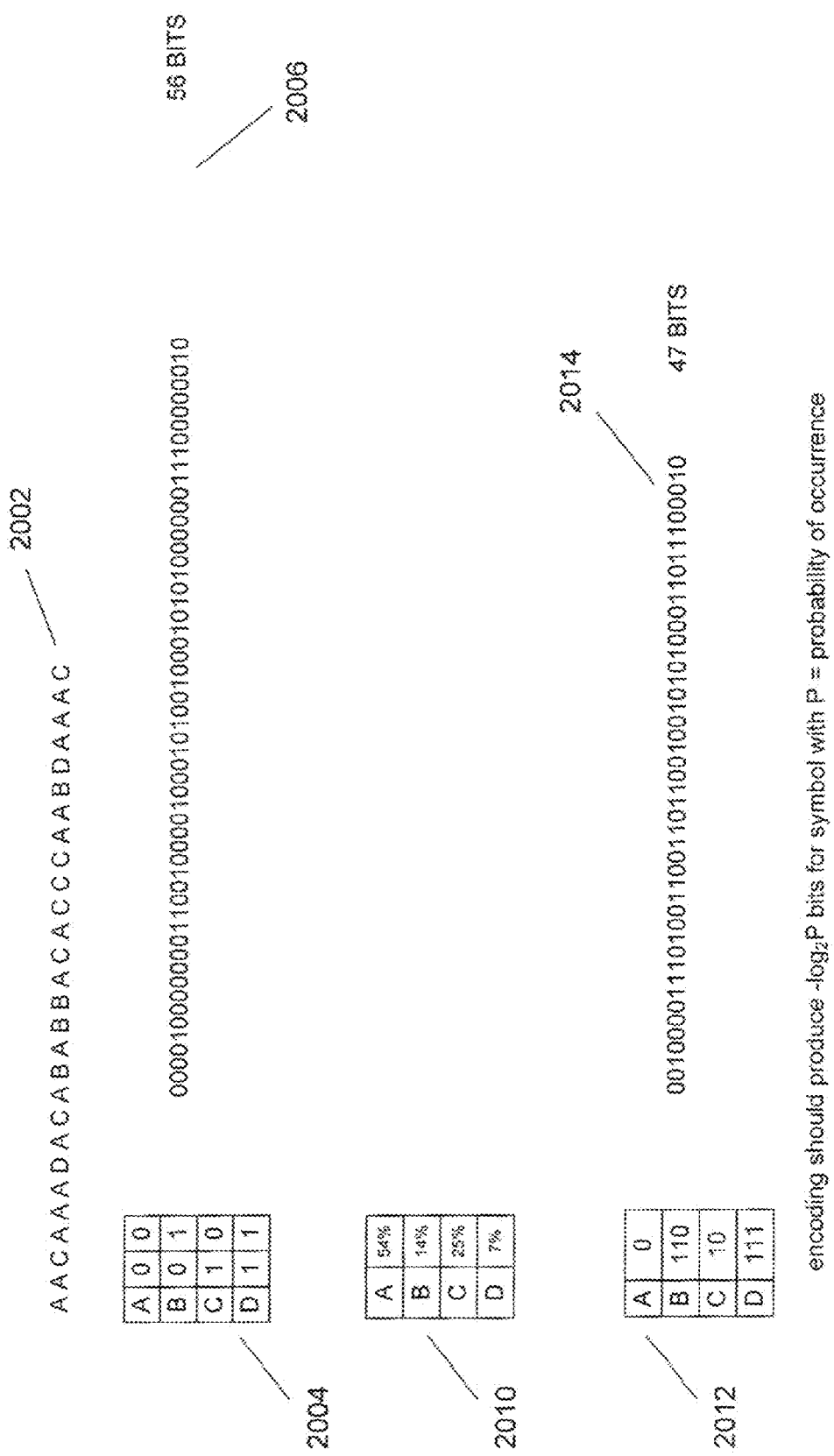
FIG. 20 provides a numerical example of entropy encoding.

FIG. 20 provides a numerical example of entropy encoding. Consider the four-symbol character string 2002 comprising 28 symbols, each selected from one of the four letters "A," "B," "C," and "D." A simple and intuitive encoding of this 28-symbol string would be to assign one of four different two-bit codes to each of the four letters, as shown in the encoding table 2004. Using this two-bit encoding, a 56-bit encoded symbol string 2006 equivalent to symbol string 2002 is produced. However, analysis of the symbol string 2002 reveals the percentage occurrence of each symbol, shown in table 2010. "A" is, by far, the most frequently occurring symbol, and "D" is, by far, the least frequently occurring symbol. A better encoding is represented by encoding table 2012, which uses a variable-length representation of each symbol. "A" being the most frequently occurring symbol, is assigned the code "0." The least-frequently occurring symbols "B" and "D" are assigned the codes "110" and "111," respectively. Using this encoding produces the encoded symbol string 2014, which uses only 47 bits. In general, a binary entropy encoding should produce an encoded symbol of $-\log_2 P$ bits for symbols with a probability of occurrence of P. While the improvement in encoding length is not spectacular, in the example shown in FIG. 20, for long sequences of symbols having decidedly non-uniform symbol-occurrence distributions, entropy encoding produces relatively high compression ratios.

Figure 21A:
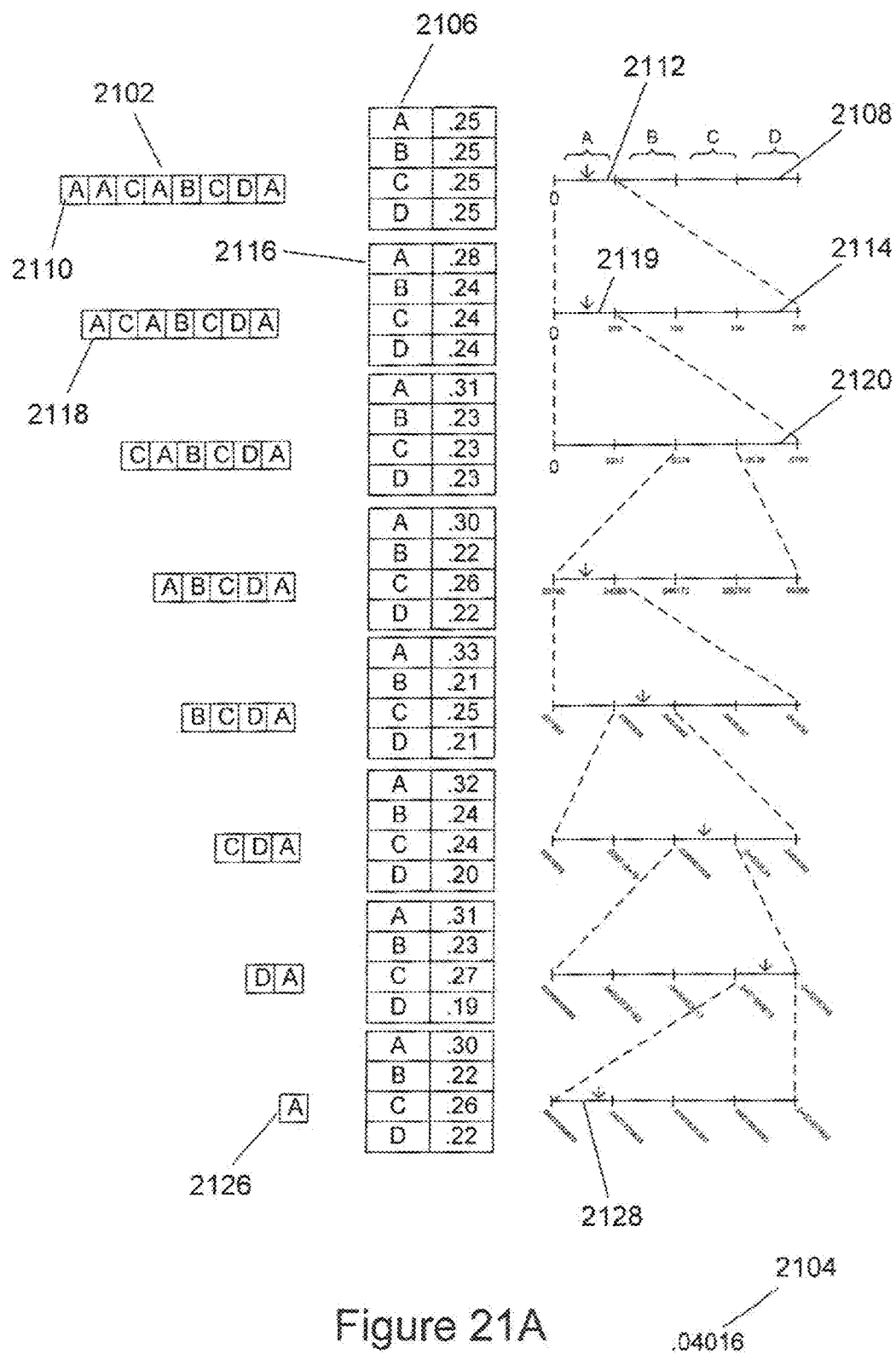
FIGS. 21A-B provide an example of arithmetic encoding.
Figure 21B:
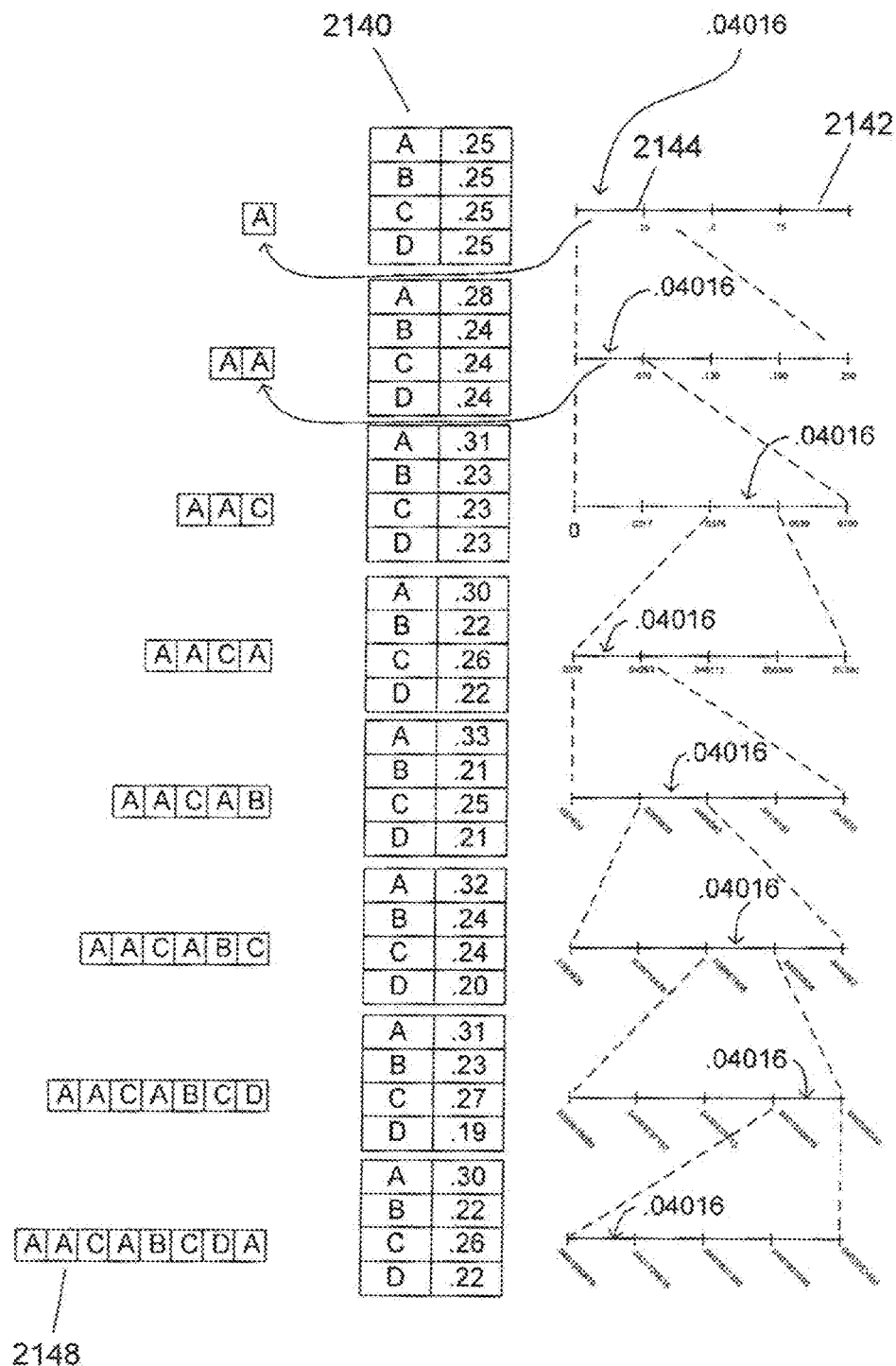

One type of entropy encoding is referred to as "arithmetic encoding." A simple example is provided in FIGS. 21A-B. The arithmetic encoding illustrated in FIGS. 21A-B is a version of a context-adaptive encoding method. In this example, an eight-symbol sequence 2102 is encoded as a five-place fractional value 0.04016 (2104 in FIG. 21A), which can be encoded by any of various known binary numerical encodings to produce a binary encoded symbol string. In this simple example, a symbol-occurrence-probability table 2106 is updated constantly during the coding process. This provides context adaption, since the encoding method dynamically changes, over time, as the symbol-occurrence probabilities are adjusted according to the symbol-occurrence frequencies observed during coding. Initially, for lack of a better set of initial probabilities, the probabilities for all symbols is set to 0.25. At each step, an interval is employed. The interval at each step is represented by a number line, such as number line 2108. Initially, the interval ranges from 0 to 1. At each step, the interval is divided into four partitions according to the probabilities in the current symbol-occurrence-frequency table. Because the initial table contains equal probabilities of 0.25, the interval is divided, in the first step, into four equal parts. In the first step, the first symbol "A" 2110 in the symbol sequence 2102 is encoded. The interval partition 2112 corresponding to this first symbol is selected as the interval 2114 for the next step. Furthermore, because the symbol "A" was encountered, the symbol-occurrence probabilities are adjusted in the next version of the table 2116 by increasing probability of occurrence for symbol "A" by 0.03, and decreasing probabilities of occurrence of the remaining symbols by 0.01. The next symbol is also "A" 2118, and so the first interval partition 2119 is again selected to be the subsequent interval 2120 for the third step. This process continues until all symbols in the symbol string have been consumed. The final symbol, "A," 2126, selects the first interval 2128 in the final interval computed in the procedure. Note that the intervals decrease in size with each step, and generally require a greater number of decimal places to specify. The symbol string can be encoded by selecting any value within the final interval 2128. The value 0.04016 falls within this interval, and therefore represents an encoding of the symbol string. The original symbol string can be regenerated, as shown in FIG. 21B, by starting the process again with an initial, equal-valued symbol-occurrence-frequency probability table 2140 and an initial interval of 0-1 2142. The encoding, 0.04016, is used to select a first partition 2144 which corresponds to the symbol "A." Then, in steps similar to the steps in the forward process, shown in FIG. 21A, the encoding 0.04016 is used to select each subsequent partition of each subsequent interval until the final symbol string is regenerated 2148.

While this example illustrates the general concept of arithmetic encoding, it is an artificial example, because the example assumes infinite precision arithmetic and because the symbol-occurrence-frequency-probability table adjustment algorithm would quickly lead to unworkable values. Actual arithmetic encoding does not assume infinite precision arithmetic, and instead employs techniques to adjust the intervals in order to allow for interval specification and selection within the precision provided by any particular computer system. The H.264 standard specifies several different encoding schemes, one of which is a context-adaptive arithmetic encoding scheme. Table-lookup procedures are used for encoding frequently occurring symbol strings produced by the up-stream encoding techniques, including various metadata and parameters included in the partially compressed data stream to facilitate subsequent decompression.

Figure 22A:
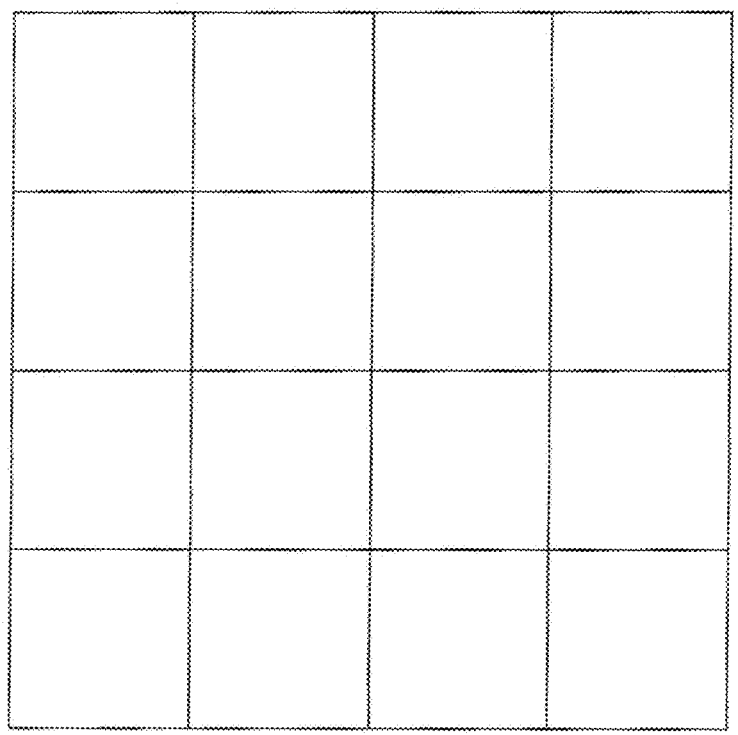
FIGS. 22A-B illustrate one commonly occurring artifact and a filtering method that is used, as a final step in decompression, to ameliorate the artifact.
Figure 22B:
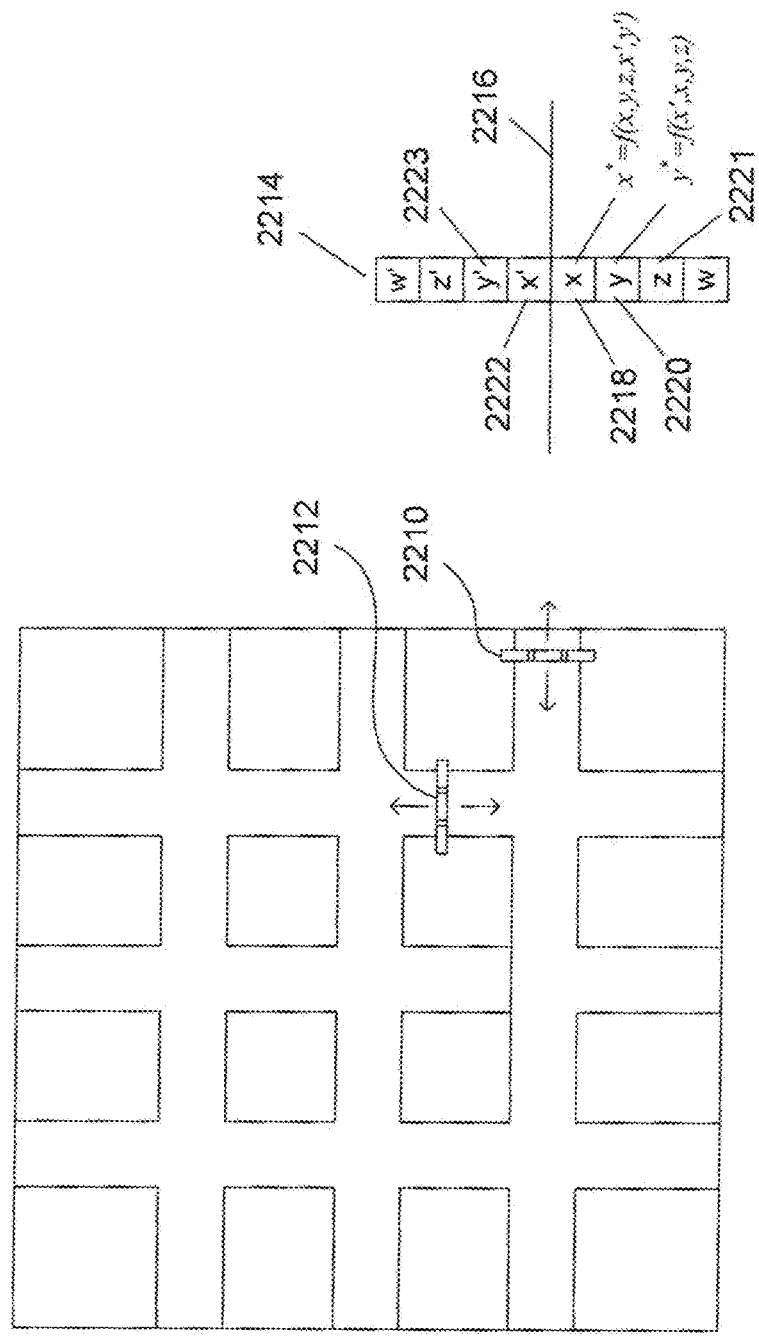

When video-data streams are compressed according to the H.264 technique, subsequent decompression may yield certain types of artifacts. By way of example, FIGS. 22A-B illustrate one commonly occurring artifact and a filtering method that is used, as a final step in decompression, to ameliorate the artifact. As shown in FIG. 22A, a decompressed video image, without filtering, may appear blocked. Because decompression and compression are carried out on a block-by-block basis, various block boundaries can represent significant discontinuities in compression/decompression processing, leading to a visually-perceptible blocking of a displayed, decompressed video image. FIG. 22B illustrates a deblocking-filter method, employed in H.264 decompression, to ameliorate the blocking artifact. In this technique, vertical 2210 and horizontal 2212 filters, similar to the filters used for pixel-value interpolation, discussed above with reference to FIGS. 13A-D, are passed along all block boundaries in order to smooth discontinuities in the pixel-value gradients across the block boundaries. Three pixel values on each side of the boundary may be affected by the block-filter method. On the right of FIG. 22B, an example of a deblocking-filter application is shown. In this example, the filter 2214 is represented as a vertical column containing four pixel values on either side of a block boundary 2216. Application of the filter produces filtered pixel values for the first three pixel values on either side of the block boundary. As one example, the filtered value for pixel 2218, x*, is computed from the prefiltered values of pixels 2218, 2220, 2221, 2222, and 2223. The filter tends to average, or smear, pixel values in order to reestablish a continuous gradient across the boundary.

Figure 23:
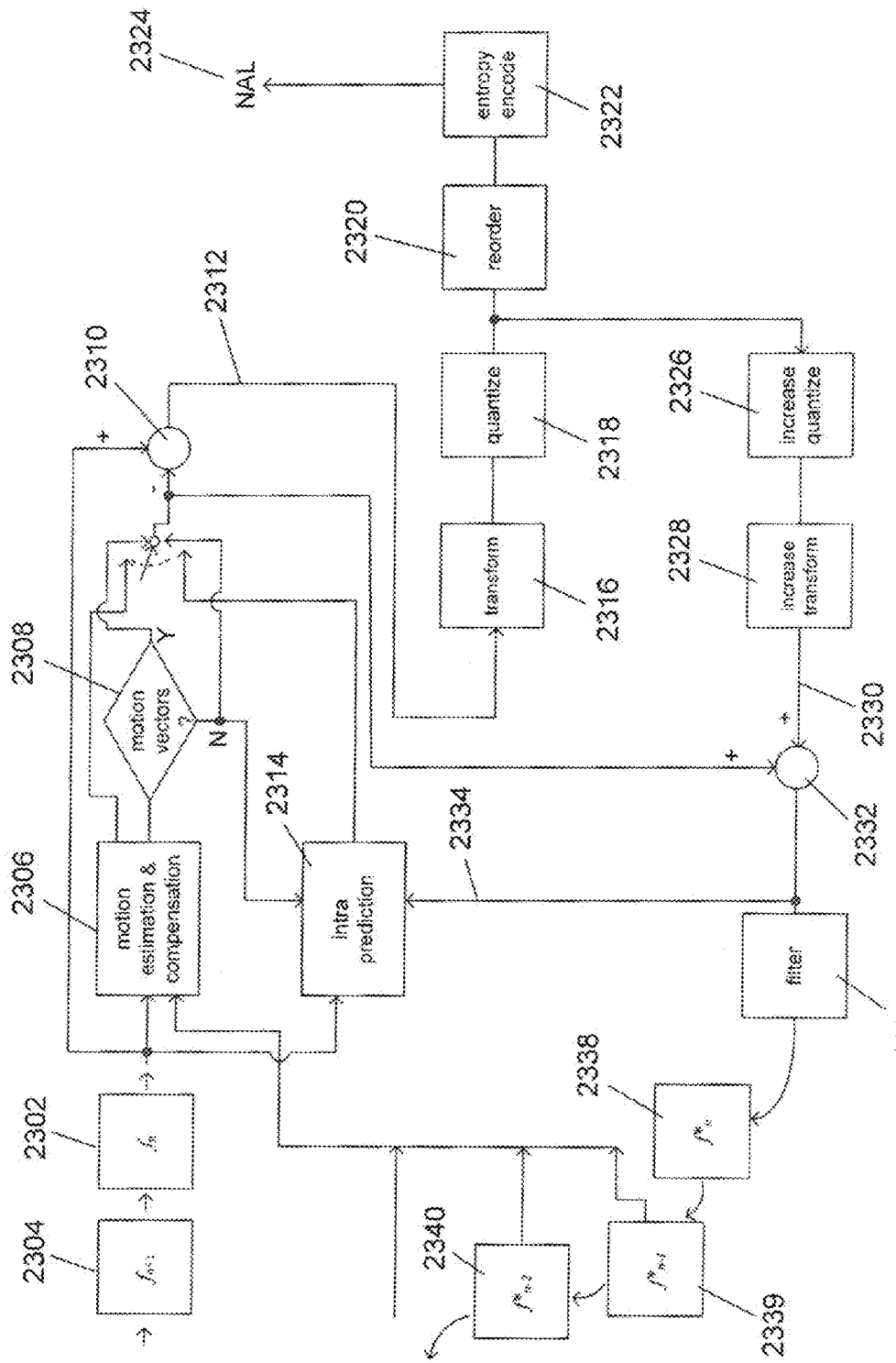
FIG. 23 summarizes H.264 video-data-stream encoding.

FIG. 23 summarizes H.264 video-data-stream encoding. FIG. 23 provides a block diagram, and a therefore high-level description of the encoding process. However, this diagram, along with the previous discussion and previously referenced figures, provides a substantial overview of H.264 encoding. Additional details are revealed, as necessary, to describe particular video-codec embodiments of the present invention. It should be noted that there are a plethora of fine points, details, and special cases in video encoding and video decoding that cannot be addressed in an overview section of this document. For ease of communication and simplification, the examples herein are largely based on the H.264 standard, however, in no way should it be construed that the invention presented herein is limited to H.264 applications. The official H.264 specification is over 500 pages long. These many details include, for example, special cases that arise from various boundary conditions, specific details, and optional alternative methods that can be applied in various context-related cases. Consider, for example, intra prediction. Intra prediction modes depend on the availability of pixel values in specific, neighboring blocks. For boundary blocks without neighbors, many of the modes cannot be used. In certain cases, unavailable neighboring pixel values may be interpolated or approximated in order to allow a particular intra-prediction mode to be used. Many interesting details in the encoding process are related to choosing optimal prediction methods, quantization parameters, and making other such parameter choices in order to optimize the compression of a video data stream. The H.264 standard does not specify how compression is to be carried out, but instead specifies the format and contents of an encoded video-data stream and how the encoded video data stream is to be decompressed. The H.264 standard also provides a variety of different levels of differing computational complexity, with high-end levels supporting more computationally expensive, but more efficient additional steps and methods. The current overview is intended to provide sufficient background to understand the subsequently provided description of various embodiments of the present invention, but is in no way intended to constitute a complete description of H.264 video encoding and decoding.

In FIG. 23, a stream of frames 2302-2304 are provided as input to an encoding method. In this example, the frames are decomposed into macroblocks or macroblock partitions, as discussed above, for subsequent processing. In a first processing step, a currently considered macroblock or macroblock partition is attempted to be inter predicted from one or more reference frames. When inter prediction is successful, and one or more motion vectors generated, as determined in step 2308, then the predicted macroblock generated by the motion estimation and compensation step 2306 is subtracted from the actual, raw macroblock in a differencing step 2310 to produce a corresponding residual macroblock which is output by the differencing step onto data path 2312. However, if inter prediction fails, as also determined in step 2308, then an intra prediction step 2314 is launched to carry out intra prediction on the macroblock or macroblock partition, which is then subtracted from the actual raw macroblock or macroblock partition, in step 2310, to produce a residual macroblock or residual macroblock partition output to data path 2312. The residual macroblock or residual macroblock partition is then transformed, by the transform step 2316, quantized by the quantize step 2318, potentially re-ordered for more efficient encoding in step 2320, and then entropy encoded in step 2322 to produce a stream of output NAL packets 2324. In general, compression implementations seek to employ the prediction method that provides closest prediction of a considered macroblock, while balancing the cost, in time and memory usage, of various prediction methods. Any of various different orderings and selection criteria for applying prediction methods can be used.

Continuing to follow the example of FIG. 23, following quantization, in step 2318, the quantized coefficients are input to the re-ordering and entropy-encoding stages 2320 and 2322, and also input to an inverse quantizer 2326 and an inverse transform step 2328 to regenerate a residual macroblock or residual macroblock partition that is output onto data path 2330 by the inverse transform step. The residual macroblock or macroblock partition output by the inverse transform step is generally not identical to the residual macroblock or residual macroblock partition output by the differencing step 2310 to data path 2312. Recall that quantization is a lossy compression technique. Therefore, the inverse quantizing step 2326 produces an approximation of the original transform coefficients, rather than accurately reproducing the original transform coefficients. Therefore, although the inverse integer transform would produce an exact copy of the residual macroblock or macroblock partition, were it applied to the original coefficients produced by the integer transform step 2316, because the inverse integer transform step 2328 is applied to rescaled coefficients, only an approximation to the original residual macroblock or macroblock partition is produced in step 2328. The approximate residual macroblock or macroblock partition is then added to the corresponding predicted macroblock or macroblock partition, in the addition step 2332, to generate a decompressed version of the macroblock. The decompressed, but not filtered, version of the macroblock is input to the intra prediction step 2312, via data path 2334, for intra prediction of a subsequently processed block. The deblocking filter 2336 step is performed on decompressed macroblocks to produce filtered, decompressed macroblocks that are then combined to produce decompressed images 2338-2340 that may be input to the motion estimation and compensation step 2306. One subtlety involves input of the decompressed frames to motion estimation and compensation step 2306 and decompressed, but non-filtered macroblocks and macroblock partitions to the intra prediction step 2314. Recall that both intra prediction and most motion estimation and compensation use neighboring blocks, either in a current frame, in the case of spatial prediction, or in previous and/or subsequent frames, in the case of temporal, inter prediction, in order to predict values in a currently considered macroblock or macroblock partition. But, consider the recipient of a compressed data stream. The recipient will not have access to the original, raw video frames 2302 and 2304. Therefore, during decompression, the recipient of the encoded video data stream will use previously decoded or decompressed macroblocks for predicting the contents of subsequently decoded macroblocks. If the encoding process were to use the raw video frames for prediction, then the encoder would be using different data for prediction than is subsequently available to the decoder. This would cause significant errors and artifacts in the decoding process. To prevent this, the encoding process generates decompressed macroblocks and macroblock partitions, and decompressed and filtered video frames for use in the inter and intra prediction steps, so that intra and inter prediction use the same data for predicting contents of macroblocks and macroblock partitions as will be available to any decompressing procedure that can rely only on the encoded video data stream for decompression. Thus, the decompressed but unfiltered macroblock and macroblock partitions input through data path 2334 to the intra prediction step 2314 are the neighboring blocks from which a current macroblock or macroblock partition is subsequently predicted, and the decompressed and filtered video frames 2338-2340 are used as reference frames by the motion estimation and compensation step 2306 for processing other frames.

Figure 24:
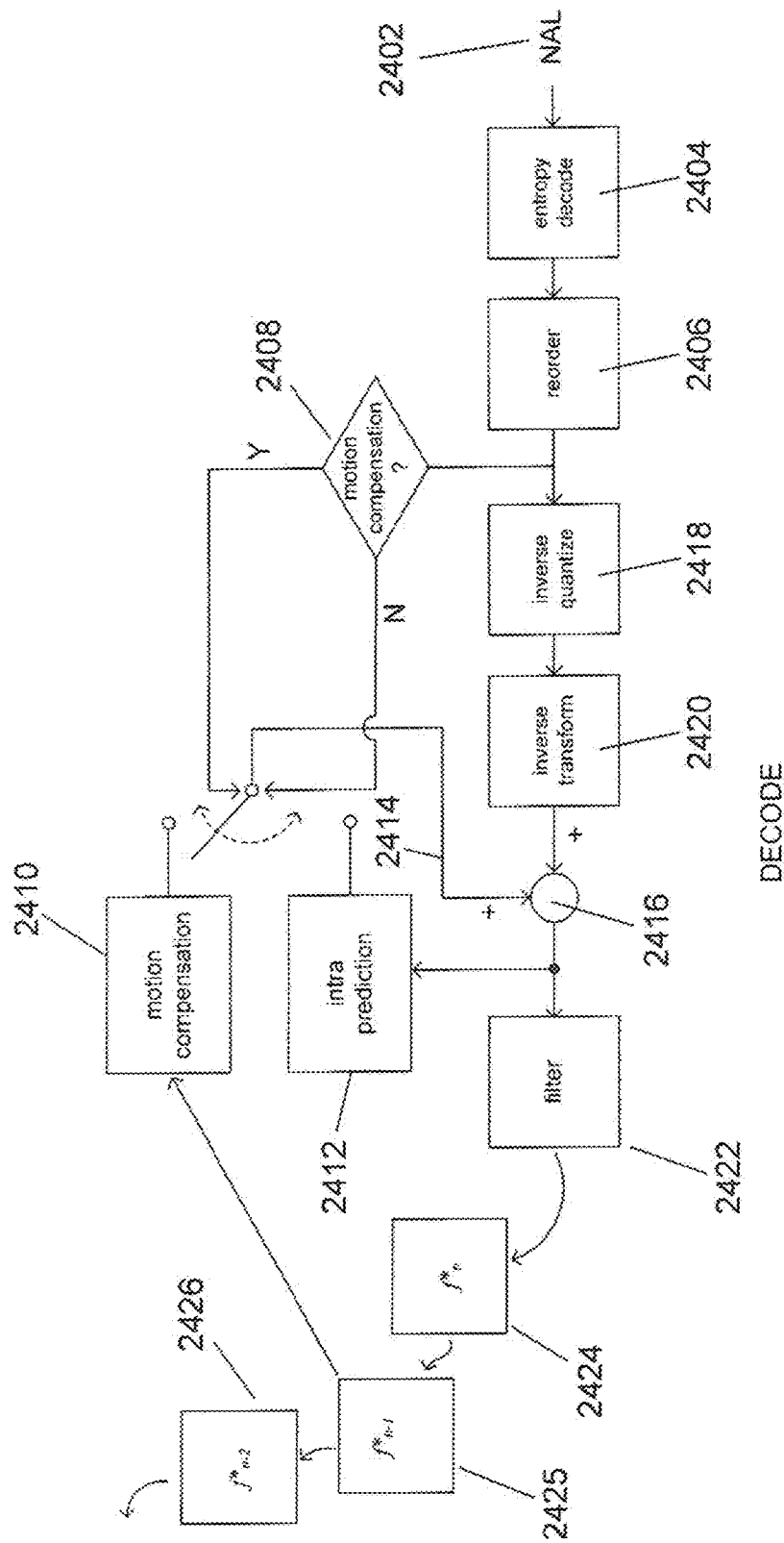
FIG. 24 illustrates, in a block diagram fashion similar to that used in FIG. 23, the H.264 video-data-stream decoding process.

FIG. 24 illustrates an example in a block diagram fashion similar to that used in FIG. 23, the H.264 video-data-stream decoding process. Decompression is more straightforward than compression. A NAL packet stream 2402 is input into an entropy decode step 2404 which applies an inverse entropy encoding to generate quantized coefficients that are reordered by a reordering step 2406 complementary to the reordering carried out by the reorder step 2320 in FIG. 23. Information in the entropy decoded stream can be used to determine the parameters by which the data was originally encoded, including whether or not intra prediction or inter prediction was employed during compression of each block. This data allows for selecting, via step 2408, either inter prediction, in step 2410, or intra prediction, in step 2412, for producing predicted values for macroblocks and macroblock partitions that are furnished along data path 2414 to an addition step 2416. The reordered coefficients are rescaled by an inverse quantifier, in step 2418, and an inverse integer transform is applied, in step 2420, to produce an approximation of the residual, or residual, macroblocks or macroblock partitions, which are added, in the addition step 2416, to predicted macroblocks or macroblock partitions generated based on previously decompressed macroblocks or macroblock partitions. The addition step produces decompressed macroblocks or macroblock partitions to which a deblocking filter is applied in order to produce final decompressed video frames, in step 2422, to produce the decompressed video frames 2424-2426. The decompression process is essentially equivalent to the lower portion of the compression process, shown in FIG. 23.

Subsection II

Principles of Parallel Integrated-Circuit Design for Addressing Complex Computational Tasks According to the Present Invention The problem of implementing a computational engine to carry out H.264 compression and decompression is an exemplary problem domain with which to illustrate the present invention. In this subsection, the principles for developing a parallel, pipelined, integrated-circuit computational engine for carrying out H.264 compression and decompression are described as an example of the general approach of computational-engine design that represent embodiments of the present invention. The present invention is in no way limited to H.264 implementations.

Figure 25:
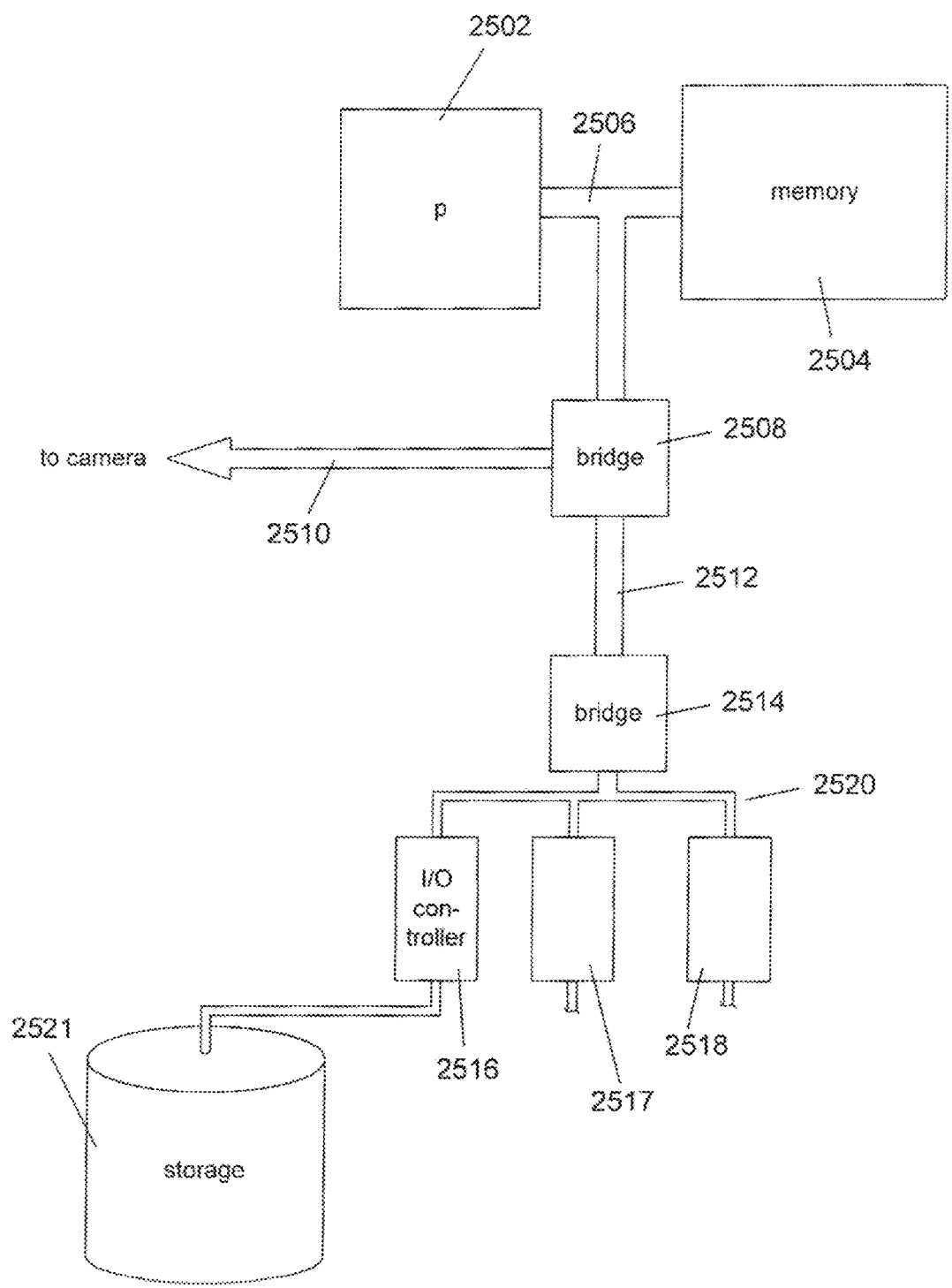
FIG. 25 is a very high-level diagram of a general purpose computer.

One way to implement a video codec that carries out the H.264 video compression and decompression, discussed in the first subsection, is to program the encoding and decoding processes in software, and execute the program on a general-purpose computer. FIG. 25 is a very high-level diagram of a general-purpose computer. The computer includes a processor 2502, memory 2504, a memory/processor bus 2506 that interconnects the processor, memory, and a bridge 2508. The bridge interconnects the processor/memory bus 2506 with a high-speed data-input bus 2510 and an internal bus 2512 that connects the first bridge 2508 with a second bridge 2514. The second bridge is, in turn, connected to various devices 2516-2518 via high-speed communications media 2520. One of these devices is an I/O controller 2516 that controls a mass-storage device 2521.

Consider execution of the software program that implements a video codec. In this example, the software program is stored on the mass-storage device 2521 and paged, on an as-needed basis, into memory 2504. Instructions of the software program must be fetched, by the processor 2502, from memory for execution. Thus, execution of each instruction involves at least a memory fetch, and may also involve access, by the processor, to stored data in memory and ultimately in the mass-storage device 2521. A large percentage of the actual computational activity in the general-purpose computer system is devoted to transferring data and program instructions between the mass-storage device, memory, and the processor. Furthermore, with a video camera or other data-input device producing large volumes of data at high data-transfer rates, there may be significant contention for both memory and the mass-storage device among the video camera and the processor. This contention may carry over to saturation of the various busses and bridges within the general computer system. In order to carry out real-time video compression and decompression using a software implementation of a video codec, a very large portion of the available computational resources and power consumed by the computer are devoted to data transfer and instruction transfer, rather than on actually carrying out compression and decompression. A parallel-processing approach can be anticipated as a possible approach to increasing computational throughput of a software-implemented video codec. However, in a general-computing system, properly decomposing the problem to take full advantage of multiple processing components is a far from trivial task, and may not solve, or may even exacerbate, contention for memory resources and exhaustion of data-transfer bandwidth within the computer system.

A next implementation that might be considered would be to move the software implementation onto hardware, using any of various system-on-a-chip design methods. A system-on-a-chip-implemented video codec would offer certain advantages over a general-purpose computer system executing a software implementation of the video codec. In particular, program instructions may be stored on board, in flash memory, and various computational steps may be implemented in logic circuits rather than being implemented as sequential execution of instructions by a processor. However, the system-on-a-chip implementation of a video codec is nonetheless generally sequential, in nature, and does not provide a high-throughput parallel computational approach.

Figure 26:
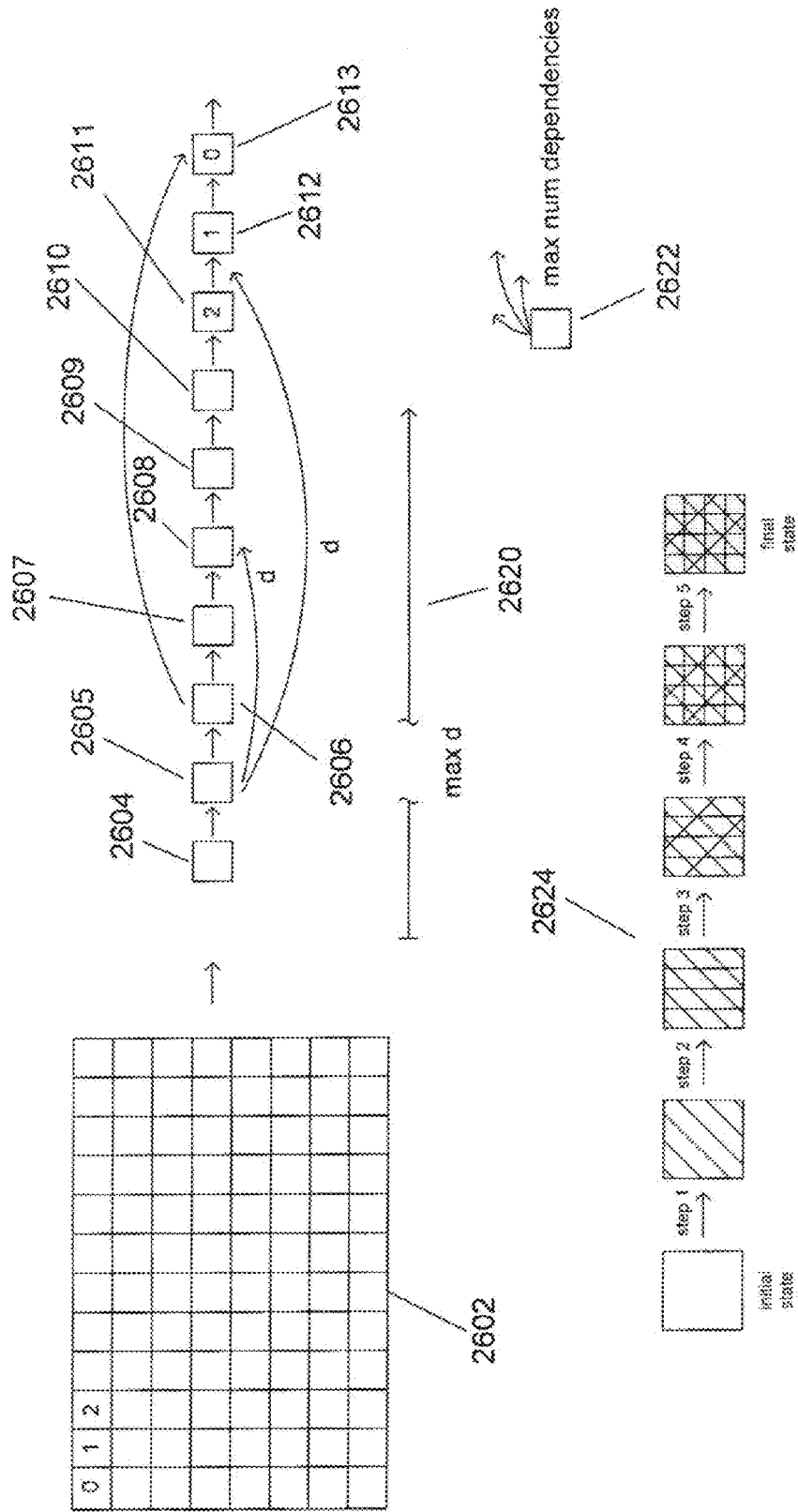
FIG. 26 illustrates a number of aspects of the video compression and decompression process that, when considered, provide insight into a new, and far more computationally efficient, approach to implementation of a video codec according to the present invention.

FIG. 26 illustrates a number of aspects of the video compression and decompression process that, when considered, provide insight into a new, and far more computationally efficient, approach to implementation of a video codec according to the present invention. First, the H.264 standard has provided for a high-level problem decomposition amenable to a parallel-processing solution. As discussed above, each video frame 2602 is decomposed into macroblocks 2604-2613, and macroblock-based or macroblock-partition-based operations are performed on macroblocks and macroblock partitions in order to compress a video frame, in the forward direction, and macroblocks are decompressed, in the reverse, decompression direction, to reconstitute decompressed frames. Certainly, as discussed above, there are dependencies between frames and between macroblocks during the encoding process and during the decoding process. However, as shown in FIG. 26, the macroblock-to-macroblock and macroblock-partition-to-macroblock-partition dependencies are generally forward dependencies. The initial macroblock in an initial frame of a sequence 2613 does not depend on subsequent macroblocks, and can be compressed based entirely on its own contents. As compression continues, frame-by-frame, via a raster-scan processing of macroblocks, subsequent macroblocks may depend on macroblocks in previously compressed frames, particularly for inter prediction, and may depend on previously compressed macroblocks within the same frame, particularly for intra prediction. However, the dependencies are well constrained. First, the dependencies are bounded by a maximum distance in sequence, space, and time 2620. In other words, only adjacent macroblocks within the current frame and macroblocks within a search area centered at the position of the current frame in a relatively small number of reference frames may possibly contribute to compressing any given macroblock. Were the dependencies not well constrained in time, space, and sequence, very large memory capacity would be required to contain intermediate results needed for compressing successive macroblocks. Such memories are expensive, and quickly begin to consume available computational bandwidth as memory-management tasks grow in complexity and size. Another type of constraint is that there are only a relatively small, maximum number of dependencies possible for a given macroblock 2622. This constraint also contributes to bounding the necessary size of memory, and contributes to a bound on computational complexity. As the number of dependencies grows, the computational complexity may grow geometrically or exponentially. Furthermore, parallel processing solutions to complex computational problems are only feasible and manageable when the necessary communications between processing entities is well bounded. Otherwise, communication of results between discrete processing entities quickly overwhelms the available computational bandwidth. Another characteristic of the video-codec problem is that processing of each macroblock, either in the forward, compression direction or in the reverse, decompression direction, is a stepwise process 2624. As discussed above, these sequential steps include inter and intra prediction, generation of residual macroblocks, major transform, quantization, object re-ordering, and entropy encoding. These steps are discrete, and, in general, the results of one step are fed directly into the following step. Thus, macroblocks can be processed in assembly-line fashion, just as cars or appliances can be manufactured in stepwise fashion along assembly lines.

The characteristics of video-codec implementation, discussed with reference to FIG. 26, that motivate the massively parallel-processing implementation of a video codec according to the present invention may be present within many different problem domains. In many cases, a computational problem can be decomposed in many different ways. In order to apply the methods of the present invention to any particular problem, a problem decomposition that produces some or all of the characteristics discussed above with reference to FIG. 26 needs to be selected, as a first step of the method. For example, the video-data-stream compression problem can be decomposed in alternative, unfavorable ways. For example, an alternative decomposition would be to analyze the entire video data stream, or significant blocks of frames, for motion detection in advance of macroblock processing. In certain respects, this larger granularity approach might provide significant advantages with respect to motion detection and motion-detection-based compression. However, this alternative problem decomposition requires significantly greater internal memory, and the motion-detection step would be too complex and computationally inefficient to be easily accommodated within a stepwise processing of computationally tractable and manageable data objects.

Again, it is emphasized that, while the present invention is described in the context of implementing a video codec, the methods of the present invention have applicability to a broad range of efficient computational engines designed to solve a wide variety of different computational problems. For those problems that can be decomposed and formulated to provide the characteristics discussed with reference to FIG. 26, the methods of the present invention provide efficiencies in computational bandwidth, cost, power consumption, and other important efficiencies that motivate and constrain computational-engine, device, and system development.

Figure 27:
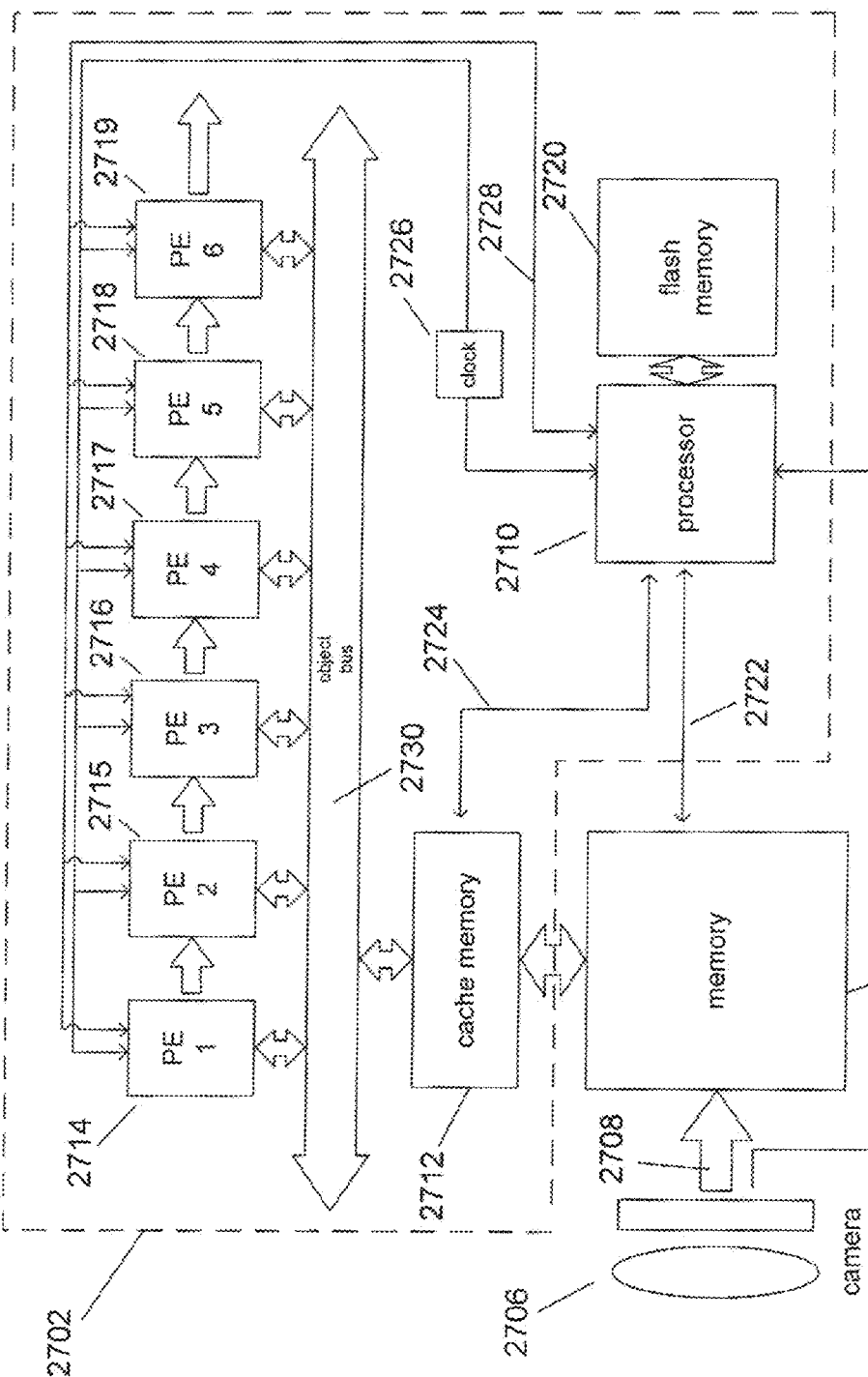
FIG. 27 illustrates the basic features of a integrated-circuit implementation of a video codec according to methods of the present invention.

FIG. 27 illustrates the basic features of a single-integrated-circuit implementation of a video codec according to methods of the present invention. Those components implemented within a single integrated circuit are shown within a large dashed block 2702. The video-codec implementation uses, in addition, an external memory 2704 and the external optics and electronics of a video camera 2706. Additional external components of a video-camera system include power supplies, various additional electromechanical components, a housing, interconnects for external devices, and other such components.

As discussed above, with reference to FIG. 4, the video camera provides a data-stream and electronic-timing-signal input 2708 to the video codec. The data stream is directed to the memory 2704 and a micro-processor-controller component 2710 within the integrated circuit that can access the timing-signal output of the video camera in order to coordinate activities of the video codec. The memory 2704 is dual ported so that, as video data streams in from the digital video camera 2706, previously stored raw video data can be extracted from the external memory into an internal cache memory 2712 for provision to each of a number of processing elements 2714-2719. In FIG. 27, six processing elements 2714-2719 are shown, although, in the specific implementation discussed below, there are in fact a greater number of processing elements. The number of processing elements is a problem-domain-determined and design-choice parameter. Distinct processing elements of one implementation may alternatively be combined together in another implementation.

In the FIG. 27 example, the micro-processor-controller 2710 executes instructions stored in a flash memory 2720. The micro-processor-controller communicates, via various signal paths, with the memory 2722, cache memory 2724, a system clock 2726, and the multiple processing elements 2728. Within the integrated circuit, the bulk of data flow occurs through an object bus 2730. The object bus delivers video-data-related objects, principally macroblocks and macroblock partitions, to the processing elements. In addition, the object bus may also deliver shared parameter-and-metadata containing objects that describe the macroblocks and macroblock-partition objects as well as the current frame and higher-order levels of structure within a video data stream.

In this example, each processing element carries out one step of the step-by-step processing of video data objects, principally macroblocks and macroblock partitions. The types of video objects input to a processing element and the types of video and data objects output by a processing element depend on the particular step in the compression process implemented by the processing element. The vast bulk of the computations carried out to compress video data are carried out by the processing elements. The approach to processing is very much a pipeline, assembly-line-like approach, in which a given raw-data macroblock enters the first processing element 2714 and is transformed, in step-by-step fashion, along the sequence of subsequent processing elements in the processing-element pipeline. The overall assembly-line processing is controlled by a relatively low-frequency clock-signal-implemented computational-step timing signal. The processing steps within each processing element are controlled by a relatively high-frequency clock signal. One important aspect of the single-integrated-circuit implementation of the video codec is that the low-frequency computational-step timing signal provides a timing signal for the micro-processor-controller, but does not provide absolute control of the assembly-line process. In general, each step in the step-wise, high-level processing should be carried out within a single, low-frequency computational-step timing-signal interval. However, there may be cases in which the processing element is unable to complete its task in one time interval. Those cases are detected by the high-level control logic provided by the micro-processor-controller 2710, in which case the micro-processor-controller may delay launching the following computational step, allowing the processing element to complete its task, even though the task has exceeded the low-frequency timing interval. Micro-processor-controller control thus provides an important level of flexibility in the overall control of the video-compression and video-decompression processes. Were this flexibility not provided, then the low-frequency interval would need to be set to at least the greatest possible time interval needed by any processing element within the system to complete the most computationally complex task that the processing element might encounter. In the case that the maximally complex task occurs only infrequently, such as once in every 1,000 macroblocks, then, during processing of the remaining 999 less-computationally demanding macroblocks, the processing elements would lie idle for significant periods of time within the low-frequency time interval. By providing more flexible, micro-processor-controller control of the overall assembly-line process, the low-frequency timing-signal interval can be set to a reasonable value, specifying a time interval during which the majority of macroblocks can be processed, and can be adjusted, in real time, in a context-dependent fashion, to accommodate relatively infrequent, computationally intensive macroblocks.

In this example, an on-board object cache 2712 provides a different type of flexibility. The cache memory provides a dynamic buffer for data objects which can accommodate varying amounts of data required at particular points in video compression. Like the timing elasticity provided by micro-processor-controller control, a flexible cache memory allows for accommodation of particular, context-dependent memory requirements while efficiently handling less-memory-intensive, general processing tasks. The higher-frequency timing intervals provided by the clock 2726 allow for clock-controlled processing within the processing elements, which are implemented as logic circuits rather than as micro-processor-controller-executed instructions. It is this clock-controlled, logic-circuit-based implementation that provides the large computational bandwidth of the overall single-integrated-circuit implementation of the video codec. Were significant portions of the video compression and video-decompression processes carried out by instruction execution on processors, a significant fraction of the overall computational overhead would be consumed by instruction fetch cycles. An object memory controller is responsible for exchanging objects between the on-board object cache memory and an object memory.

Finally, the object bus 2730 facilitates the object-pipeline-based implementation. Were macroblocks and macroblock partitions transmitted within the integrated circuit as bit or byte streams, very high frequency communications processing would be required for communicating macroblocks and macroblock partitions to and from the processing elements. By providing a broad, high-capacity object bus, the data transmitted to each processing element can be delivered from cache memory in a computational and time-efficient manner.

To summarize, implementation of a complex computational task, according to the present invention, involves the design and production of a single integrated circuit that embodies a problem-specific computational engine. The computational engine includes a micro-processor-controller that provides high-level control of processing within the integrated circuit, but also provides a large number of parallel, pipelined processing elements that carry out the bulk of the computational process. The processing elements operate in parallel to provide very high computational bandwidth, and are provided, by an object bus and by inter-processing-element data paths, data in units of objects, such as macroblocks and macroblock partitions, that are the natural objects on which the processing elements operate. High-frequency timing in processing elements is provided by a system clock, but lower-frequency high-level-computational-step control is provided by a micro-processor-controller, in turn providing flexibility in the overall timing of the assembly-like processing of computational tasks to increase the efficiency and throughput of the computational engine.

Figure 28:
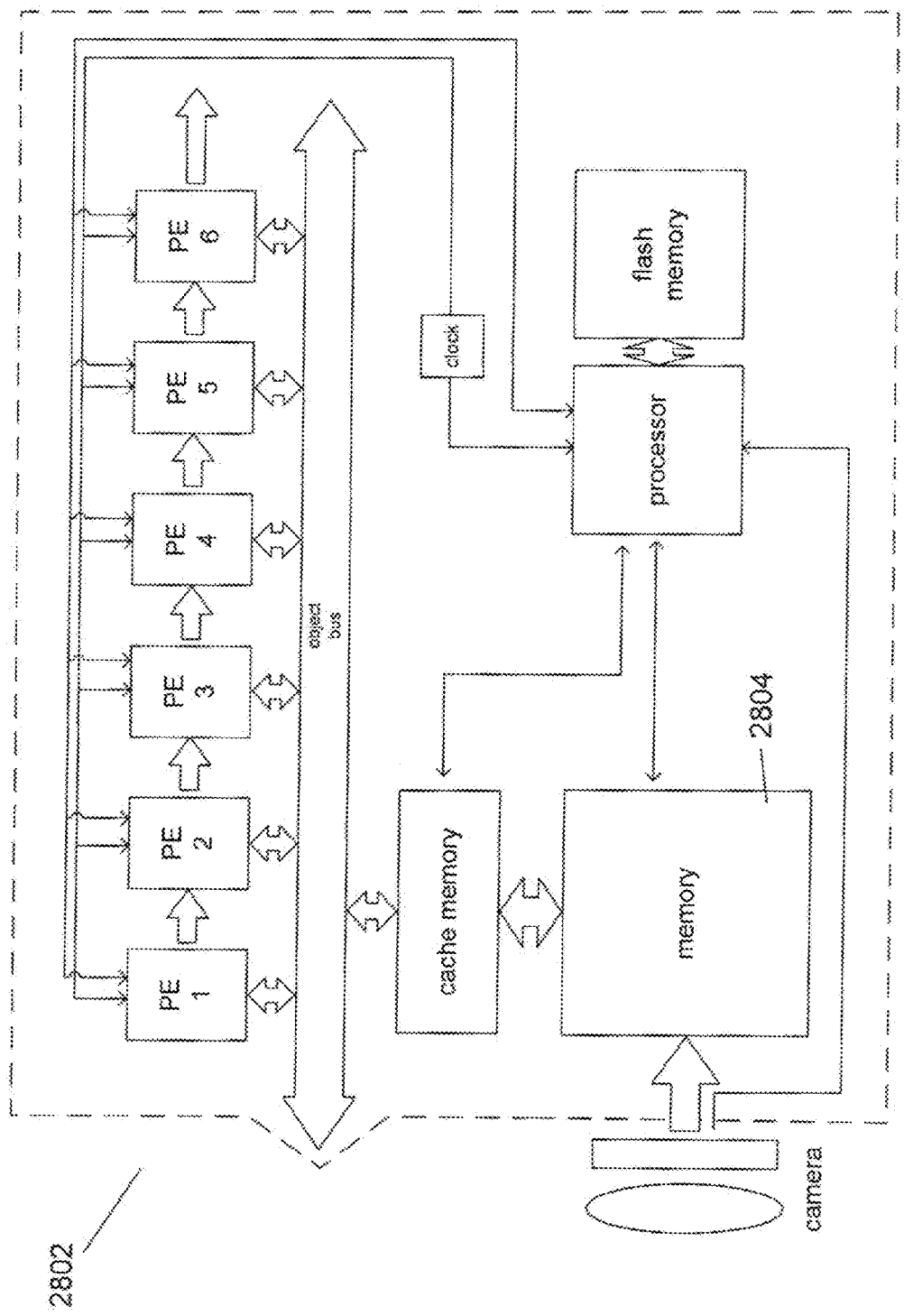
FIG. 28 illustrates an embodiment of the present invention in which the integrated circuit 2802 includes the memory 2804, which was external in the embodiment illustrated in FIG. 27.
Figure 29:
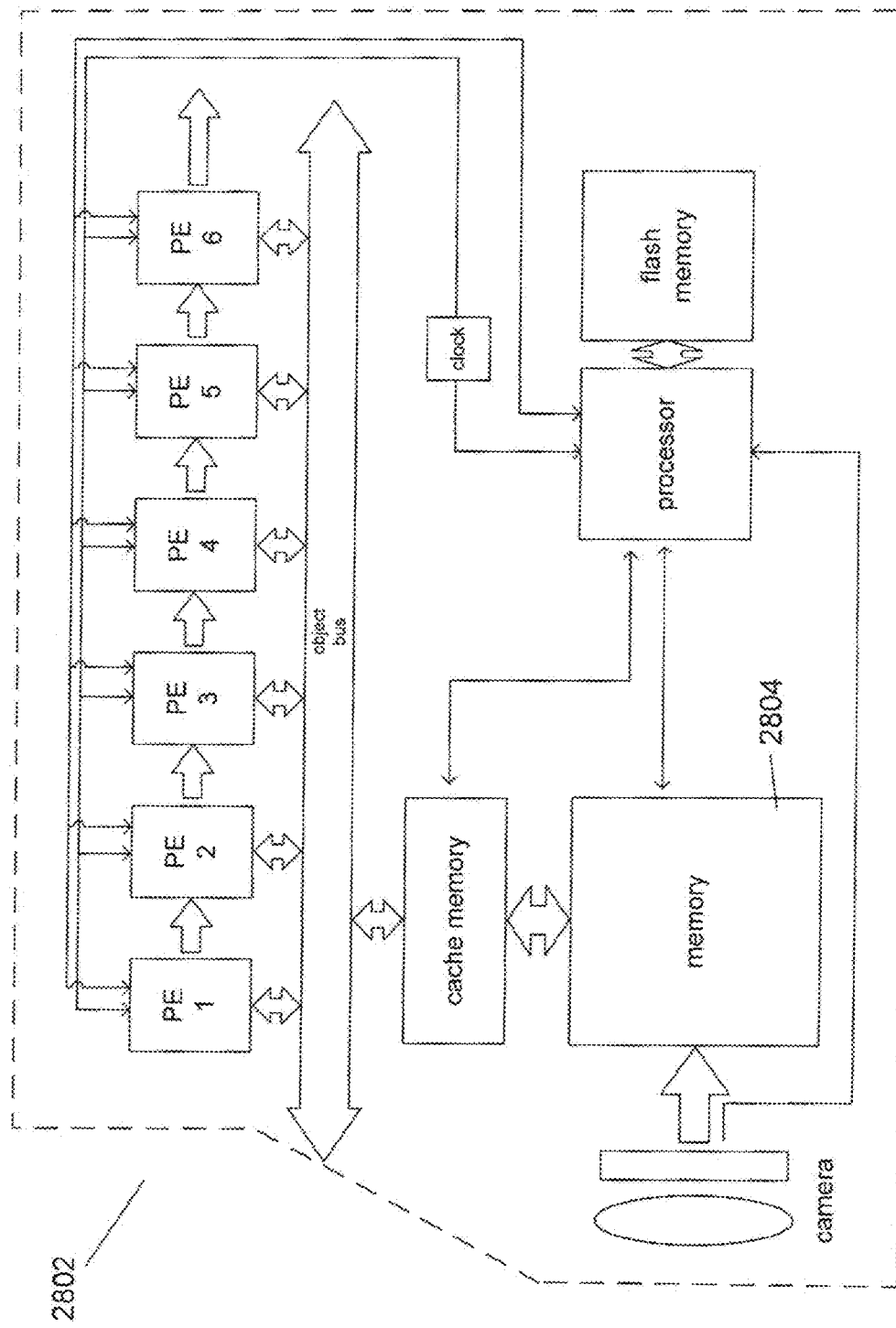
FIG. 29 illustrates an alternative embodiment of the present invention in which the digital video camera is included in a integrated-circuit implementation of a combined video camera and video codec.

Alternative embodiments of the video codec are shown in FIGS. 28 and 29. FIG. 28 illustrates an embodiment of the present invention in which the integrated circuit 2802 includes the memory 2804, which was external in the embodiment illustrated in FIG. 27. FIG. 29 illustrates an alternative embodiment of the present invention in which the digital video camera is included in a single-integrated-circuit implementation of a combined video camera and video codec.

Figure 30:
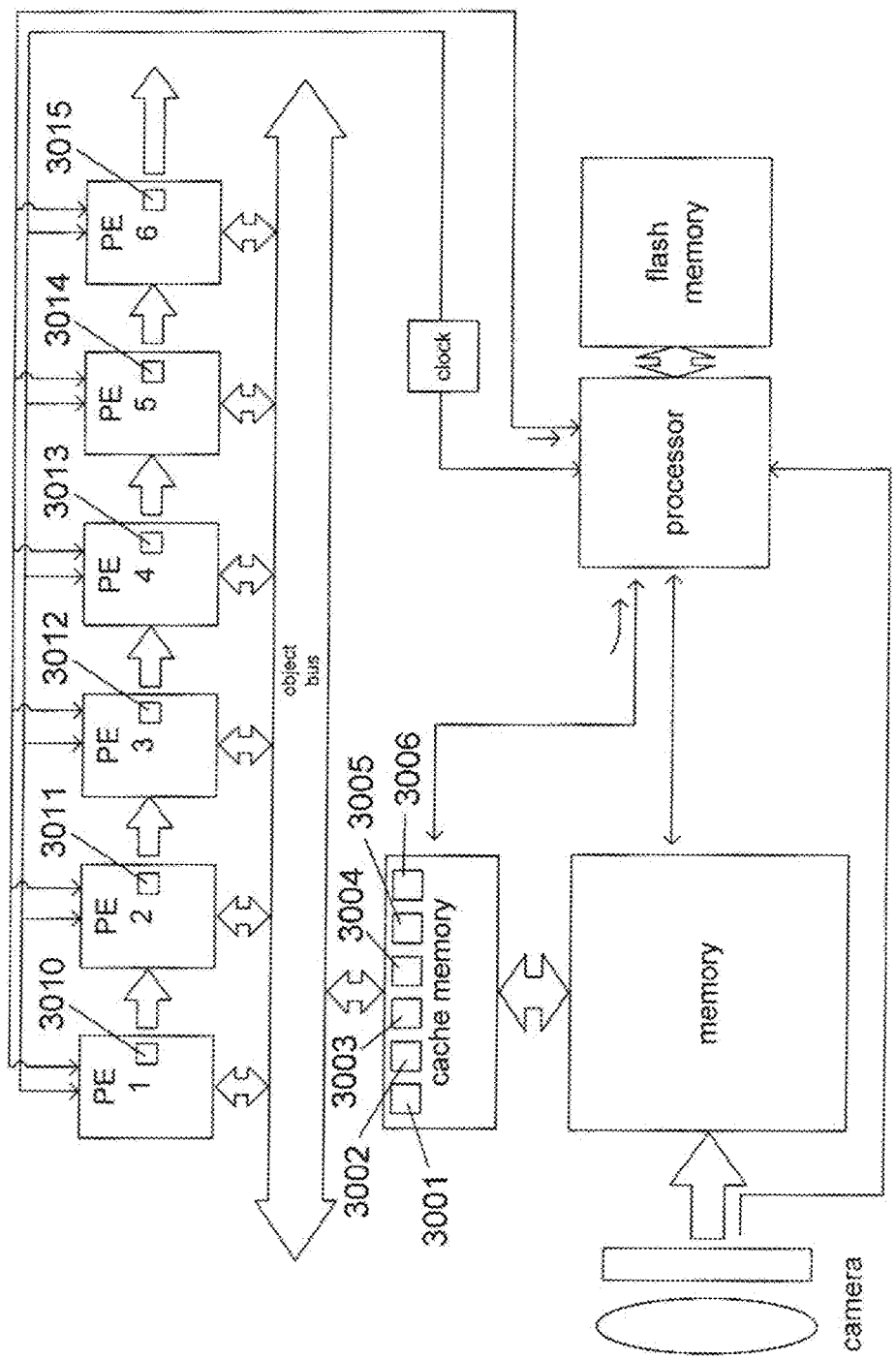
FIGS. 30-32 illustrate the overall timing and data flow within the integrated-circuit implementation of the video codec according to the present invention.
Figure 31:
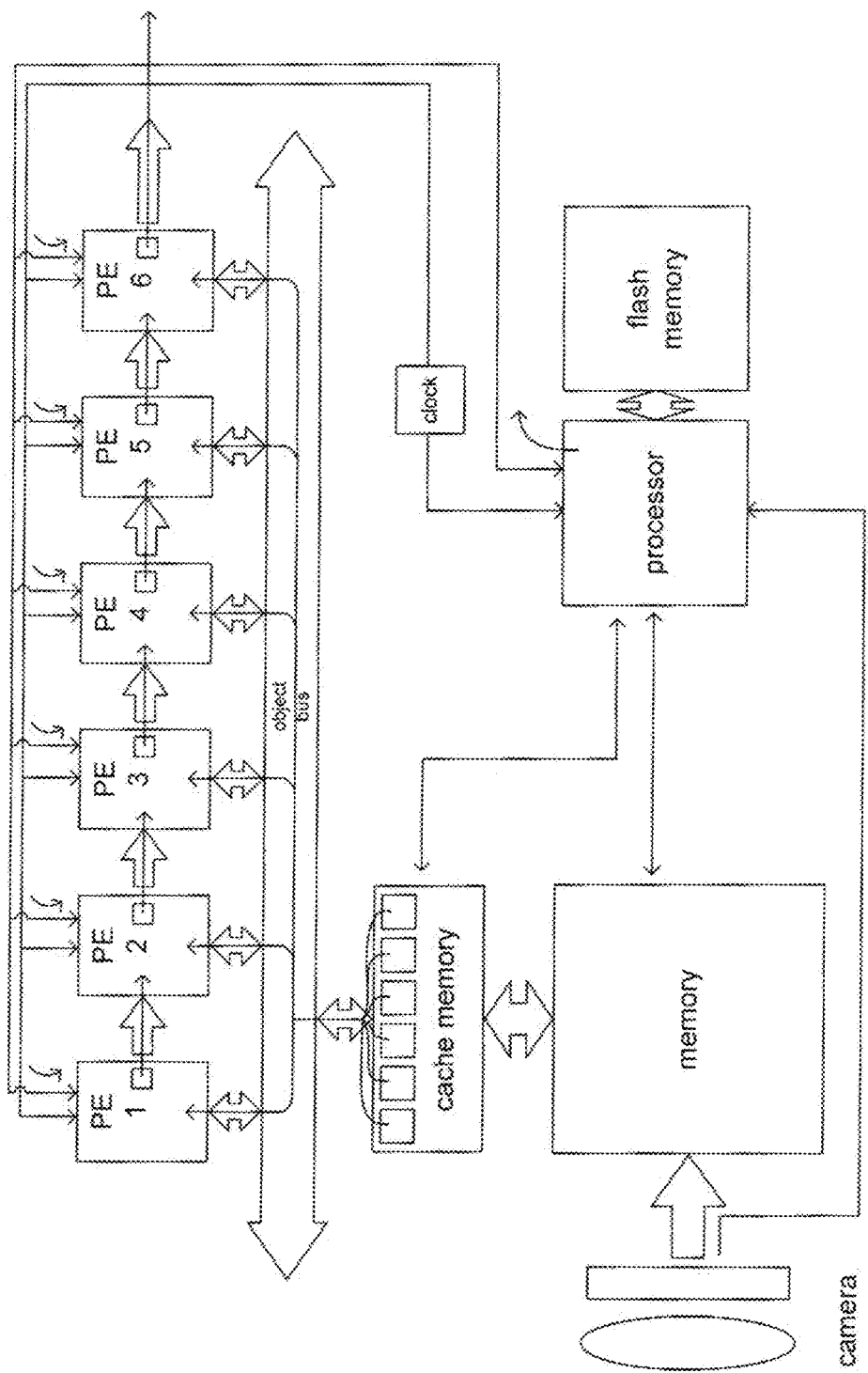
Figure 32:
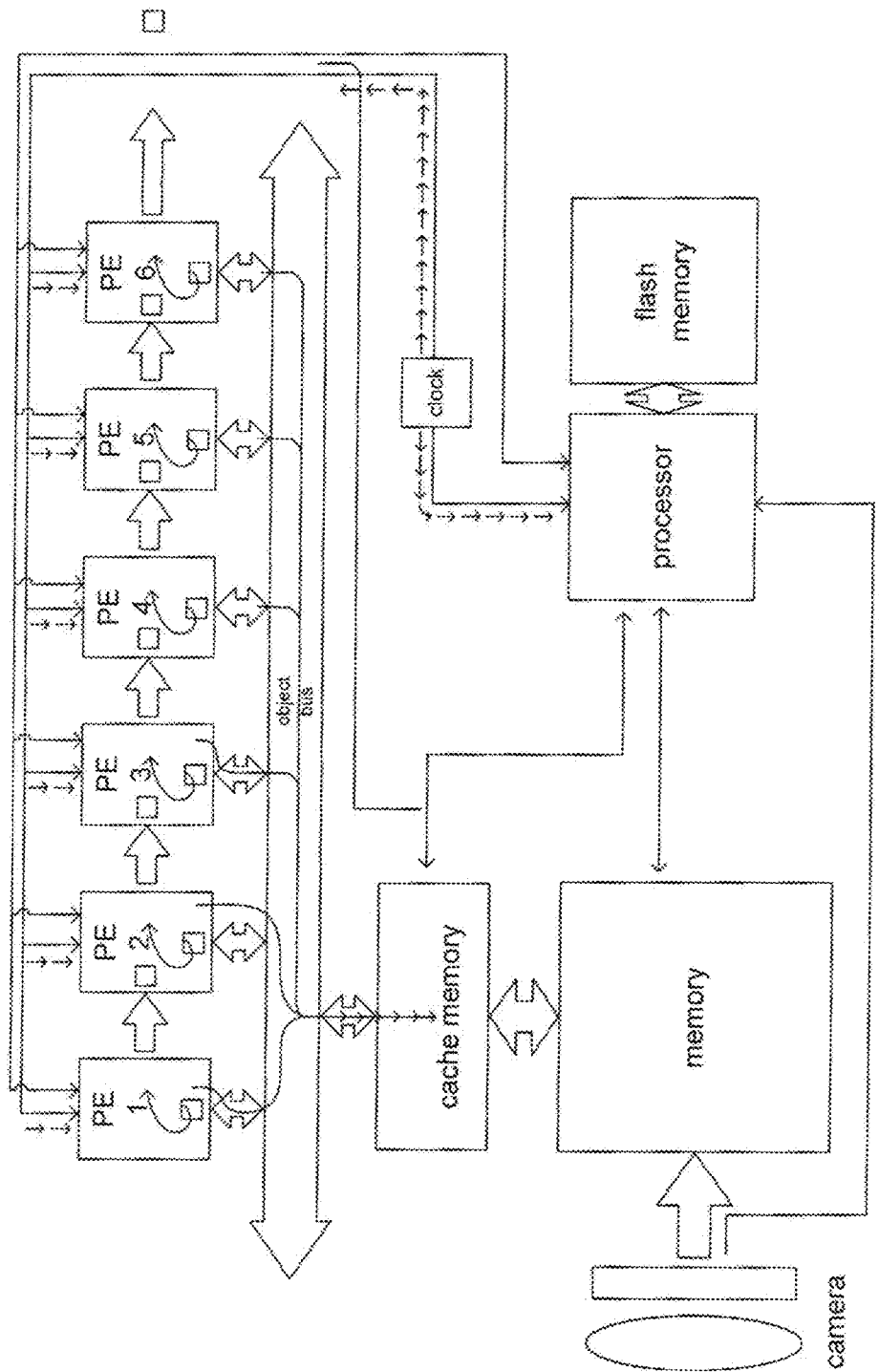

FIGS. 30-32 illustrate the overall timing and data flow within the single-integrated-circuit implementation of the video codec according to the present invention. At the completion of a preceding step, the micro-processor-controller checks the processing entities, cache memory, and, if necessary, memory to ensure that all of the data objects that are necessary for carrying out the next high-level computational step are available for transfer to the processing elements that require these data objects. Thus, the micro-processor-controller checks to make sure that data objects are available, and, when necessary, facilitates marshalling of data objects 3001-3005 in cache memory for access by processing elements in the next high-level computational step, and checks that each processing element has produced, and is currently storing, any data that need to be furnished to another processing element for the next high-level computational step.

Note that, here again, micro-processor-controller control provides a flexibility in the overall control of the integrated circuit. In many cases, whether or not a particular data object or objects needs to be ready for transfer, in the next step, depends on the position of the step in a sequence of steps in the overall video-encoding task. As one example, the initial macroblocks of an initial reference frame of a video stream are first processed by the first processing element, which has no results to provide to subsequent processing elements. As another example, reference frames within a video stream are not processed for inter prediction. Thus, in any given low-frequency timing interval, the data objects necessary for processing a subsequent high-level computational step may vary, in a context-dependent fashion. Moreover, in certain high-level computational steps, one or more of the processing elements may not be active. Embodying complexities of context-dependent and time-varying control within the processing elements themselves would require undesirably complex processing-element implementations. However, by providing the higher levels of control through an instruction-executing micro-processor-controller, the many levels of decision and time-dependent and context-dependent variations in control can be implemented in firmware, rather than in highly complex logic circuits.

In this example, once all the data objects are available for the next processing step, and all the processing elements are poised to begin executing the next step, the micro-processor-controller, as shown in FIG. 31, generates a start signal to launch processing of the next step by all of the processing elements. As shown in FIG. 31, the data objects are transferred to the processing elements that require them at the beginning of the next step. Then, as shown in FIG. 32, the processing elements carry out their respective tasks, generating output for the following step and making requests, to cache memory, for data objects that will be needed in the following step. At the completion of processing of the current high-level computational step, illustrated in FIG. 32, the state shown in FIG. 30 is reached, and the processing elements are then poised for launching of the following processing step. Again, it should be emphasized that, during each low-frequency time interval, each processing element is carrying out its computational task on a different data object than the data objects being processed by the other processing elements. For example, while one residual macroblock is being transformed by the integer transform, another macroblock is being analyzed for inter or intra prediction.

To summarize, the high-level conceptual components of a computational engine that represents one embodiment of the present invention include: (1) a problem decomposition that leads to stepwise processing of reasonably sized computational objects, each computational object having bounded dependencies on additional data, already processed computational objects, and subsequently processed computational objects, and each computational object essentially comprising a data-structure value, such as the values of elements of one-dimensional, two-dimensional, or higher-dimensional arrays or the values of fields in multi-field records or structures; (2) an assembly-line-like series of processing elements, each of which carries out a high-level step of stepwise processing of the computational objects, that execute in parallel on different computational objects; (3) an on-board object cache that buffers sufficient computational objects so that relevant data and objects for processing a computational object along the series of processing elements can be initially loaded into the object cache from memory, without repeated access to memory during stepwise processing of the computational object; (4) an object bus that allows processing elements to access objects, in object-level-access transactions, stored in the object cache; (5) a lower-frequency clock cycle for control of stepwise processing and one or more higher-frequency clock cycles for small-granularity control of computation of steps by processing elements; (6) a micro-processor controller or other control subcomponent for coordinating and synchronizing high-level step execution by the processing elements; and (7) an object-memory controller for loading objects into the object cache from memory and for storing objects in the object cache into memory.

For certain problem domains, a single-integrated-circuit implementation of a computational engine provides advantages in manufacturing, chip packaging, device footprint, power consumption, computing latencies, and other such advantages. For other problem domains, an over-all computational engine may be implemented as two or more separate computational engines, with the problem domain partitioned into higher-level sub-domains, each of which is carried out by a separate computational engine The sub-domains are further partitioned into tasks, each of which is carried out by a processing element within a computational engine. This approach may also provide manufacturing advantages, as well as for increased modularity. For certain additional types of problem domains, a single-integrated-circuit implementation of a computational engine may be combined with additional integrated circuits to implement a device, in order to, for example, make use of already developed integrated circuits.

In the specific example of an H.264 compression-and-decompression computational engine representing one embodiment of the present invention, computational objects include macroblocks and macroblock partitions, as discussed above with reference to FIG. 6, motion vectors, as discussed above with reference to FIG. 12, and various data and parameter objects that describe the video-stream context of macroblocks and macroblock partitions. Processing elements include an inter-prediction processing element, an intra-prediction processing element, a motion-estimation processing element, a direct-integer-transform processing element, an inverse-integer-transform processing element, a quantization-and-scaling processing element, a dequantization-and-descaling processing element, an entropy-encoding processing element, and an entropy-decoding processing element. The object cache stores the above-mentioned types of objects, including macroblocks and macroblock partitions. The object bus transfers macroblocks and macroblock partitions between processing elements and the object cache, relieving processing elements of needing to carry out byte-oriented or word-oriented communications protocols to access computational objects. A low-frequency clock cycle generally controls stepwise macroblock processing by the assembly-line-like series of processing elements, and higher frequency clock cycles control computational processing by processing elements. A micro-processor controller carries out over-all control and synchronization of stepwise macroblock processing, ensuring that necessary objects are available for each processing element for execution of a next processing step before launching the next processing step in the processing elements. Finally, a memory controller operates to exchange computational objects, including macroblocks and macroblock partitions, between a large-capacity random-access memory and the object cache.

Subsection III

An H.264 Video Codec Implemented as a Single Integrated Circuit According to One Embodiment of the Present Invention In this final subsection, a specific example of a computational engine that represents one embodiment of the present invention is discussed. Again, it is emphasized that embodiments of the present invention may be designed and implemented to carry out any of a large number of different computational tasks, including image-processing tasks, 3-dimensional-media compression and decompression, various types of computational filtering, pattern matching, and neural-network implementations. The discussion of the H.264 video codec computational engine that follows is intended to provide a detailed illustration of one example of the present invention, but is not intended to limit the scope of the following claims to computational engines designed to carry out H.264 video compression and/or decompression, to video applications in general, or to any other specific problem domain. This specific implementation is a single-integrated-circuit implementation of a video codec. Alternative embodiments may employ a multi-computational-engine approach, or may combine a single-integrated-circuit computational engine with additional integrated circuits.

Figure 33A:
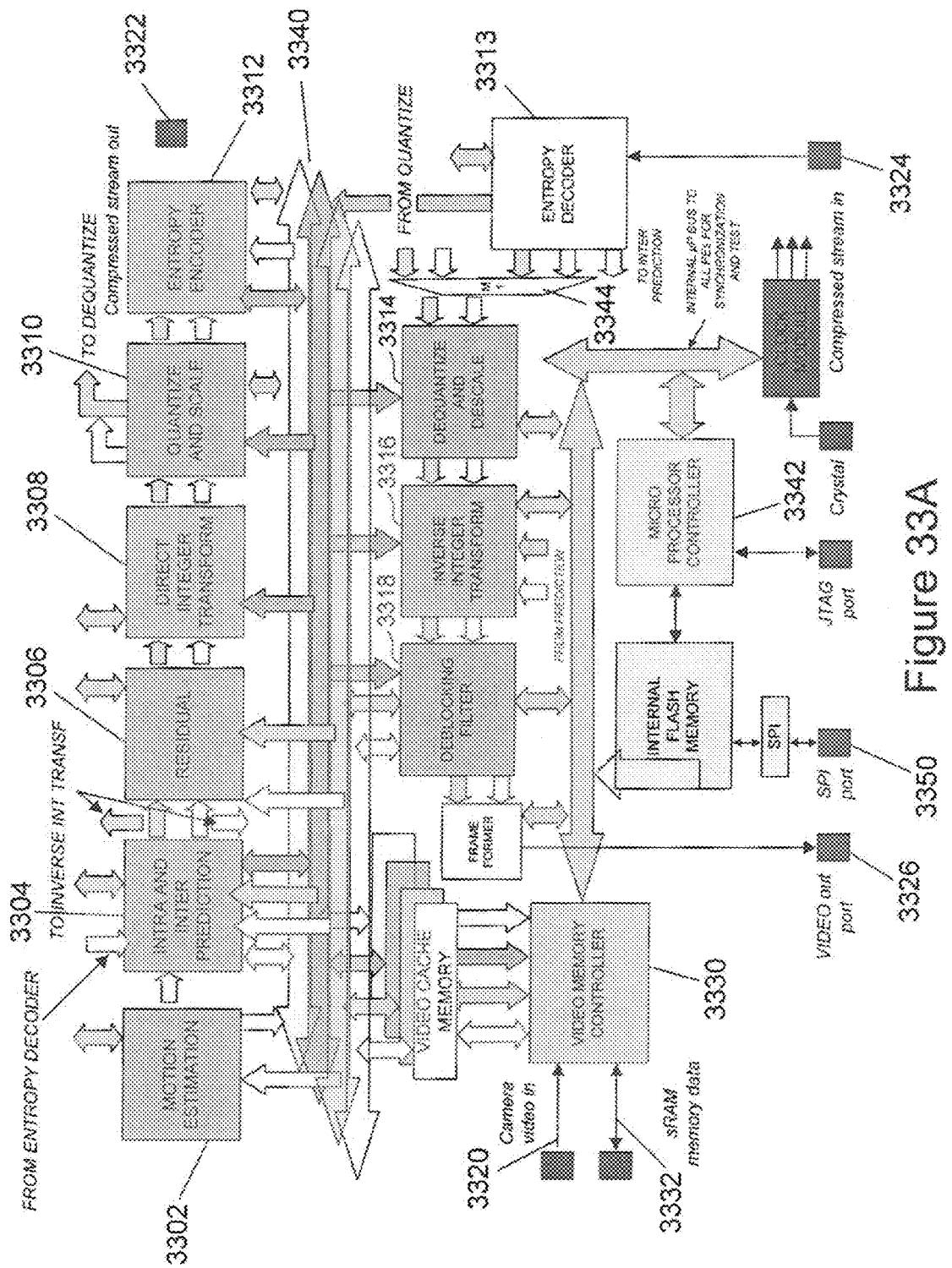
FIGS. 33A-B provide a block-diagram illustration of a single-integrated-circuit implementation of a video codec according to the present invention.
Figure 33B:
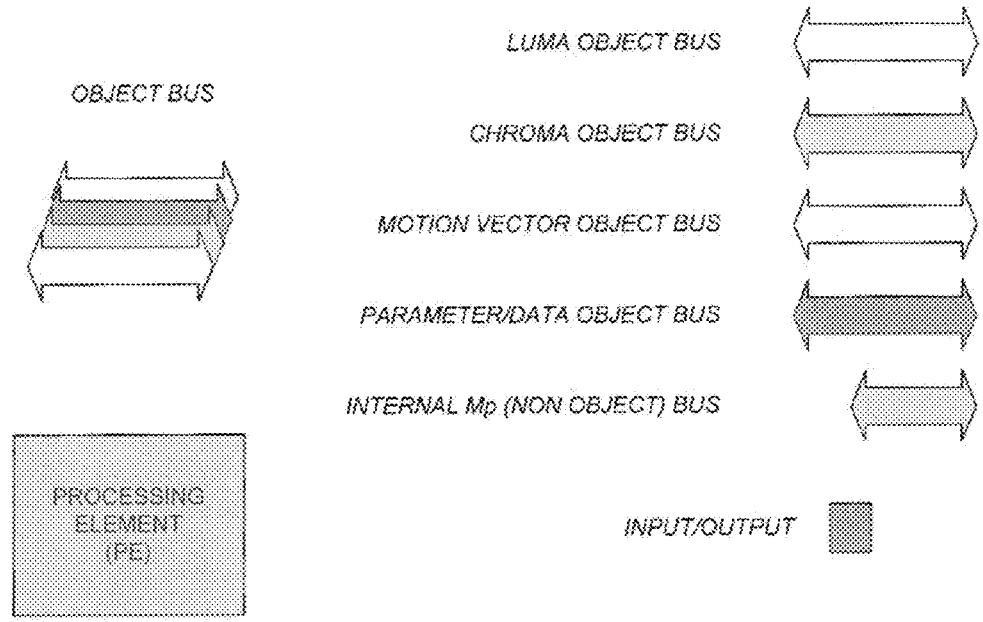

FIGS. 33A-B provide a block-diagram illustration of a single-integrated-circuit implementation of a video codec according to the present invention. Much of the diagram provided in FIG. 33A is essentially self-describing, in view of the above discussion with reference to FIGS. 27-32 and FIGS. 23-24. The single-integrated-circuit implementation of the video codec includes separate processing elements for motion estimation 3302, intra and inter prediction 3304, residual-block calculation 3306, the direct integer transform 3308, quantizing and scaling 3310, entropy encoding 3312, entropy decoding 3313, de-quantizing and de-scaling 3314, the inverse integer transform 3316, and the de-blocking filter 3318. Processing element 3302 corresponds to block 2306 in FIG. 23, processing element 3304 corresponds to blocks 2306 and 2314 in FIG. 23, processing element 3306 corresponds to operation 2310 in FIG. 23, processing element 3308 corresponds to block 2316 in FIG. 23, processing element 3310 corresponds to block 2318 in FIG. 23, processing elements 3312 and 3313 correspond to block 2322 in FIG. 23, processing element 3314 corresponds to block 2326 in FIG. 23, processing element 3316 corresponds to block 2328 in FIG. 23, and processing element 3318 corresponds to block 2336 in FIG. 23. Note that the video codec, as described with reference to FIG. 5, can receive raw video data 3320 from a video camera and produce compressed video data 3322 as output or can receive compressed video data 3324 as input and produce raw video data 3326 as output. The re-order block 2320 in FIG. 23 may be incorporated in either processing elements 3310 and 3314 of the video codec implementation or in processing elements 3312 and 3313. Note also that a video-memory controller 3330 is responsible, in the single-integrated-circuit implementation, for directing input video data to the external memory 3332 and for exchanging data objects between video-cache memory, the external memory, and the object bus 3340. FIG. 33B provides a key for FIG. 33A. Note that the object bus 3340 can be considered to comprise a separate luma-object bus, chroma-object bus, motion-vector-object bus, parameter/data-object bus, and an internal microprocessor-controller bus.

FIG. 33A provides detail on the inputs and outputs of each processing element in one embodiment of the present invention, and thus the interaction of each processing element with the object bus, video-cache memory, and the video-memory controller. The video-memory controller 3330 routes video data from the camera to external memory. The microprocessor controller 3342 makes memory requests on behalf of processing elements to the video-memory controller, which is satisfied by the video-memory controller by accessing requested data objects from external memory and storing the requested data objects in video-cache memory. Thus, much of the computational overhead associated with partitioning of the video data signal into frames, macroblocks, and macroblock partitions is carried out within the video-memory controller, another aspect of the massive parallel processing provided by the single-integrated-circuit implementation of the video codec.

The multiplexer 3344 provides a path from the quantizer processing element 3310 to the de-quantizer and de-scale processing element 3314, during video compression, and a path from the entropy decoder 3313 to the de-quantizer and de-scale processing element 3314 during video decompression. Motion-estimation processing element 3302 operates on luma macroblocks and macroblock partitions, while the remaining processing elements operate on both luma and chroma macroblocks and/or macroblock partitions. The SPI port 3350 in FIG. 33A is a serial-parallel interface that permits writing and/or reading of the flash memory through SPI interface signals.

Figure 34:
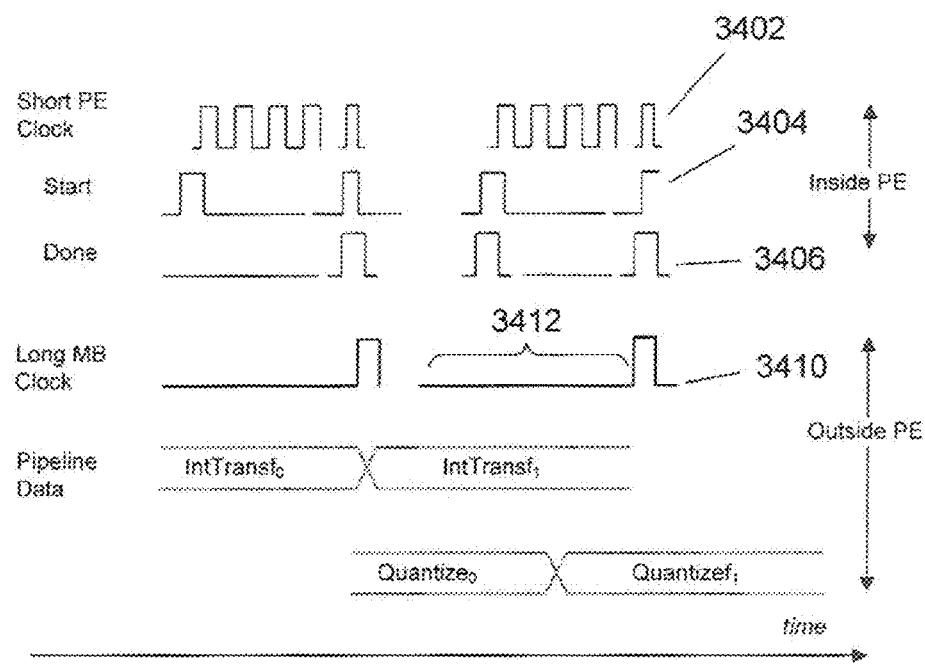
FIG. 34 illustrates the overall system timing and synchronization of the single-integrated-circuit implementation of a video codec according to the present invention.

FIG. 34 illustrates the overall system timing and synchronization of the single-integrated-circuit implementation of a video codec according to one embodiment of the present invention. As discuss above, a short-interval clock-pulse signal 3402 controls execution steps within a processing element during processing of each overall step in the assembly-line-like processing of macroblocks and macroblock partitions. As discussed above, the processing elements begin execution of the next high-level computational step upon receipt of a start signal 3404 from the microprocessor controller and produce a done-signal pulse 3406 upon completion of each high-level computational step. As discussed above, a long-interval clock-pulse signal 3410 generally controls the high-level step-by-step pipelined processing of macroblocks and macroblock partitions along the assembly line of processing elements via the micro-processor controller. In general, during each low-frequency interval 3412, a next overall step in processing is carried out by each processing element. However, as also discussed above, in certain cases, the next processing step may not start on the low-to-high transition of the low-frequency clock signal in the case that a processing element has failed to finish its task, since processing elements begin processing each high-level computational step upon receiving a start signal from the processor.

Figure 35:
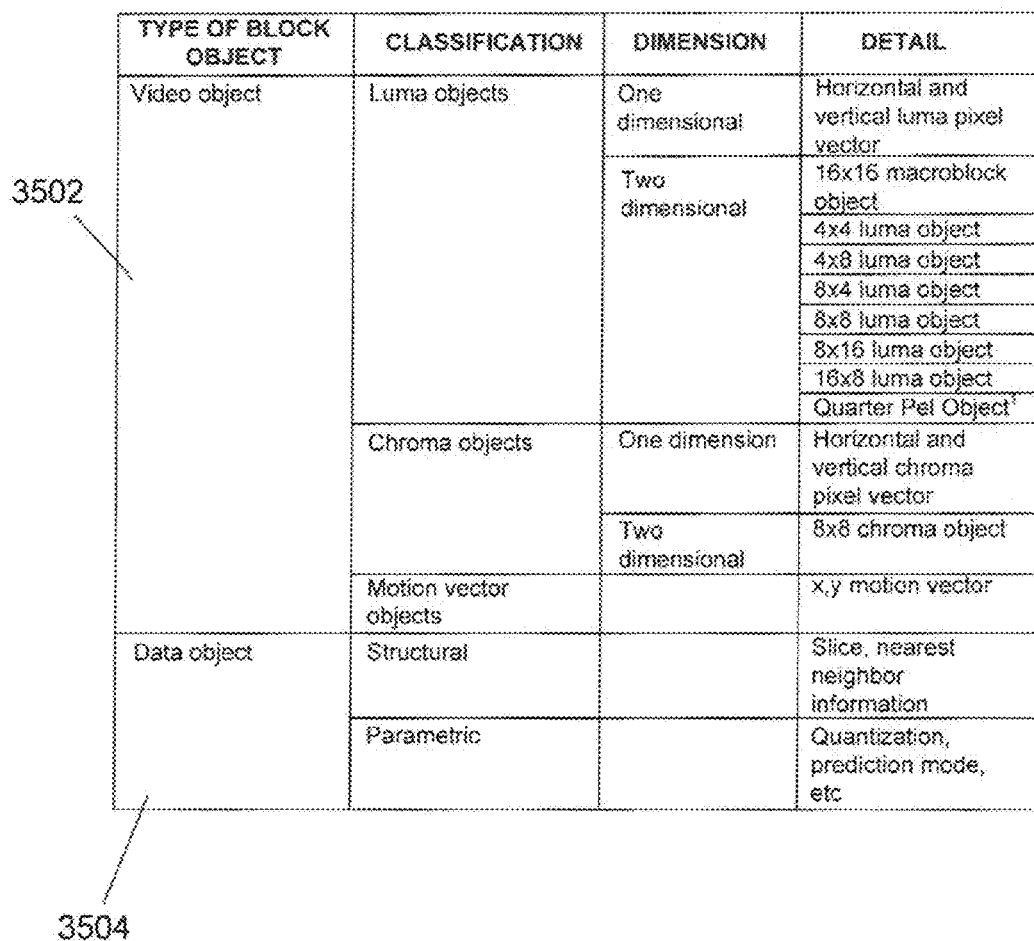
FIG. 35 provides a table of the various types of objects transferred from video cache memory along the data object bus to processing elements in the single-integrated-circuit implementation of a video codec according to the present invention.

FIG. 35 provides a table showing examples of various types of objects that may be transferred from video cache memory along the object bus to processing elements in the single-integrated-circuit implementation of a video codec according to the present invention. The table shows two main classes of objects: (1) video objects 3502; and (2) data objects 3504. Video objects include macroblocks and macroblock partitions from both luma and chroma planes, as discussed above with reference to FIG. 3, as well as motion-vector objects, as discussed above with reference to FIG. 12. The data objects include various types of information regarding the current context of a currently processed macroblock or macroblock partition, the slice to which the macroblock or macroblock partition belongs, the nature of the frame in which the macroblock or macroblock partition is included, and other such information. The objects may also contain parametric information, such as the quantization parameter, discussed above with reference to FIG. 19. Computational bandwidth is significantly increased by employing the object bus 3340, which is tailored to providing the objects needed by processing elements as discrete objects, rather than requiring processing elements to carry out a byte-based or word-based protocol for accessing data objects from memory cache and memory. A wide data-object bus provides extremely high internal data-transfer rates within the integrated circuit.

Figure 36A:
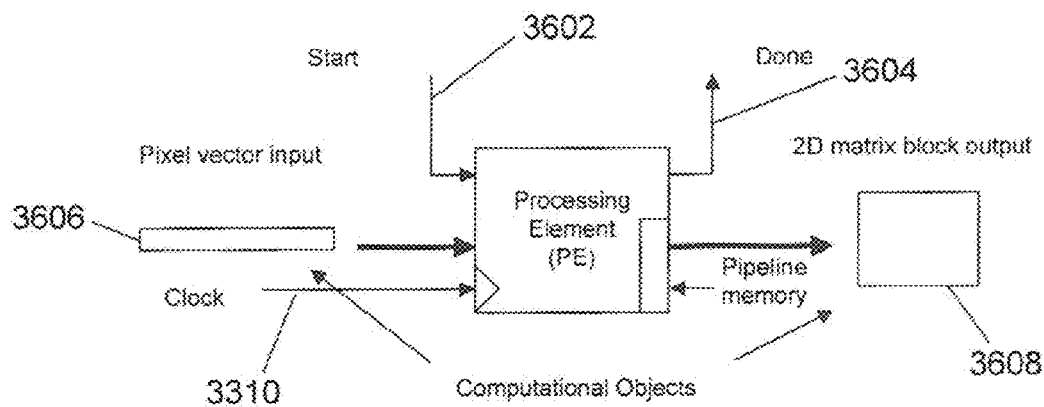
FIGS. 36A-B illustrate, at an abstract level, operation of a processing element within the video-codec single-integrated-circuit implementation that represents one embodiment of the present invention.
Figure 36B:
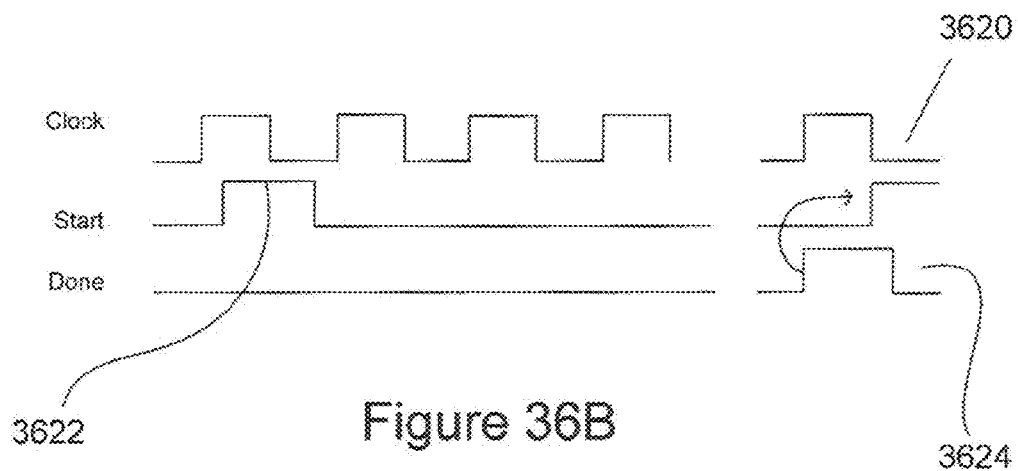

FIGS. 36A-B illustrate, at an abstract level, operation of a processing element within the video-codec integrated-circuit implementation that represents one embodiment of the present invention. As discussed above, a processing element receives a start pulse 3602 from the microprocessor controller and outputs a done pulse 3604 to the microprocessor controller, for overall synchronization of the low-frequency high-level-step processing cycle. The processing element receives one or more objects and other data 3606 from a previous processing element in the pipeline and/or the object bus and outputs one or more objects and/or other data 3608 to a next processing element in the processing-element pipeline and/or the object bus. Of course, the first processing element in the pipeline does not receive objects from preceding processing elements, and the last processing element in the pipeline produces output from the integrated-circuit implementation of the video codec, rather than outputting an object or other data to a processing element. As discussed above, a processing element receives a high-frequency clock-pulse signal for controlling the logic circuitry within the processing element to carry out complex computational tasks. Note that processing elements communicate data and results along the pipeline through pipeline memory, which is distinct from the object bus.

FIG. 36B illustrates a synchronization and timing control of processing elements. As discussed above, processing elements carry out computational tasks according to a high-frequency clock signal 3620. A task begins upon reception of a start-signal pulse 3622 and the processing element announces completion of a task through a done-signal pulse 3624.

Figure 37:
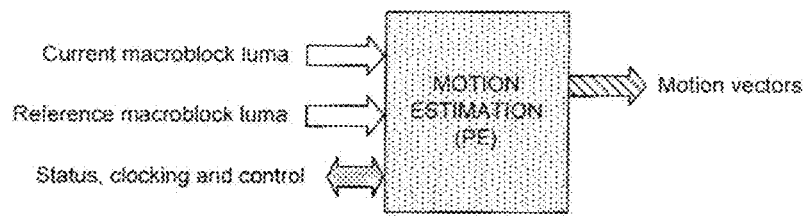
FIG. 37 illustrates the motion-estimation processing element that represents one embodiment of the present invention.

FIG. 37 illustrates the motion-estimation processing element that represents one embodiment of the present invention. The motion-estimation processing element receives a luma object corresponding to the current macroblock, as input, plus one or more luma objects that represent reference macroblocks from a reference frame stored in memory. The motion-estimation processing element produces motion-vector objects, as output.

Figure 38:
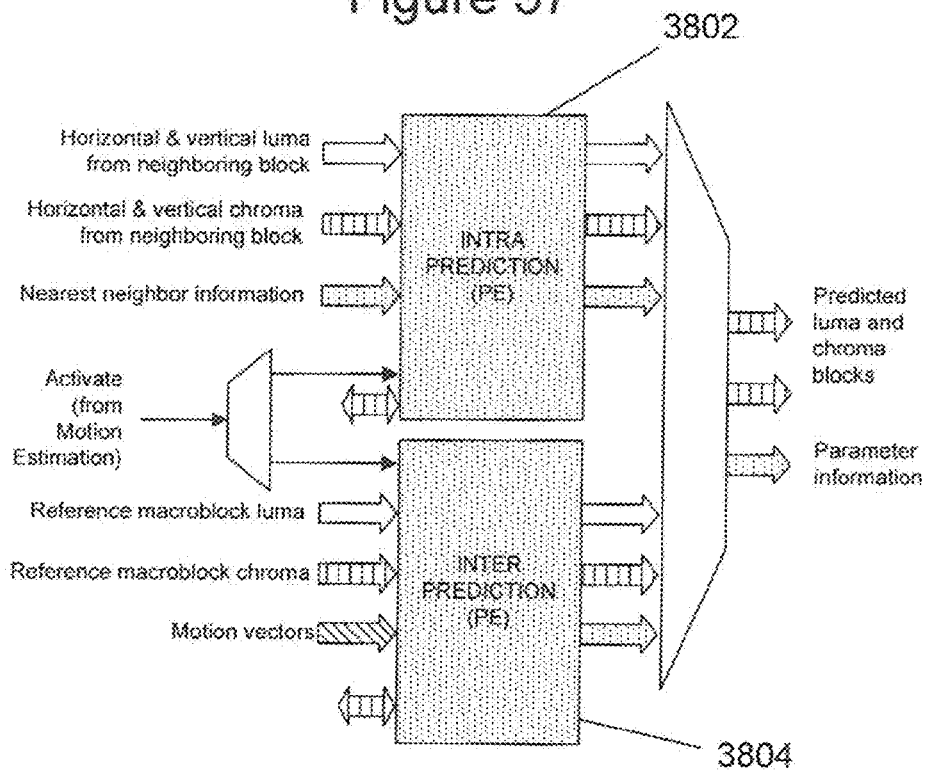
FIG. 38 illustrates the intra-prediction and inter-prediction processing element, which comprises a pair of processing elements and which represents one embodiment of the present invention.

FIG. 38 illustrates the intra-prediction and inter-prediction processing element, which comprises a pair of processing elements and which represents one embodiment of the present invention. The intra-prediction processing element 3802 receives luma and chroma horizontal and vertical pixel vectors from neighboring blocks as well as data describing the nearest-neighbor blocks and produces, as output, one of the four 16×16 intra-prediction modes or nine 4×4 intra-prediction modes for either an entire macroblock or for 16 4×4 macroblock partitions, respectively. One of four chroma-intra-prediction modes is produced for each chroma macroblock. As with inter prediction, the intra-prediction processing element chooses the mode that provides the best estimation of the currently considered macroblock. Depending on the level of compression complexity implemented by the video codec, a macroblock may be partitioned in many different ways, as discussed with reference to FIG. 6, in order to find a particular partitioning that provides the most effective prediction. The inter-prediction processing element 3804 receives reference macroblocks, both luma macroblocks and chroma macroblocks, and motion vectors, and generates a predicted macroblock or macroblock partition as output.

The two-processing-element implementation of the intra-and-inter-prediction processing element (3304 in FIG. 33A) illustrates one design parameter. The number and complexity of processing elements may vary, depending on many different design considerations, as well as the complexity of the task carried out by the processing element. For example, when very high-bandwidth implementations are required, it may be necessary to implement any particular task as a number of parallel processing elements, within the processing-element pipeline. In lower-bandwidth implementations, these parallel processing elements may be combined together in a single processing element. Another important point is revealed in the implementation of the intra-and-inter-prediction processing element. As discussed above, there are various levels of compression and decompression encompassed by the overall H.264 standard. Higher levels provide better compression, but at the expense of greater computational complexity. A particular single-integrated-circuit implementation of a video codec may implement higher levels of the standard as well as intermediate and lower levels, and actual operation may be controlled by parameters input to the single-integrated circuit and stored in flash memory. Thus, a single integrated-circuit implementation may provide for flexible operation according to multiple parameters.

Figure 39:
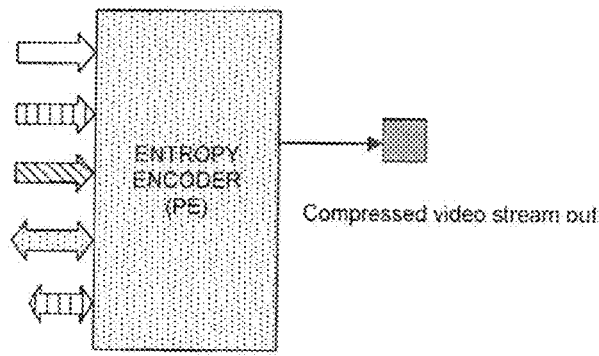
FIG. 39 shows a block diagram of the entropy-encoded processing element that represents one embodiment of the present invention.

FIG. 39 shows a block diagram of the entropy-encoded processing element that represents one embodiment of the present invention. This processing element receives luma, chroma, and motion-vector objects as well as various types of data objects, and applies various different entropy-encoding schemes, as discussed above, to produce the final encoded output packaged into NAL data units.

Figure 40:
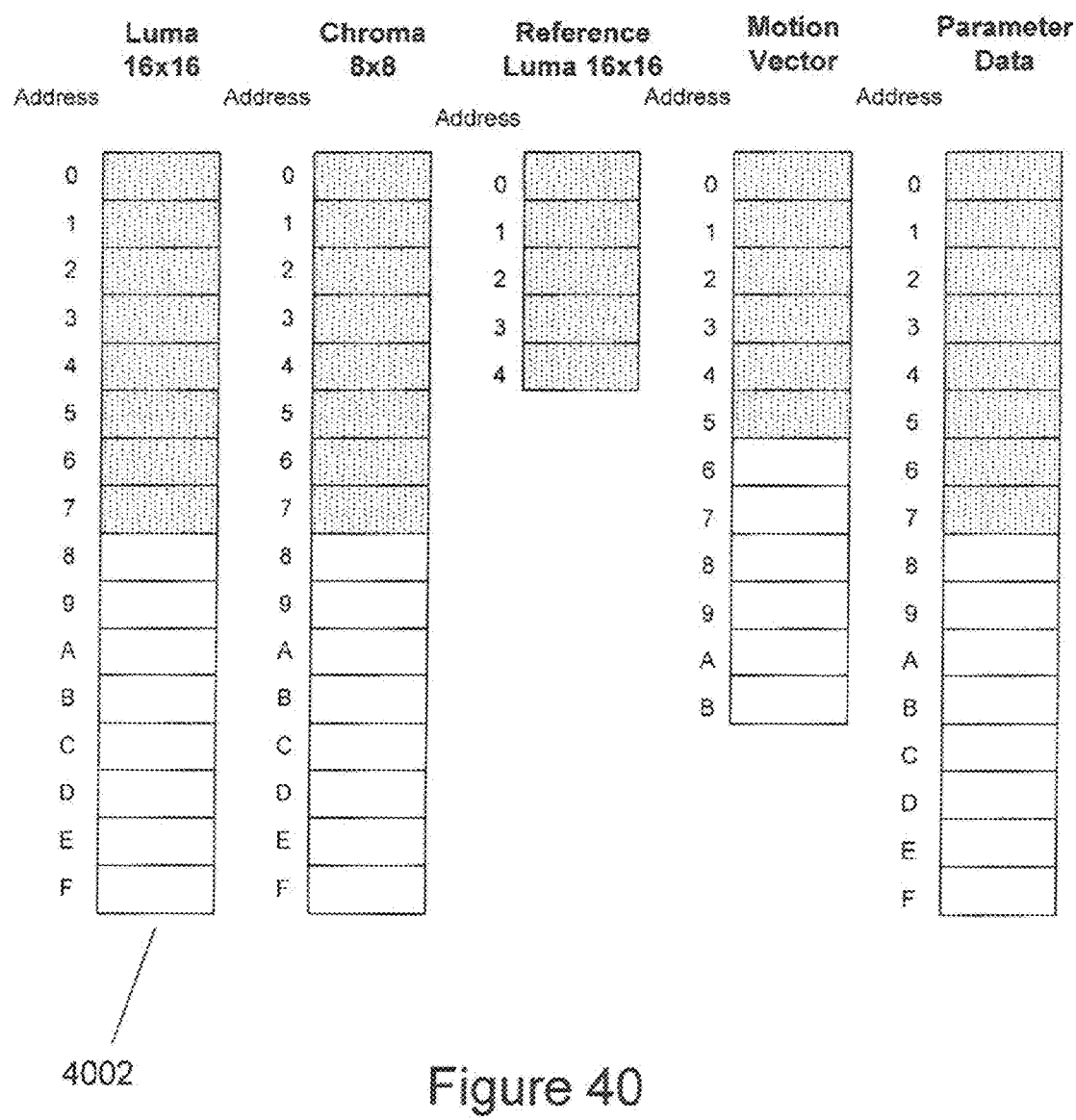
FIG. 40 illustrates the storage requirements for video cache memory in the video codec implementation illustrated in FIG. 33A.

FIG. 40 illustrates one example of the storage requirements for video cache memory in the video codec implementation illustrated in FIG. 33A. In one embodiment, the video-cache memory contains sufficient macroblocks, macroblock partitions, and motion-vector objects so that a given object need not be exchanged between video-cache memory and external memory during a sequence of operations carried out as sequential steps starting from the first processing element and proceeding to the last processing element. The various types of objects are stored in circular queues within the video-cache memory, with many of the queues partitioned to contain currently considered macroblock information, in one partition, and neighboring-macroblock information, in the other partition. Thus, for example, the video-cache memory includes a circular queue 4002 containing 16 luma macroblocks, partitioned into two partitions of eight macroblocks each.

Figure 41:
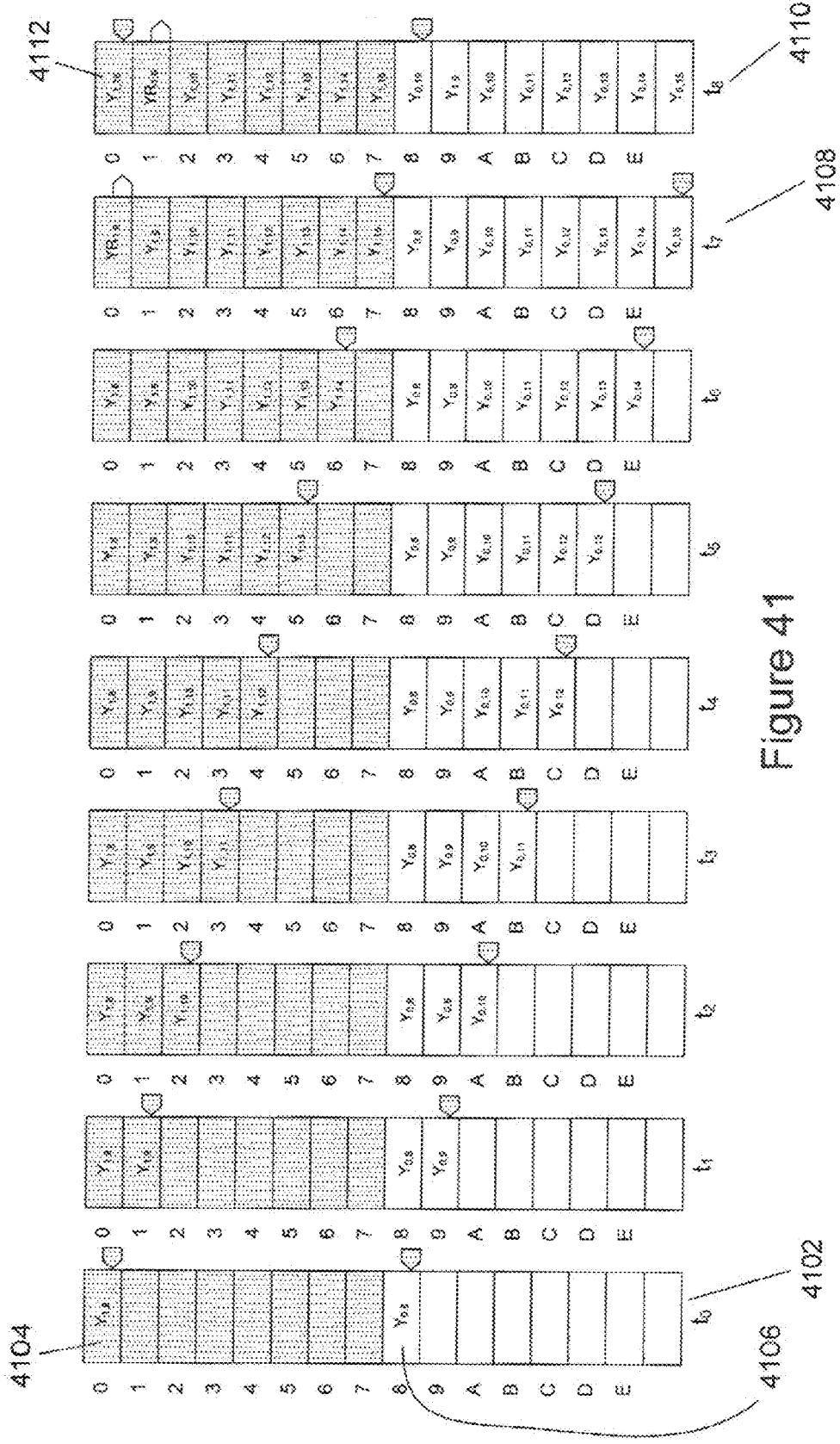
FIG. 41 illustrates operation of the luma-macroblock circular queue (4002 in FIG. 40) during nine high-level processing cycles.

FIG. 41 illustrates operation of the luma-macroblock circular queue (4002 in FIG. 40) during nine high-level computational-step intervals. During time interval $t_0$ 4102, a next raw-video-data luma macroblock is input into slot 0 4104 and a corresponding neighbor reference macroblock from a reconstructed frame is placed into slot 8 4106. During each successive time interval, additional raw-data macroblocks and reference macroblocks are input into successive slots within the circular queue. The contents of the macroblock in slot 0 4104 changes progressively, over the time intervals, as it is accessed and modified by subsequent processing elements. Finally, during interval $t_7$ 4108, the contents of the macroblock are encoded and output by the final processing element so that, during interval $t_8$ 4110, a new raw-data macroblock can be placed into slot 0 4112. Thus, a circular queue contains macroblock data video-cache memory for assembly-like processing by all the processing elements, and then replaces the macroblock with a new raw-data macroblock and reference macroblocks after a final processing element has consumed the macroblock. During each low-frequency timing-signal time interval, all encoding or decoding steps are carried, but each processing element carries out its task on a different macroblock or macroblock partition during a low-frequency timing-signal time interval.

Figure 42:
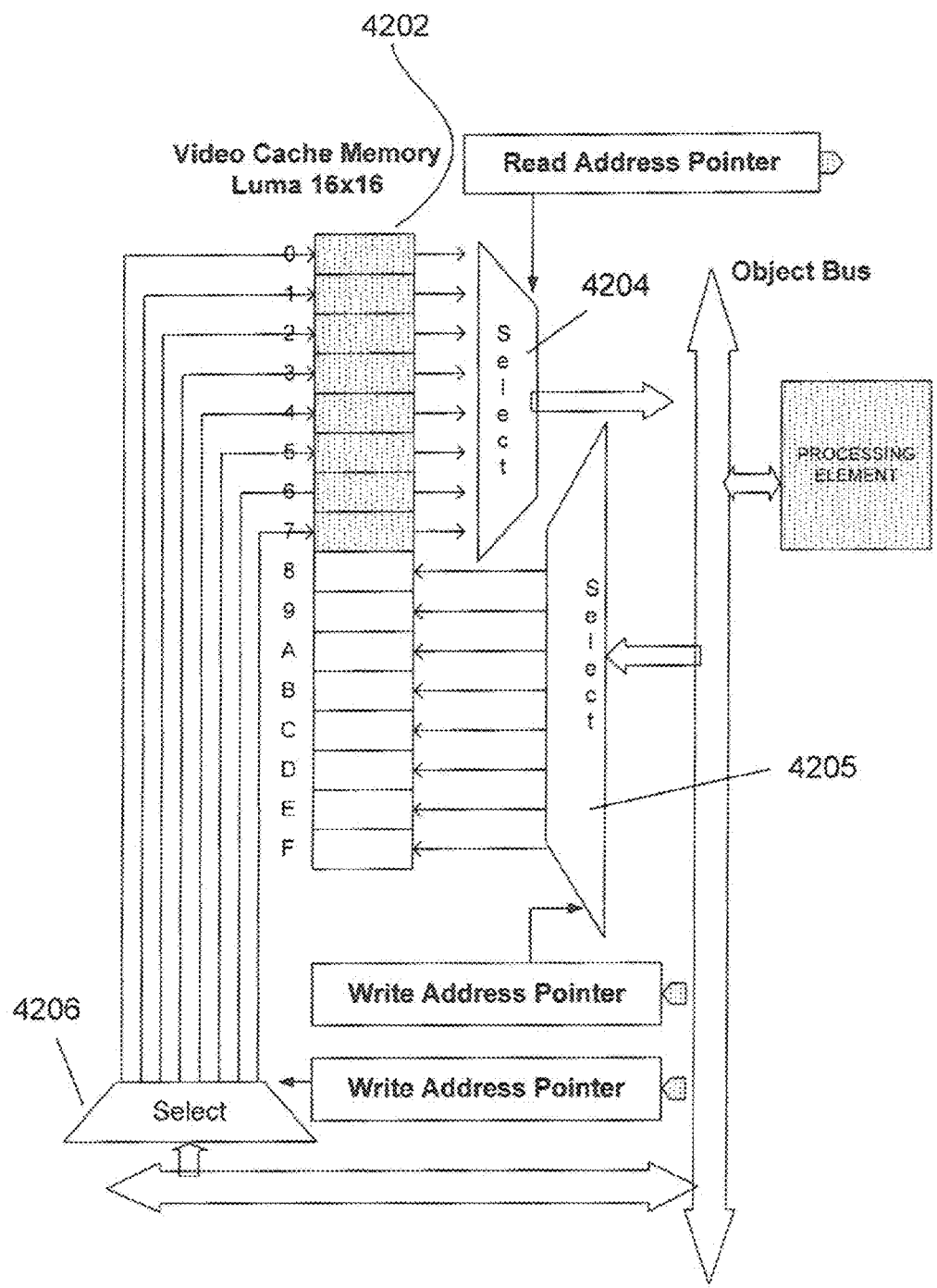
FIG. 42 illustrates implementation of the video-cache controller of a video codec that represents one embodiment of the present invention.

FIG. 42 illustrates implementation of the video-cache controller of a video codec that represents one embodiment of the present invention. Video-cache memory 4202 is accessed via multiplexers 4204-4206 controlled by circular-buffer read-and-write address pointers. Thus, each processing element may store a different read-and-write address pointer, at a given point in time, from other processing elements so that each processing element accesses the appropriate slot in the circular queue. As blocks progress through the pipeline of processing elements, the read address pointer and write address pointer associated with a block is incremented, from processing element to processing element, to ensure that the processing elements access the appropriate slots within the circular queues without requiring the data to be internally transferred within the video-cache memory for transfer between the video-cache memory and external memory.

FIG. 43 provides a table that indicates the overall computational processing carried out by each of certain of the processing elements of a video codec that represents one embodiment of the present invention. From this table, the magnitude of computational bandwidth provided by massive parallel processing within the single-integrated-circuit implementation of the video codec according to one embodiment of the present invention can be appreciated. In order to implement a computational engine and software that would provide equivalent computational bandwidth, the processor executing the software would need to operate at a fantastic speed, far above clock speeds supported by currently available processors.

One popular integrated-circuit design language is the Very-High-Speed-Integrated-Circuit Hardware Description Language ("VHDL"). FIGS. 44A-E provide high-level VHDL definitions of the various processing elements in the single-integrated-circuit implementation of a video codec, according to one embodiment of the present invention, as shown in FIG. 33A. In FIG. 44A, definitions of various objects are first provided 4402. Then, under bold names of the various processing elements, a VHDL definition of the input and output of the processing element is provided. For example, in the lower portion of FIG. 44A, the input and outputs for the motion-estimation processing element are provided 4404. The motion-estimation processing element receives four logic-signal inputs 4406, a luma macroblock 4408, and a luma reference macroblock 4410, and produces, as output, three logic signals 4412-4414 and a motion-vector object 4416.

Although the present invention has been described in terms of particular embodiments, it is not intended that the invention be limited to these embodiments. Modifications within the spirit of the invention will be apparent to those skilled in the art. For example, as discussed above, massively parallel, pipelined integrated-circuit implementations of a variety of different computational engines directed to processing and solving a variety of different computational problems can be designed according to the method of the present invention. The implementation of the integrated circuit can be encoded in one of any of various integrated-circuit-design-specification languages, including VHDL and Versilog. As discussed above, any particular computational problem can be decomposed in various different ways, with the decomposition, along with various constraints and requirements, included needed computational bandwidth, output and input data-transfer rates, cost, maximum power consumption, generally directing selection of the number and sequence of processing elements. Many of various different types of elements may be included in the design of an integrated circuit according to the methods of the present invention. Standard micro-processor controllers, for example, can be incorporated into the design. The data-object bus, as another example, may have a width and be comprised of component object busses that depend on the object-input and object-output requirements of the various processing elements. In addition, an integrated circuit may implement a variety of different levels of processing and a variety of different levels of functionality, any particular level and functionality selected by parameters input to an internal parameter store within the integrated circuit.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A integrated-circuit video codec comprising:
    processing-element subcomponents, each of which carries out a high-level computational step of a stepwise computational process, the processing-element subcomponents arranged in one or more assembly-line-like series, which operate concurrently on different computational objects;
    an object cache that stores computational objects, the computational objects comprising data-structure values input to processing elements prior to each high-level computational step and output from processing elements during each high-level computational step; and
    an object bus that provides computational-object-level transmission transactions and through which computational objects are exchanged between the processing elements and the object cache.

2. The integrated-circuit computational engine of claim 1 implemented as a single integrated circuit.

3. The integrated-circuit computational engine of claim 1 implemented as two or more single-integrated-circuit computational engines.

4. The integrated-circuit computational engine of claim 1 implemented as one or more single-integrated-circuit computational engines and one or more additional integrated circuits.

5. The integrated-circuit video codec of claim 1 wherein computational objects and data are passed between adjacent processing elements in the one or more assembly-line-like series of processing elements through one or more pipeline memories.

6. The integrated-circuit video codec of claim 5 wherein a computational object is input to a first processing element in an assembly-line-like series of processing elements, operated on by the first processing element in a first high-level computational step, and output from the first processing element to a next processing element in the assembly-line-like series of processing elements for operation on by the next processing element in a next high-level processing step.

7. The integrated-circuit video codec of claim 6 wherein the computational object is operated on, in turn, by each successive processing element in the assembly-line-like series of processing elements in subsequent high-level computational steps.

8. The integrated-circuit video codec of claim 1 including two assembly-line-like series of processing elements, a first assembly-line-like series of processing elements carrying out stepwise compression of a sequence of video frames of a raw video signal to produce an output compressed video signal and a second assembly-line-like series of processing elements carrying out stepwise decompression of a compressed video signal to produce a sequence of frames of a raw video signal.

9. The integrated-circuit video codec of claim 8 wherein the first assembly-line-like series of processing elements includes:
    a motion-estimation processing element;
    an intra-prediction-and-inter-prediction processing element;
    a residual-block calculation processing element;
    a direct-integer-transform processing element;
    a quantizing-and-scaling processing element; and
    an entropy-encoding processing element.

10. The integrated-circuit video codec of claim 8 wherein the second assembly line-like series of processing elements includes:

a entropy-decoding processing element;
a dequantizing-and-decaling processing element;
an inverse-integer-transform processing element;
a motion-estimation processing element;
an intra-prediction-and-inter-prediction processing element; and
a deblocking-filter processing element.

11. The integrated-circuit video codec of claim 1 wherein computational objects include:
macroblocks;
macroblock partitions;
motion vectors; and
data-and-parameter containing objects.

12. The integrated-circuit video codec of claim 1 further including:
a clock component that provides a high-level-processing clock cycle according to which stepwise processing of computational objects along the and one or more assembly-line-like series of processing-elements is synchronized and that provides one or more higher-frequency clock cycles, each of which controls internal processing steps of one or more of the processing elements.

13. The integrated-circuit video codec of claim 1 further including:
a controller subcomponent that, in accordance with the high-level-processing clock cycle, controls launching of a next high-level processing step in each processing element, the controller subcomponent ensuring that current high-level processing steps are completed and that computational objects and other input data needed by each processing element for the next high-level processing step are available to the processing element prior to launching the next high-level processing step in each processing element.

14. The integrated-circuit video codec of claim 13 wherein the controller subcomponent transmits a start signal to all processing elements of an assembly-line-like series of processing elements to launch the next high-level processing step.

15. The integrated-circuit video codec of claim 13 wherein the controller subcomponent receives a done signal from each processing element of an assembly-line-like series of processing elements when the processing element completes a high-level processing step.

16. The integrated-circuit video codec of claim 1 further including:
an object memory controller that controls exchange of computational objects between the object cache and a larger-capacity random-access memory.

17. The integrated-circuit video codec of claim 16 wherein the object memory controller maps computational objects to data units in the larger-capacity random-access memory, the data units one of bytes or multi-byte words.

18. The integrated-circuit video codec of claim 1 wherein the integrated-circuit video codec compresses raw video signals and decompresses compressed video signals according to the H.264 video decompression standard.

* * * * *